(12) United States Patent
Ben-Shmuel et al.

(10) Patent No.: US 9,167,633 B2
(45) Date of Patent: Oct. 20, 2015

(54) FOOD PREPARATION

(75) Inventors: Eran Ben-Shmuel, Ganei Tikva (IL); Alexander Bilchinsky, Monosson-Yahud (IL); Udi Damari, Ganei Tikva (IL); Omer Einav, Emek Hefer (IL); Benny Rousso, Rishon-LeZion (IL); Shlomo Ben-Haim, London Greater London (GB)

(73) Assignee: GOJI LIMITED, Hamilton (BM)

( * ) Notice: Subject to any disclaimer, the term of this patent is extended or adjusted under 35 U.S.C. 154(b) by 263 days.

(21) Appl. No.: 12/906,604

(22) Filed: Oct. 18, 2010

(65) Prior Publication Data

US 2011/0031236 A1 Feb. 10, 2011

Related U.S. Application Data

(63) Continuation of application No. 12/309,173, filed as application No. PCT/IL2007/000864 on Jul. 10, 2007, and a continuation-in-part of application No. PCT/IL2007/000235, filed on Feb. 21, 2007.

(60) Provisional application No. 60/924,555, filed on May 21, 2007, provisional application No. 60/775,231, filed on Feb. 21, 2006, provisional application No. 60/806,860, filed on Jul. 10, 2006.

(51) Int. Cl.
| | |
|---|---|
| *H05B 6/68* | (2006.01) |
| *H05B 6/64* | (2006.01) |
| *H05B 6/12* | (2006.01) |
| *H05B 6/80* | (2006.01) |
| *H05B 6/72* | (2006.01) |

(52) U.S. Cl.
CPC .............. *H05B 6/808* (2013.01); *H05B 6/6402* (2013.01); *H05B 6/6455* (2013.01); *H05B 6/688* (2013.01); *H05B 6/72* (2013.01); *Y02B 40/143* (2013.01)

(58) Field of Classification Search
CPC ........ H05B 6/6402; H05B 6/808; H05B 6/72; H05B 6/6455; H05B 6/686; H05B 6/705; H05B 2206/044
USPC ......... 219/620–627, 681, 494, 506, 497, 647, 219/650, 663, 685, 600, 748–750, 690, 695, 219/698, 716, 761, 702, 714; 99/325, 451; 340/572.1, 825.37; 426/241–244; 126/21 A; 235/375; 156/345.36
See application file for complete search history.

(56) References Cited

U.S. PATENT DOCUMENTS

| | | |
|---|---|---|
| 2,489,337 A | 11/1949 | Sperling |
| 2,543,130 A | 2/1951 | Robertson |

(Continued)

FOREIGN PATENT DOCUMENTS

| | | |
|---|---|---|
| CN | 1968609 | 5/2007 |
| DE | 2719588 A1 | 11/1977 |

(Continued)

OTHER PUBLICATIONS

International Preliminary Report on Patentability and Written Opinion Dated Aug. 26, 2008 From the International Preliminary Examining Authority Re.: Application No. PCT/IL2007/000235.

(Continued)

*Primary Examiner* — Quang Van
(74) *Attorney, Agent, or Firm* — Finnegan, Henderson, Farabow, Garrett & Dunner LLP

(57) ABSTRACT

Devices and methods for RF heating of food, using techniques which allow uniformity and/or controlled non-uniformity.

14 Claims, 29 Drawing Sheets

(56) References Cited

U.S. PATENT DOCUMENTS

| | | |
|---|---|---|
| 2,593,067 A | 4/1952 | Spencer |
| 2,895,828 A | 7/1959 | Kamide |
| 2,917,739 A | 12/1959 | Halpern |
| 3,019,399 A | 1/1962 | Lanciani et al. |
| 3,151,325 A | 9/1964 | Kompfner |
| 3,192,642 A | 7/1965 | Hughes et al. |
| 3,231,892 A | 1/1966 | Matson et al. |
| 3,439,431 A | 4/1969 | Heidtmann et al. |
| 3,620,794 A | 11/1971 | Figueroa |
| 3,633,538 A | 1/1972 | Hoeflin |
| 3,681,652 A | 8/1972 | Domenichini et al. |
| 3,767,884 A | 10/1973 | Osepchuk et al. |
| 3,806,689 A | 4/1974 | Kegereis et al. |
| 3,936,627 A | 2/1976 | Fitzmayer |
| 3,985,993 A | 10/1976 | Imberg et al. |
| 4,035,599 A | 7/1977 | Kashyap et al. |
| 4,081,647 A | 3/1978 | Torrey |
| 4,137,441 A | 1/1979 | Bucksbaum |
| 4,146,768 A | 3/1979 | Orke et al. |
| 4,162,381 A | 7/1979 | Buck |
| 4,165,454 A | 8/1979 | Carlsson et al. |
| 4,196,332 A | 4/1980 | MacKay et al. |
| 4,201,796 A | 5/1980 | Harkins |
| 4,210,795 A | 7/1980 | Lentz |
| 4,250,628 A | 2/1981 | Smith et al. |
| 4,279,722 A | 7/1981 | Kirkbride |
| 4,297,557 A | 10/1981 | Tyler et al. |
| 4,317,977 A | 3/1982 | Buck |
| 4,336,435 A | 6/1982 | Kashyap et al. |
| 4,340,796 A | 7/1982 | Yamaguchi et al. |
| 4,342,035 A | 7/1982 | Anderson et al. |
| 4,342,896 A | 8/1982 | Teich |
| 4,350,858 A | 9/1982 | Yoshida |
| 4,354,153 A | 10/1982 | Lentz |
| 4,371,770 A | 2/1983 | Gilliatt |
| 4,377,733 A | 3/1983 | Yamaguchi et al. |
| 4,418,262 A | 11/1983 | Noda |
| 4,431,888 A | 2/1984 | Simpson |
| 4,447,693 A | 5/1984 | Buck |
| 4,464,554 A | 8/1984 | Bakanowski et al. |
| 4,471,194 A | 9/1984 | Hosokawa et al. |
| 4,475,024 A | 10/1984 | Tateda |
| 4,485,285 A | 11/1984 | Machesne |
| 4,488,027 A | 12/1984 | Dudley et al. |
| 4,507,530 A | 3/1985 | Smith |
| 4,508,948 A | 4/1985 | Carlson |
| 4,517,429 A | 5/1985 | Horinouchi |
| 4,568,810 A | 2/1986 | Carmean |
| 4,582,713 A | 4/1986 | Hirokawa et al. |
| 4,589,423 A | 5/1986 | Turner |
| 4,596,915 A | 6/1986 | Simpson |
| 4,602,141 A | 7/1986 | Naito et al. |
| 4,672,980 A | 6/1987 | Turner |
| 4,695,694 A | 9/1987 | Hill et al. |
| 4,714,812 A | 12/1987 | Haagensen et al. |
| 4,727,311 A | 2/1988 | Walker |
| 4,794,218 A | 12/1988 | Nakano et al. |
| 4,798,215 A | 1/1989 | Turner |
| 4,816,635 A | 3/1989 | Edamura |
| 4,822,968 A | 4/1989 | Chin |
| 4,855,555 A | 8/1989 | Adams et al. |
| 4,897,151 A | 1/1990 | Killackey et al. |
| 4,931,798 A | 6/1990 | Kogo |
| 5,008,506 A | 4/1991 | Asmussen et al. |
| 5,036,171 A | 7/1991 | Kim et al. |
| 5,036,172 A | 7/1991 | Kokkeler et al. |
| 5,066,503 A | 11/1991 | Rouzi |
| 5,074,200 A | 12/1991 | Rouzi |
| 5,097,844 A | 3/1992 | Turner |
| 5,146,059 A | 9/1992 | Seog Tae |
| 5,191,182 A | 3/1993 | Gelorme et al. |
| 5,202,095 A | 4/1993 | Houchin et al. |
| 5,285,041 A | 2/1994 | Wright |
| 5,293,019 A | 3/1994 | Lee |
| 5,321,222 A | 6/1994 | Bible et al. |
| 5,321,897 A | 6/1994 | Holst et al. |
| 5,426,280 A | 6/1995 | Smith |
| 5,441,532 A | 8/1995 | Fenn |
| 5,451,751 A | 9/1995 | Takimoto |
| 5,468,940 A | 11/1995 | Kang |
| 5,492,122 A | 2/1996 | Button et al. |
| 5,503,150 A | 4/1996 | Evans |
| 5,504,311 A | 4/1996 | DuBuis et al. |
| 5,512,736 A | 4/1996 | Kang et al. |
| 5,521,360 A | 5/1996 | Johnson et al. |
| 5,558,800 A | 9/1996 | Page |
| 5,616,268 A | 4/1997 | Carr |
| 5,632,921 A | 5/1997 | Risman et al. |
| 5,698,128 A | 12/1997 | Sakai et al. |
| 5,721,286 A | 2/1998 | Lauf et al. |
| 5,789,724 A | 8/1998 | Lerssen et al. |
| 5,798,395 A | 8/1998 | Lauf et al. |
| 5,804,801 A | 9/1998 | Lauf et al. |
| 5,812,393 A | 9/1998 | Drucker |
| 5,818,649 A | 10/1998 | Anderson |
| 5,828,040 A | 10/1998 | Risman |
| 5,828,042 A | 10/1998 | Choi et al. |
| 5,834,744 A | 11/1998 | Risman |
| 5,837,978 A | 11/1998 | Hatzakis et al. |
| 5,873,254 A | 2/1999 | Arav |
| 5,877,479 A | 3/1999 | Yu |
| 5,883,801 A | 3/1999 | Drucker et al. |
| 5,927,265 A | 7/1999 | McKee et al. |
| 5,942,144 A | 8/1999 | Lee |
| 5,958,278 A | 9/1999 | Engebritson et al. |
| 5,961,871 A | 10/1999 | Bible et al. |
| 5,977,532 A | 11/1999 | Ekemar |
| 5,981,927 A | 11/1999 | Osepchuk et al. |
| 5,981,928 A | 11/1999 | Lee |
| 5,986,249 A | 11/1999 | Yoshino et al. |
| 5,998,775 A | 12/1999 | Sung |
| 6,040,565 A | 3/2000 | Akerlind |
| 6,060,701 A | 5/2000 | McKee et al. |
| 6,080,270 A * | 6/2000 | Tabrez et al. ............. 156/345.36 |
| 6,096,361 A | 8/2000 | Yamane et al. |
| 6,100,509 A * | 8/2000 | Saito ........................... 219/494 |
| 6,104,018 A | 8/2000 | Varma et al. |
| 6,114,677 A | 9/2000 | Idomoto et al. |
| 6,166,551 A | 12/2000 | Scott et al. |
| 6,169,277 B1 | 1/2001 | Feher et al. |
| 6,172,348 B1 | 1/2001 | Yoshino et al. |
| 6,191,402 B1 | 2/2001 | Ekemar |
| 6,198,975 B1 | 3/2001 | Drucker et al. |
| 6,222,170 B1 | 4/2001 | Tucker et al. |
| 6,225,940 B1 | 5/2001 | Ohlsen |
| 6,249,710 B1 | 6/2001 | Drucker et al. |
| 6,252,206 B1 | 6/2001 | Leukhardt et al. |
| 6,262,406 B1 | 7/2001 | McKee et al. |
| 6,263,830 B1 | 7/2001 | Kamarehi et al. |
| 6,274,859 B1 | 8/2001 | Yoshino et al. |
| 6,320,165 B1 | 11/2001 | Ovadia |
| 6,320,169 B1 | 11/2001 | Clothier |
| 6,320,171 B1 | 11/2001 | Kim |
| 6,384,392 B1 | 5/2002 | Lee et al. |
| 6,444,966 B2 | 9/2002 | Mukumoto et al. |
| 6,462,320 B1 | 10/2002 | Fuls et al. |
| 6,476,766 B1 | 11/2002 | Cohen |
| 6,487,950 B2 | 12/2002 | Samland |
| 6,537,492 B1 | 3/2003 | Søgaard |
| 6,550,681 B1 | 4/2003 | Ross et al. |
| 6,559,882 B1 | 5/2003 | Kerchner |
| 6,563,097 B2 | 5/2003 | Taino et al. |
| 6,576,879 B1 | 6/2003 | Hoh |
| 6,586,714 B2 | 7/2003 | Kawamura et al. |
| 6,590,192 B2 | 7/2003 | Taino et al. |
| 6,614,011 B2 | 9/2003 | Omori et al. |
| 6,638,475 B1 | 10/2003 | Lagunas-Solar et al. |
| 6,657,173 B2 | 12/2003 | Flugstad et al. |
| 6,674,056 B2 | 1/2004 | Lee |
| 6,680,467 B1 | 1/2004 | Whipple, Jr. |
| 6,681,137 B1 | 1/2004 | Drucker et al. |
| 6,686,567 B1 | 2/2004 | Hwang |
| 6,720,541 B2 | 4/2004 | Watanabe et al. |
| 6,770,859 B2 | 8/2004 | Kang |

(56) References Cited

U.S. PATENT DOCUMENTS

| | | |
|---|---|---|
| 6,788,977 B2 | 9/2004 | Fenn et al. |
| 6,812,443 B2 | 11/2004 | Noda et al. |
| 6,815,644 B1 | 11/2004 | Muegge et al. |
| 6,838,648 B2 | 1/2005 | Watanabe et al. |
| 6,861,632 B2 | 3/2005 | Lee |
| 6,867,402 B1 | 3/2005 | Schulte |
| 6,874,495 B2 | 4/2005 | McFadden |
| 6,880,545 B2 | 4/2005 | Heber et al. |
| 6,884,979 B1 | 4/2005 | Torngren et al. |
| 6,914,226 B2 | 7/2005 | Ottaway |
| 6,917,023 B2 | 7/2005 | Hayes et al. |
| 6,927,374 B2 | 8/2005 | Hu et al. |
| 6,982,401 B2 | 1/2006 | Hu et al. |
| 7,015,443 B2 | 3/2006 | Whipple, Jr. |
| 7,030,347 B2 | 4/2006 | Lee et al. |
| 7,053,346 B2 | 5/2006 | Cheng et al. |
| 7,053,348 B1 | 5/2006 | Terada et al. |
| 7,055,518 B2 | 6/2006 | McFadden et al. |
| 7,078,661 B2 | 7/2006 | Kim et al. |
| 7,080,593 B1 | 7/2006 | Frankel |
| 7,087,872 B1 | 8/2006 | Dobie et al. |
| 7,091,460 B2 | 8/2006 | Kinzer |
| 7,096,221 B2 | 8/2006 | Nakano |
| 7,105,787 B2 | 9/2006 | Clemen, Jr. |
| 7,105,789 B2 | 9/2006 | Ekemar |
| 7,109,457 B2 | 9/2006 | Kinzer |
| 7,145,119 B1 | 12/2006 | Kim et al. |
| 7,166,824 B2 | 1/2007 | Kanzaki et al. |
| 7,199,341 B2 | 4/2007 | Kaneko et al. |
| 7,207,486 B1 | 4/2007 | Bennett |
| 7,208,710 B2 | 4/2007 | Gregoire et al. |
| 7,235,763 B2 | 6/2007 | Christiaansen et al. |
| 7,258,881 B2 | 8/2007 | Jones et al. |
| 7,360,533 B2 | 4/2008 | McFadden |
| 7,361,866 B2 | 4/2008 | Chun |
| 7,372,209 B2 | 5/2008 | Espiau et al. |
| 7,388,180 B2 | 6/2008 | Kim et al. |
| 7,409,311 B2 | 8/2008 | Imgram et al. |
| 7,473,869 B2 | 1/2009 | Chun |
| 7,490,538 B2 | 2/2009 | Lowell et al. |
| 7,565,207 B2 | 7/2009 | Turner et al. |
| 7,612,315 B2 | 11/2009 | Corradini |
| 7,626,468 B2 | 12/2009 | Staines |
| 7,629,921 B1 | 12/2009 | Manry et al. |
| 8,240,914 B1 | 8/2012 | Chapman et al. |
| 8,297,270 B2 | 10/2012 | McFadden |
| 2001/0000403 A1 | 4/2001 | Gaisford et al. |
| 2001/0020616 A1 | 9/2001 | Drozd et al. |
| 2002/0018138 A1 | 2/2002 | Yoshiro |
| 2002/0026325 A1 | 2/2002 | Hirahara et al. |
| 2002/0162836 A1 | 11/2002 | Taino et al. |
| 2002/0175163 A1 | 11/2002 | Fagrell |
| 2003/0047559 A1 | 3/2003 | Watsnabe et al. |
| 2003/0068414 A1 | 4/2003 | Ito |
| 2003/0121913 A1* | 7/2003 | Hayami et al. ................ 219/730 |
| 2003/0183972 A1 | 10/2003 | Weber et al. |
| 2004/0074401 A1 | 4/2004 | McMaster et al. |
| 2004/0106917 A1 | 6/2004 | Ormsby et al. |
| 2004/0134904 A1 | 7/2004 | Clemen, Jr. |
| 2004/0149736 A1* | 8/2004 | Clothier ........................ 219/627 |
| 2004/0177011 A1 | 9/2004 | Ramsay et al. |
| 2004/0206755 A1 | 10/2004 | Hadinger |
| 2004/0211765 A1 | 10/2004 | McFadden |
| 2004/0216732 A1 | 11/2004 | McFadden |
| 2004/0232140 A1 | 11/2004 | Kanzaki et al. |
| 2005/0080373 A1 | 4/2005 | Wang |
| 2005/0091996 A1 | 5/2005 | Ishikawa et al. |
| 2005/0092314 A1 | 5/2005 | Rabas et al. |
| 2005/0092844 A1 | 5/2005 | Zhang et al. |
| 2005/0139686 A1 | 6/2005 | Helmer et al. |
| 2005/0154896 A1 | 7/2005 | Widman et al. |
| 2005/0178841 A1 | 8/2005 | Jones, II et al. |
| 2005/0218124 A1* | 10/2005 | Jennings et al. ......... 219/121.65 |
| 2005/0270229 A1 | 12/2005 | Stephens |
| 2005/0270528 A1 | 12/2005 | Geshwind et al. |
| 2006/0006173 A1 | 1/2006 | Kim et al. |
| 2006/0049725 A1 | 3/2006 | Simon |
| 2006/0259547 A1 | 11/2006 | Bogatin et al. |
| 2006/0278710 A1 | 12/2006 | Park et al. |
| 2006/0289499 A1* | 12/2006 | Chun ........................... 219/685 |
| 2006/0289508 A1 | 12/2006 | Kim |
| 2006/0289526 A1 | 12/2006 | Takizaki et al. |
| 2007/0007279 A1 | 1/2007 | Chun et al. |
| 2007/0007348 A1 | 1/2007 | Shah |
| 2007/0012690 A1 | 1/2007 | Sim et al. |
| 2007/0012789 A1 | 1/2007 | Hartney et al. |
| 2007/0039940 A1 | 2/2007 | Kim et al. |
| 2007/0137633 A1 | 6/2007 | McFadden |
| 2007/0215608 A1 | 9/2007 | Yoshino et al. |
| 2007/0215612 A1 | 9/2007 | Hicks et al. |
| 2007/0221668 A1 | 9/2007 | Baarman et al. |
| 2007/0251941 A1 | 11/2007 | Givens |
| 2007/0265523 A1 | 11/2007 | Pahlsson et al. |
| 2007/0272684 A1 | 11/2007 | Lee |
| 2007/0278218 A1 | 12/2007 | Claesson et al. |
| 2008/0047948 A1 | 2/2008 | Rosenbloom et al. |
| 2008/0047959 A1 | 2/2008 | Moriya et al. |
| 2008/0087662 A1 | 4/2008 | Takizaki et al. |
| 2008/0105136 A1 | 5/2008 | McFadden |
| 2008/0105675 A1 | 5/2008 | Choi et al. |
| 2008/0106483 A1 | 5/2008 | McFadden et al. |
| 2008/0160967 A1 | 7/2008 | Narasimhan et al. |
| 2008/0193614 A1 | 8/2008 | Greiner et al. |
| 2008/0206420 A1 | 8/2008 | McFadden |
| 2008/0223854 A1 | 9/2008 | Zeijlon |
| 2008/0264269 A1 | 10/2008 | Sterzel et al. |
| 2008/0280000 A1 | 11/2008 | Breunig et al. |
| 2008/0290087 A1 | 11/2008 | Ben-Shmuel et al. |
| 2008/0290178 A1 | 11/2008 | Reynolds et al. |
| 2008/0296284 A1 | 12/2008 | McFadden et al. |
| 2009/0014315 A1 | 1/2009 | Chen |
| 2009/0045191 A1 | 2/2009 | Ben-Shmuel et al. |
| 2009/0057302 A1 | 3/2009 | Ben-Shmuel et al. |
| 2009/0071110 A1 | 3/2009 | Gonze et al. |
| 2009/0236333 A1 | 9/2009 | Ben-Shmuel et al. |
| 2009/0236334 A1 | 9/2009 | Ben-Shmuel et al. |
| 2009/0236335 A1 | 9/2009 | Ben-Shmuel et al. |
| 2009/0256706 A1 | 10/2009 | Brown |
| 2009/0274802 A1 | 11/2009 | Kling et al. |
| 2010/0123001 A1 | 5/2010 | Park |
| 2010/0155392 A1 | 6/2010 | Nordh et al. |
| 2010/0176121 A1 | 7/2010 | Nobue et al. |
| 2010/0237067 A1 | 9/2010 | Nordh et al. |
| 2010/0252551 A1 | 10/2010 | Nordh et al. |
| 2012/0111856 A1 | 5/2012 | Nobue et al. |
| 2013/0056460 A1 | 3/2013 | Ben-Shmuel et al. |
| 2014/0063676 A1 | 3/2014 | Sigalov et al. |

FOREIGN PATENT DOCUMENTS

| | | |
|---|---|---|
| DE | 102004014338 A1 | 10/2004 |
| DE | 10200702562 | 10/2007 |
| DE | 102007025245 | 10/2007 |
| DE | 102007025263 | 10/2007 |
| DE | 102007025264 | 10/2007 |
| DE | 102007035357 | 2/2009 |
| DE | 102007035359 | 2/2009 |
| DE | 102007051638 | 8/2009 |
| DE | 102008029218 A1 | 12/2009 |
| EP | 0053841 A2 | 6/1982 |
| EP | 0268379 | 5/1988 |
| EP | 0429822 | 6/1991 |
| EP | 0615763 | 9/1994 |
| EP | 0615763 | 10/1994 |
| EP | 0752195 | 1/1997 |
| EP | 2051564 A1 | 4/1999 |
| EP | 0934681 | 8/1999 |
| EP | 1196649 B1 | 7/2000 |
| EP | 1321564 A1 | 12/2002 |
| EP | 1321565 A1 | 12/2002 |
| EP | 1447632 | 8/2004 |
| EP | 1515102 | 3/2005 |
| EP | 1532902 A1 | 5/2005 |
| EP | 1708118 | 10/2006 |

(56) References Cited

FOREIGN PATENT DOCUMENTS

| | | |
|---|---|---|
| EP | 1742513 A2 | 1/2007 |
| EP | 1987288 | 11/2008 |
| EP | 2053315 | 4/2009 |
| EP | 2098788 | 9/2009 |
| EP | 2528415 | 11/2012 |
| EP | 2326141 | 12/2012 |
| EP | 2544508 | 1/2013 |
| GB | 1262040 A | 2/1972 |
| GB | 1465106 | 2/1977 |
| GB | 2033587 | 5/1980 |
| GB | 2071887 A | 9/1981 |
| GB | 2391154 | 1/2004 |
| GB | 2444966 | 6/2008 |
| JP | 52-014946 | 2/1977 |
| JP | 63255783 | 10/1988 |
| JP | 04-299282 | 10/1992 |
| JP | 6-193884 A | 7/1994 |
| JP | 06-215871 | 8/1994 |
| JP | 06-251866 | 9/1994 |
| JP | 6-310268 | 11/1994 |
| JP | 8-64359 | 3/1996 |
| JP | 9-229372 | 9/1997 |
| JP | 2001-086967 | 4/2001 |
| JP | 2001317741 A2 | 11/2001 |
| JP | 2002/037420 | 2/2002 |
| JP | 2002-243161 A | 8/2002 |
| JP | 2002243161 A | 8/2002 |
| JP | 2004-171852 | 6/2004 |
| JP | 2005140418 A | 6/2005 |
| JP | 2005-228604 | 8/2005 |
| WO | WO 91/07069 | 5/1991 |
| WO | WO 2009216083 A1 | 9/1992 |
| WO | WO 95/07007 | 3/1995 |
| WO | WO 95/27387 | 10/1995 |
| WO | WO 95/27388 | 10/1995 |
| WO | WO 9711357 | 3/1997 |
| WO | WO 97/36728 | 10/1997 |
| WO | WO 99/13688 | 3/1999 |
| WO | WO 02/23953 | 3/2002 |
| WO | WO 0223953 A1 | 3/2002 |
| WO | WO 03/056919 | 7/2002 |
| WO | WO 2004/059563 | 7/2004 |
| WO | WO 2005006239 | 1/2005 |
| WO | WO 2005/027644 | 3/2005 |
| WO | WO 2005/041672 | 5/2005 |
| WO | WO 2005/073449 | 8/2005 |
| WO | WO 2006/016372 | 2/2006 |
| WO | WO 2007/018565 | 2/2007 |
| WO | WO 2007/095204 | 8/2007 |
| WO | WO 2007/096877 | 8/2007 |
| WO | WO 2007/096878 | 8/2007 |
| WO | WO 2005/106333 | 9/2007 |
| WO | WO 2008/007368 | 1/2008 |
| WO | WO 2008/048497 | 4/2008 |
| WO | WO 2008/087618 | 7/2008 |
| WO | WO 2008088124 | 7/2008 |
| WO | WO 2008/102334 | 8/2008 |
| WO | WO 2008/102360 | 8/2008 |
| WO | WO 2008/102360 A2 | 8/2008 |
| WO | WO 2008/143942 | 11/2008 |
| WO | WO 2008/145213 | 12/2008 |
| WO | WO 2008/145214 | 12/2008 |
| WO | WO 2008/145216 | 12/2008 |
| WO | WO 2008/145217 | 12/2008 |
| WO | WO 2009020959 A1 | 2/2009 |
| WO | WO 2009050893 | 4/2009 |
| WO | WO 2009/080344 A | 7/2009 |
| WO | WO 2009/104191 | 8/2009 |
| WO | WO 2010/052724 | 5/2010 |
| WO | WO 2010/052725 | 5/2010 |
| WO | WO 2010/147439 A2 | 12/2010 |

OTHER PUBLICATIONS

International Preliminary Report on Patentability Dated May 29, 2008 From the International Preliminary Examining Authority Re.: Application No. PCT/IL2007/000236.

Bird "Antenna Feeds", Encyclopedia of Radiofrequency and Macrowave Engineering, p. 185-217, 2005.

Foster et al. "Biological Effects of Radiofrequency Energy As Related to Health and Safety", Encyclopedia of Radiofrequency and Macrowave Engineering, p. 511-523, 1999.

Foster et al. "Dielectric Properties of Tissues", Handbook of Biological Effects of Electromagnetic Fields, CRC Press, 2nd Ed.(Chap.I): 25-101, 1996.

International Search Report and Written Opinion Dated Nov. 13, 2008 From the International Searching Authority Re.: Application No. PCT/IL2008/000231.

International Search Report and Written Opinion Dated Aug. 31, 2007 From the International Searching Authority by the Patent Cooperation Treaty Re.: Application No. PCT/IL20007/000236.

International Search Report and Written Opinion Dated Dec. 27, 2007 From the International Searching Authority by the Patent Cooperation Treaty Re.: Application No. PCT/IL2007/000864.

International Search Report and Written Opinion Dated May 20, 2008 From the International Searching Authority by the Patent Cooperation Treaty Re.: Application No. PCT /IL2007/001073.

Lapin N9GL's RF Safety Column: the Military's New RF Weapon, ARRL Handbook for Radio Amateurs, ARRL Web: N9GL's RF Safety Column: The Military's New RF Weapon.

International Preliminary Report on Patentability and Written Opinion Dated Aug. 26, 2009 From the International Bureau of WIPO Re.: Application No. PCT/IL2007/001073.

Penfold et at. "Control of Thermal Runaway and Uniformity of Heating in the Electromagnetic Rewarming of a Cryopreserved Kidney Phantom", Cryobiology, 30: 493-508, 1993.

Kim, J. et al., "Novel Microstrip-to-Stripline Transitions for Leakage Suppression in Multilayer Microwave Circuits,".

Kusama, Y. et al., "Size Reduction of the Door Seal Structure of a Microwave Oven by the FDTD Method," *Electronics and Communications in Japan*, Part 2, vol. 86, No. 10, 2003.

Kusama, Y. et al., "A Study on the Door Seal Structure of a Microwave Oven Using the Finite-Difference Time-Domain Method," *Microwave and Optical Technology Letters*, vol. 19, No. 5, Dec. 5, 1998.

Kusama, Y. et al., "Analysis of Door Seal Structure of Microwave Oven with Consideration of Higher Modes by the FDTD Method," *Electronics and Communications in Japan*, Part 2, vol. 85, No. 3, 2002.

Lee, G. et al., "Suppression of the CPW Leakage in Common Millimeter-Wave Flip-Chip Structures," *IEEE Microwave and Guided Wave Letters*, vol. 8, No. 11, Nov. 11, 1998.

Matsumoto, K. et al., "An Analysis of a Door Seal Structure of a Microwave Oven with an Inserted Sheet-Type Lossy Material Using FDTD Method," *Electronics and Communications in Japan*, Part 1, vol. 85, No. 9, 2002.

Matsumoto, K. et al., "An efficient Analysis on Door structure of Microwave Oven Using Combined waves of High Order Modes," *33rd European Microwave Conference*, Munich, 2003.

Mett, R. R. et al., "Microwave leakage from field modulation slots in TE011 electron paramagnetic resonance cavities," *Review of Scientific Instruments* 76, 014702, 2005.

Rabinovitch, J., "New Design for the Mk Irf Finger Contacts in the LHC,".

Rocha, A. M. et al., "Optimization of a door seal structure of a microwave oven using a FDTD method," *International Journal of Numerical Modeling: Electronic Networks, Devices and Fields*, Int. J. Numer. Model. 2008; 21:507-513, Jul. 21, 2008.

Swain et al., "What is the most energy efficient method of cooking a 'British' roast dinner?," *University of Bristol Fryers Research Project*, Feb. 29, 2008.

Tomiyasu, K., "Minimizing Radiation Leakage from Microwave Ovens," *IEEE Microwave Magazine*, Feb. 1, 2008.

(56) References Cited

OTHER PUBLICATIONS

Umashankar, K. et al., "A Novel Method to Analyze Electromagnetic Scattering of Complex Objects," *IEEE Transactions on Electromagnetic Compatibility*, vol. EMC-24, No. 4, Nov. 1, 1982.

Umishita, K. et al., "Absorption and Shielding Effect of Electromagnetic Wave at GHz Frequency by Multi-walled Carbon Nanotube/Polymer Composites," *Proceedings of the 9th European Conference on Wireless Technology*, Sep. 1, 2006.

Collin, R.E., "Chapter 4: Circuit Theory for Waveguiding Systems," *Foundations of Microwave Engineering*, 2nd ed. IEEE Press Series on electromagnetic wave theory, pp. 233-254, 2001.

Pozar, D.M., "Chapter 4: Microwave Network analysis," *Microwave Engineering*, 2nd ed., John Wiley & Sons, Inc., pp. 190-211, 1998.

Repacholi "Radiofrequency Electromagnetic Field Exposure Standards", IEEE Engineering in Medicine and Biology Magazine, p. 18-21, Mar. 1987.

Robinson et al. "Electromagnetic Re-Warming of Cryopreserved Tissues: Effect of Choice of Cryoprotectant and Sample Shape on Uniformity of Heating", Physics in Medicine and Biology, 47: 2311-2325, 2002.

Schwan et al. "RF-Field Interactions With Biological Systems: Electrical Properties and Biophysical Mechanisms", Proceedings of the IEEE, 68(1): 104-113, Jan. 1980.

Scott "Understanding Microwaves", A Wiley-Interscience Publication, 1: 326-331, 1993.

Von Hippel "Theory: A. Macroscopic Properties of Dielectrics. Complex Permittivity and Permeability", Dielectric Materials and Applications, 1: 3-5, 1995.

Notice of Defects issued from the Israeli Patent Office in corresponding Israeli Patent Application No. 193581, dated Sep. 26, 2011, total 2 pgs (including translation).

International Search Report and Written Opinion regarding International Application No. PCT/IL10100380, mailed Aug. 30, 2010, 12 pages.

International Search Report and Written Opinion regarding International Application No. PCT/IL10100381, mailed Sep. 1, 2010, 124 pages.

Hanshen Gu, Dong Wang, A Content-aware Fridge Based on RFID in Smart Home for Home-Healthcare, Feb. 15-18, 2009 ICACT 2009.

Sho Murakami, Takuo Suzuki, Akira Tokumasu, and Yasushi Nakauchi, Cooking Procedure Recognition and Support by, Journal of Robotics and Mechatronics vol. 21 No. 4, 2009Ubiquitous Sensors, (9 pages).

Yasushi Nakauchi, Takuo Suzuki, Akira Tokumasu and Sho Murakami, Cooking Procedure Recognition and Support System by Intelligent Environments, IEEE, 2009, (8 pages).

RFID Restaurant POS System, RFID Restaurant POS System, Proceedings of the 2011 International Conference on Machine Learning and Cybernetics, Guilin, Jul. 10-13, 2011, (4 pages).

Jen-hao Chen, Keng-hao Chang, Pei-yu Chi, Hao-hua Chu, A Smart Kitchen to Promote Healthy Cooking, (2 pages).

Claire Swedberg,Food equipment manufacturer Alkar is offering wireless temperature probes that have helped its customers save on labor, as well as reduce spoilage, RFID Journal May 27, 2011, (3 pages).

Karleigh Huff, Active and Intelligent Packaging: Innovations for the Future, report to:Department of Food Science and Technology, Virginia Polytechnic Institute and State University, (13 pages).

Bojun Li, Piyanuch Hathaipontaluk, Suhuai Luo, Intelligent Oven in Smart Home Environment, 2009 International Conference on Research Challenges in Computer Science.

Michael Schneider, The Semantic Cookbook: Sharing Cooking Experiences in the Smart Kitchen, (1 page).

MotiveSoft Brochure, Siemans, "Case Study 05-Siemens-Ever Present Computing-in Elderly Peoples Homes," (1 page).

James Russo1, Andiputranto Sukojo1, Abdelsalam (Sumi) Helal1, Rick Davenport2,and William C. Mann2, SmartWave —Intelligent Meal Preparation System to Help Older People Live Independently, (14 pages).

Dieter Uckelmanna, Tilo Hamannb and Markus Zschintzschc, Performance increase and benefit compensation in supply chains by partial information sharing and billing based on identification of returnable transport items, International Journal of RF Technologies: Research and Applications vol. 1, No. 1, Mar. 2009, 23-43, (21 pages).

Federic Thiesse and Moritz Kohller, An Ananlysis of Usage-Based Pricing Policies for Smart Products, (10 pages).

Paul Bowman, Jason Ng (BT), Mark Harrison (Cambridge), Alexander Illic (ETH), Reusable Asset Management Model, Building Radio frequency IDentification for the Global Environment-European Commission contract No. IST-2005-033546, (53 pages).

Dieter Uckelmann1, Bernd Scholz-Reiter2, 9 Integrated Billing Solutions in the Internet of Things, © Springer-Verlag Berlin Heidelberg 2011, (23 pages).

Communication Pursuant to Article 94(3) EPC, dated Mar. 26, 2012 Re: European Application No. 09 793 620.7-2214, 5 pages.

Official Action Dated Jul. 14, 2010 From the State IP Office, P.R. China Re.: Application No. 200780014028.9, Aug. 2, 2010, (9 pages).

International Search Report Dated Sep. 11, 2007 From the International Searching Authority by the Patent Cooperation Treaty Re.: Application No. PCT /IL2007/000235, (22 pages).

Response dated Feb. 23, 2010 to the Written Opinion of Nov. 25, 2009 from the International Searching Authority Re: Application No. PCT/IL2009/000199, (8 pages).

International Search Report and the Written Opinion dated Mar. 3, 2010 from the International Searching Authroity Re: Application No. PCT/IL2009/001057, (17 pages).

International Search Report and the Written Opinion dated Jun. 15, 2010 from the International Searching Authority Re: Application No. PCT/IL2009/001058, (18 pages).

English Translation of Notice of Reason for Rejection, mailed Feb. 24, 2012 Re: Japanese Application No. 2008-555943, (5 pages).

Levinti Booster, "Boost Your Performance," Innovated by Levens Cooking & Baking Systems, (16 pages).

"Bakermat," Leventi, Mastermind & Digital, www.leventi.com, (22 pages).

Helal, Sumi et al., The Gator Tech Smart Houses: A Programmable Pervasive Space, Mar. 2005, IEEE Computer Society, p. 50-60.

Luo, Suhuai et al., "Smart Fridges with Multimedia Capability for Better Nutrition and Health," 2008 International Symposium on Ubiquitous Multimedia Computing. p. 39-44.

Anonymous, "Oven Ready?," Caterer & Hotelkeeper; Jan. 31-Feb. 6, 2008; 198, 4512; ABI/INFORM Trade & Industry, (3 pages).

Whitehall, Bruce, "What's Hot in the Kitchen," Caterer & Hotelkeeper; Jun. 15-Jun. 21, 2006; 196, 4429; ABI/INFORM Trade & Industry, p. 43-44.

Adams, "Microwave Blood Plasma Defroster," Journal of Microwave Power and Electromagnetic Energy, vol. 26, No. 3, pp. 156-159, 1991.

Arens et al., "Danger of Overwarming Blood by Microwave," JAMA, vol. 218, No. 7, pp. 1045-1046, 718, Nov. 15, 1971.

Boström et al., "Rapid Thawing of Fresh-Frozen Plasma With Radio Wave-Based Thawing Technology and Effects on Coagulation Factors During Prolonged Storage at 4° C," Vox Sanguinis, vol. 97, pp. 34-38, 2009.

Collin, "Electromagnetic Theory: Wave Equation," Foundations for Microwave Engineering, IEEE Press Series on Electromagnetic Wave Theory, 2nd Ed., Chap. 2.4: 31-32, 2001.

Collin, "Transmission Lines and Waveguides," Foundations for Microwave Engineering, IEEE Press Series on Electromagnetic Wave Theory, 2nd Ed., pp. 96-99, 2001.

Evans, "Electromagnetic Rewarming: The Effect of CPA Concentration and Radio Source Frequency on Uniformity and Efficiency of Heating," Cryobiology, vol. 40, pp. 126-138, 2000.

Evans et al., "Design of a UHF Applicator for Rewarming of Cryopreserved Biomaterials," IEEE Transactions on Biomedical Engineering, vol. 39, No. 3, pp. 217-225, Mar. 1992.

Geedipalli et al., "Heat Transfer in A Combination Microwave-Jet Impingement Oven," *Food and Bioproducts Processing*, vol. 86, pp. 53-63, 2008.

(56) References Cited

OTHER PUBLICATIONS

Hambling, "Forget Lasers, Phasers and Other Beam Weapons—Radiofrequency Devices Are Here, and They're Set to 'Sting,'" *Tech Watch: Forecasting Pain*, vol. 183, No. 12, p. 32, Dec. 2006.
Herring et al., "OSU Tunes Into a Cooking Innovation", *OSU News & Communication Services, Oregon State University*, 2 P., Apr. 30, 2004.
Hirsch et al., "Indicators of Erythrocyte Damage After Microwave Warming of Packed Red Blood Cells," *Clinical Chemistry*, vol. 49, No. 5, pp. 792-799, 2003.
Hirsch et al., "Temperature Course and Distribution During Plasma Heating With a Microwave Device," *Anaesthesia*, vol. 58, pp. 444-447, 2003.
Khummongkol et al., "Heat Transfer Between Impinging Air and Impinged Surface: A Factorial Design," The Joint International Conference on 'Sustainable Energy and Environment (SEE)', Hua Hin, Thailand, Dec. 1-3, 2004, 4-003(O): pp. 431-436, 2004.
Liang et al., "Multiband Characteristics of Two Fractal Antennas," *Microwave and Optical Technology Letters*, vol. 23, No. 4, pp. 242-245, Nov. 20, 1999.
Marcroft et al., "Flow Field in a Hot Air Jet Impingement Oven—Part I: A Single Impinging Jet," *Journal of Food Processing Preservation*, vol. 23, pp. 217-233, 1999.
Marcroft et al., "Flow Field in a Hot Air Jet Impingement Oven—Part II: Multiple Impingement Jets," *Journal of Food Processing Preservation*, vol. 23, pp. 235-248, 1999.
Penfold et al., "Control of Thermal Runaway and Uniformity of Heating in the Electromagnetic Rewarming of a Cryopreserved Kidney Phantom", *Cryobiology*, vol. 30, pp. 493-508, 1993.
Risco, "Microwaves and Vascular Perfusion: Obtaining Very Rapid Organ Cooling," *Cryobiology*, 49: 294, Abstract, No. 11, 2004.
Robinson et al., "Rapid Electromagnetic Warming of Cells and Tissues," *IEEE Transactions on Biomedical Engineering*, vol. 46, No. 12, pp. 1413-1425, Dec. 1999.
Robinson et al., "Electromagnetic Re-Warming of Cryopreserved Tissues: Effect of Choice of Cryoprotectant and Sample Shape on Uniformity of Heating," Physics in Medicine and Biology, vol. 47, pp. 2311-2325, 2002.
Shelley, "Inside View on Deep Heat," Eureka Innovative Engineering Design, 2 P., May 14, 2007.
Sherman et al., "A New Rapid Method for Thawing Fresh Frozen Plasma," *Transfusion*, vol. 14, No. 6, pp. 595-597, Nov.-Dec. 1974.
Söhngen et al., "Thawing of Fresh-Frozen Plasma With a New Microwave Oven," *Transfusion*, vol. 28, No. 6, pp. 576-580, 1988.
Walker et al., "Fractal Volume Antennas," *Electronics Letters*, vol. 34, No. 16, pp. 1536-1537, Aug. 6, 1998.
Wusteman et al., "Vitrification of Large Tissues With Dielectric Warming: Biological Problems and Some Approaches to Their Solution," *Cryobiology*, vol. 48, pp. 179-189, 2004.
International Preliminary Report on Patentability, dated Aug. 26, 2008, for International Application No. PCT/2007/000235, from the International Bureau of WIPO.
International Preliminary Report on Patentability, dated Jan. 13, 2009, for International Application No. PCT/IL2007/000864, from the International Bureau of WIPO.
International Preliminary Report on Patentability, dated Aug. 26, 2009, for International Application No. PCT/IL2007/001073, from the International Bureau of WIPO.
International Search Report and Written Opinion, dated Nov. 25, 2009, for International Application No. PCT/IL2009/000199, from the International Searching Authority.
International Search Report and Written Opinion, dated Mar. 3, 2010, for International Application No. PCT/IL2009/001057, from the International Searching Authority.
International Search Report and Written Opinion, dated Jun. 15, 2010, for International Application No. PCT/IL2009/001058, from the International Searching Authority.
International Search Report and Written Opinion, dated Jun. 24, 2010, for International Application No. PCT/IL2009/001059, from the International Searching Authority.
Communication Relating to the Results of the Partial International Search, dated Jul. 10, 2002, for International Application No. PCT/IL2007/000235, from the International Searching Authority.
Communication Relating to the Results of the Partial International Search, dated Jul. 10, 2007, for International Application No. PCT/IL2007/000236, from the International Searching Authority.
Communication Relating to the Results of the Partial International Search, dated Oct. 24, 2007, for International Application No. PCT/IL2007/000864, from the International Searching Authority.
Communication Relating to the Results of the Partial International Search, dated Aug. 4, 2008, for International Application No. PCT/IL2008/000231, from the International Searching Authority.
Communication Relating to the Results of the Partial International Search, dated Aug. 3, 2009, for International Application No. PCT/IL2009/000199, from the International Searching Authority.
Communication Relating to the Results of the Partial International Search, dated Mar. 29, 2010, for International Application No. PCT/IL2009/001058, from the International Searching Authority.
Communication Pursuant to Article 94(3) EPC, dated Apr. 29, 2010, for European Application No. 07706172.9 from the European Patent Office.
Response to the Written Opinion, dated Feb. 23, 2010, for International Application No. PCT/IL2009/000199, from the International Searching Authority.
Office Action dated Jun. 3, 2010 From the US Patent and Trademark Office Re.: U.S. Appl. No. 12/217,167.
Official Action in Chinese Application No. 200780033481.4, Dec. 10, 2012.
English translation of Notice of Decision of Rejection in Chinese Application No. 200780033481.4, Jul. 15, 2013.
Extended European Search Report in EP Application No. 12173914.8, Aug. 12, 2013.
European Search Report in Ep Application No. 12173921.3, Aug. 12, 2013.
Office Action in U.S. Appl. No. 12/457,154, Sep. 12, 2012.
Office Action in U.S. Appl. No. 12/457,154, Mar. 14, 2013.
Office Action in U.S. Appl. No. 12/457,154, Sep. 11, 2013.
Final Office Action in U.S. Appl. No. 12/457,154, Feb. 13, 2014.
Office Action in U.S. Appl. No. 12/457,156, Mar. 7, 2013.
Office Action in U.S. Appl. No. 12/457,156, Oct. 9, 2013.
Office Action in U.S. Appl. No. 12/457,156, Mar. 26, 2014.
Office Action in U.S. Appl. No. 12/457,156, Nov. 6, 2014.
Office Action in U.S. Appl. No. 13/662,067, Sep. 10, 2013.
Final Office Action in U.S. Appl. No. 13/662,067, Mar. 26, 2014.
Office Action in U.S. Appl. No. 12/309,173, May 1, 2014.
Office Action in U.S. Appl. No. 12/309,173, Sep. 6, 2013.
Office Action in U.S. Appl. No. 12/309,173, Aug. 13, 2012.
Office Action in U.S. Appl. No. 12/309,173, Feb. 27, 2013.
Thermo Scientific Escan Product Specification, Nov. 2010.
Thermo Scientific Escan Brochure.
Martine Boutron, Claudine Dulat, Jean-Philippe Dubourg: "Toute La Cuisince Francaise Au Micro-Oondes", Publication Jean-Peirre Taillandier, Paris, XP002689393, ISBN: 2 87636 041 1 p. 4, 6, 26, 94, Apr. 1, 1990.

\* cited by examiner

FOOD PREPARATION

RELATED APPLICATIONS

This application is a continuation application of U.S. patent application Ser. No. 12/309,173, filed Jan. 9, 2009, which is a National Phase of PCT Patent Application No. PCT/IL2007/000864 having International filing date of Jul. 10, 2007, which claims the benefit of U.S. Provisional Patent Application No. 60/924,555 filed May 21, 2007, and is a Continuation-In-Part of PCT Patent Application No. PCT/IL2007/000235 filed on Feb. 21, 2007, which claims the benefit of U.S. Provisional Patent Application Nos. 60/775,231, filed on Feb. 21, 2006 and 60/806,860 filed on Jul. 10, 2006. The disclosures of all of these applications are incorporated herein by reference.

FIELD OF THE INVENTION

The present application is concerned generally with food preparation.

BACKGROUND OF THE INVENTION

The microwave oven is a ubiquitous feature in modern society. However, its limitations are well known. These include, for example uneven heating and slow absorption of heat, especially for defrosting. In fact, ordinary microwave ovens, when used for defrosting and even heating, result in foods in which the outside is generally warm or even partly cooked before the interior is defrosted.

A number of papers have been published in which a theoretical analysis of the problem of warming of a cryogenic sample has been carried out. Because of the difficulties of such analysis, such analysis has only been carried out on regular shapes, such as spherical, and ellipsoidal shapes. Experimental attempts have apparently been made on kidney sized specimens, but results of these experiments do not indicate that a viable solution for defrosting kidneys is available. Moreover, there does not appear to be a solution for defrosting other organs or foods of more arbitrary shapes.

Prior art publications include:
S. Evans, Electromagnetic Rewarming: The effect of CPA concentration and radio source frequency on uniformity and efficiency of heating, Cryobiology 40 (2000) 126-138.
S. Evans, et al., Design of a UHF applicator for rewarming of cryopreserved biomaterials, IEEE Trans. Biomed. Eng. 39 (1992) 217-225.
M. P. Robinson, et al., Rapid electromagnetic warming of cells and tissues, IEEE Trans. Biomed. Eng. 46 (1999) 1413-1425.
M. P. Robinson, et al., Electromagnetic re-warming of cryopreserved tissues: effect of choice of cryoprotectant and sample shape on uniformity of heating, Phys. Med. Biol. 47 (2002) 2311-2325.
M. C. Wusteman, Martin et al., Vitrification of large tissues with dielectric warming: biological problems and some approaches to their solution, Cryobiology 48 (2004) 179-189.
A paper entitled "Control of Thermal Runaway and Uniformity of Heating in the Electromagnetic Warming of a Cryopreserved Kidney Phantom" by J. D. J. Penfold, et al., in Cryobiology 30, 493-508 (1993) describes a theoretical analysis and experimental results. While some experiments were apparently made with a kidney sized phantom, the main reported results are with a uniform spherical object.

As reported a cavity was fed with electromagnetic energy at 434 MHz from three orthogonal directions (x, y, z). The x and y feeds were provided from a same generator and a phase change was introduced so that the field was circularly polarized. The frequency was varied in steps of 32 kHz (apparently up to about 350 kHz maximum) to match the input impedance as it changed with increasing temperature.

U.S. Pat. No. 6,249,710 describes using a zip code to estimate elevation and modify microwave oven operation.

All of the above articles and publications are incorporated herein by reference.

SUMMARY OF THE INVENTION

A broad aspect of some embodiments of the invention relates to the preparation of food in industrial and non-industrial settings and to usage of such prepared foods in industrial and non-industrial settings. In particular, some embodiments of the invention relate to control of a heating region in a microwave heater, for example, utilizing uniform heating areas and/or controllably non-uniform heated areas.

While the application provides many examples from microwaves, RF in general may be used, for example, various wavelengths can be used, including meter waves, centimeter waves, millimeter waves and other wavelengths (in vacuum), depending on the application, for example, 1 meter to 0.1 meter or even 0.75 meter to 0.3 meter (ca. between 300 MHz and 3 GHz, or even between 400 MHz and 1 GHz, respectively).

An aspect of some embodiments of the invention relates to control, optionally automatic control of an RF oven according to the geometric shape and/or spatial layout of food items (e.g., items of multiple types). This is in contrast to prior art control which is generally in response to the weight and/or type of food. Optionally, instructions for control and/or information indicative of the geometry and/or layout and/or other preparation related information, such as food type(s), identification and/or heating instructions (optionally instructions relating to energy absorption in the food and/or the rate of energy absorption in the food), are provided with a food package.

An aspect of some embodiments of the invention relates to RF heating control based on temperature of an object as a target to be achieved. In an exemplary embodiment of the invention, the temperature is defined as an average temperature of a significant portion of the object, within uniformity constrains, for example as described herein. This is in contrast with prior art methods that measure the temperature at only a single point while suffering an unknown non-uniformity of temperature also in the vicinity of that point, absent significantly long heat propagation times. Optionally, the temperature is estimated based on RF absorption behavior of the object, and its effect on the oven (e.g., coupling between antenna(s) of the oven). Optionally, more than one object (or more than one portion of a single object) is heated simultaneously, each object (or portion) to a different target temperature. Optionally, alternatively or additionally, the temperature comprises a temperature profile in the object, with at least two parts of the object having different target temperatures.

In an exemplary embodiment of the invention, the temperature of an object is measured simultaneously at multiple locations, for example, 2, 3, 4 or more locations. Optionally, the temperature of the object is estimated to within the uniformity levels discussed herein in regions of radius 2, 3, 4, or more cm surrounding the measuring points.

In an exemplary embodiment of the invention, the temperature of an object is followed in real-time during a preparation process, and the spatial heating pattern is changed in real time (e.g., within less than 0.2, 0.5, 1, 2, 4, 10 seconds or intermediate or greater times) responsive to the temperature (e.g. change the heating rate, change the heating zone, stop the heating to allow processing of the food (e.g. spices, etc) and resume heating, and/or change the environment).

In an exemplary embodiment of the invention, temperature-controlled uniform or predetermined non-uniform heating in a microwave oven is provided. In an exemplary embodiment of the invention, the oven is controlled to achieve a desired temperature uniformity or a particular profile of temperatures in an object being heated. Optionally, such temperatures are maintained for a desired time.

An aspect of some embodiments of the invention relates to using feedback from an RF oven in order to change the heating pattern (profile) and react to the changes during the heating process in the oven. In an exemplary embodiment of the invention, the profile is changed to cause a more uniform heating. Alternatively or additionally, the profile is changed to achieve a desired non-uniformity. In an exemplary embodiment of the invention, the feedback comprises a full s-parameters vs. frequency function which continuously (or is periodically) changes according to the changes in the load (the heated object). Alternatively or additionally, the feedback comprises temperature measurements.

In an exemplary embodiment of the invention, the feedback indicates phase changes and/or temperature changes and/or composition change (e.g. loss of water and/or ions) and/or specific heat constant change and/or dielectric change in the heated material.

In an exemplary embodiment of the invention, the changed profile is a non-binary profile, such that the profile includes areas with at least two distinct non-zero power levels. Optionally, when a profile is changed, an average and/or total power of the profile is changed.

An aspect of some embodiments of the invention relates to utilizing uniform RF heating and controlled non-uniform RF heating in industrial settings. In an exemplary embodiment of the invention, the heating is used for reheating prepared meals, for cooking pre-served meals and/or for thawing frozen foods. In other exemplary embodiment of the invention, the heating is used for sterilizing and/or pasteurization of foods and liquids. In an exemplary embodiment of the invention, uniform heating is provided in regions have dimensions greater than a 2 cm cube. Optionally, the dimensions of uniformity are at least 4 cm, 6 cm, 10 cm, 20 cm or more in at least two dimensions. In an exemplary embodiment of the invention, the uniformity comprises uniformity of energy provision over times on the order of 1-5 seconds or less to within 20%, 10%, 5%, 2%, 1%, intermediate values or better. Optionally, the uniformity provided is uniformity of energy absorption, to similar values. Optionally, the uniformity is uniformity of achieved temperature change, for example, uniform within better than 10, 5, 3 or 1 degrees Celsius. In general, one or more of absorbed energy, temperature and/or additional characteristics, such as water evaporation rate (e.g., detected based on property changes or base don weight loss or based on measuring humidity in outgoing air) are optionally controlled for the heated object(s).

In an exemplary embodiment of the invention, the uniformity is maintained even when the shape and/or content of the food is changed considerably between applications and/or during the heating process.

In an exemplary embodiment of the invention, a same treatment and/or treatment time is provided to objects of different sizes, shapes, composition and/or volume. For example, in an industrial cooking/thawing process, a same time may be allocated for cooking different cuts of meat to a same target temperature and/or condition.

In an exemplary embodiment of the invention, the uniformity corresponds to the boundaries of the heated item (i.e. covering the whole item, optionally with no more than a little excess), for example, an item may be what is found within defined platter compartment boundaries. In an exemplary embodiment of the invention, only a portion (e.g. less than 50%) of the oven cavity volume is uniformly treatable (e.g., as to extant energy field). Optionally, more than 5% contiguous in volume is capable of such uniformity. Optionally, more than 10% is uniform. In some embodiments, the uniformly treatable area is larger than the treated object. In others, it is smaller. In other embodiments, it overlaps with the object.

An aspect of some embodiments of the invention relates to an RF heater having a dedicated function, for example "thaw", "warm-up" or "keep warm". In a thaw device, any object placed within the device is thawed to above the freezing point of object, optionally to a fixed temperature. In a "warm-up" device, any object (e.g., even of different compositions) placed within the device is warmed to a predetermined or selected temperature (e.g. room temperature or sub-zero temperature). Optionally, in a "keep warm" application, more than one object may be kept warm at a different temperature at the same time (using differential heating), or different objects of different compositions are kept at a same or different temperatures. If different humidity is desired for different, each (or one) object is optionally placed in a container having an amount of water therein, which is vaporized by the device and thereby humidify the interior of the package. Optionally, a small number of heating states are provided, noting that by providing uniformity, such heating states can accurately be achieved. For example, there may be fewer than 10, fewer than 6 or 4 or fewer user selectable states. Optionally, the states are selected by pressing a permanent button or a top-level menu item. Optionally, a "keep warm" device brings an object to a desired temperature and keeps it at that temperature as long as needed. Optionally, a "thaw" device can be used to selectively thaw only a part of an object, for example, a part of a cut of meat. The rest of the cut may be simultaneously cooled, for example, using a freezer element, or may be shielded using an RF shield.

An aspect of some embodiments of the invention relates to providing a package, which may be inserted into the RF oven with or without heating instructions which indicate a heating profile desired driving profile for RF signals, rather than mere power as a function of time or a calibration value. In an exemplary embodiment of the invention, the indicated profile comprises an index to or a table of the (frequency/power/time) triples or a simulation (or simulation parameters) which generates RF driving profiles including multiple frequencies. Optionally, at least 3, at least 5 or more distinct frequencies and/or one or more ranges of frequencies are indicated. Optionally, the heating profiles include one or more of number of inputs to use, phase of the input(s) and/or package relative information, such as position and/or movement of the package in the cavity.

Optionally, in this embodiment or in other embodiments where multiple frequencies are applied, the power provided at each frequency is modified to achieve a desired profile, for example reducing power on frequencies that are better absorbed, so as to improve uniformity. Optionally, in this embodiment or in other embodiments where multiple frequencies are applied, the time of delivering each frequency is modified to achieve a desired profile. For example, if each frequency delivers a different power than a low power frequency may be transmitted more often than the high power frequencies. Optionally, the multiple frequencies are applied serially or randomly. Alternatively or additionally, the frequencies are applied simultaneously, for example, by using a signal generator to generate a signal composed of the combined frequencies. Optionally, this is done by converting the signals from the frequency domain to the time domain and using the time domain signal to drive a D/A converter.

In an exemplary embodiment of the invention, a package cooperates with the oven design. Optionally, the package improves uniformity in the oven, for example, by lowing a Q factor of the oven, for example, by a factor of 2, 4, 10, 30 or intermediate or greater ratio, for at least some frequencies producible by the oven. Such a package may be used for a conventional oven or for a heater as described herein. In an exemplary embodiment of the invention, such a package is produces as follows:

(a) measure s-parameters of an oven (e.g. using a waveguide coupler after the magnetron in a conventional MW oven) with a package in the oven;

(b) select a patch material, size, shape and location that would provide the best result (in the terms of analysis of a spectral image), with respect to providing a spectral image that matches oven abilities and which improves uniformity.

Optionally, patch is metallic with a resistive coating and acts as a field adjusting element. Due to the coating, the patch warms up and heats its environment, optionally making a hole and allowing steam evaporation. Optionally, the patch is mounted on a moving element (such as an expanding bag) so that it moves/changes location and thus change sits effect.

An aspect of some embodiments of the invention relates to classifying a food quality and/or safety according to one or more characteristics of heating and/or cooling activities associated with the product, optionally associated as part of a food preparation process. In an exemplary embodiment of the invention, the classifying particularly indicates food quality, for example, providing an indication of ingredient quality (e.g., variety and/or aging for fruit), flavor level and/or type of flavoring (e.g. cuisine), storage parameters (e.g. temperature, humidity, light exposure) preprocessing, and/or texture (e.g., crispy, chewy, soft, whipped and/or crunchy). In other exemplary embodiment, safety issues, such as temperature history and/or microbiological characteristics are indicated.

An aspect of some embodiments of the invention relates to food tracking and preparation, in which food is prepared per order, possibly several hours in advance. In an exemplary embodiment of the invention, the food is prepared at a central facility according to a patron order and the food is delivered, ready to be cooked and/or heated, when the patron arrives. In an exemplary embodiment of the invention, the food is packed to include multiple food items, each of which requires and is provided with different heating profiles, using a single heater, simultaneously or one after another, optionally automatically. Optionally, the food is heated in anticipation of patron arrival. Optionally, the patron is advised when to arrive and pick up food. Optionally, the food is prepared to match patron dietary requirements. In an exemplary embodiment of the invention, a waiting time for a patron from arriving at a restaurant and/or from ordering a meal according to previously provided specifications, is less than 10 minutes, less than 5 minutes or less than 2 minutes, in at least 50%, 80% or an intermediate percentage of the cases.

An aspect of some embodiments of the invention relates to providing heated/thawed food in relatively short times, for example, less than 1 minute, less than 10 seconds, less than 5 seconds or even as short a time as 1 second. Optionally, the heated food maintains uniformity of temperature.

In an exemplary embodiment of the invention, the heated food is provided in a home setting. Alternatively or additionally, the heated food is provided in a restaurant setting, whereby food is heated/thawed as orders corn in, for a same order or for maintaining a small stock of thawed items (e.g., fewer than 10, fewer than 5, fewer than 3 items).

An aspect of some embodiments of the invention relates to a package having stored in association therewith one or more of sweep results, simulation parameters and/or simulation results. In an exemplary embodiment of the invention, when using the package, if such results cannot be achieved, this indicates a problem with package and/or device, which may be indicated to a user. In some cases if the sweep values do not match associated with the package, this is used to indicate a change (possibly for the worse) in the quality of the food. Optionally, the sweep data is used as starting point to reduce the number of sweeps used to provide a reliable estimate.

An aspect of some embodiments of the invention relates to starting a simulation using measured s-parameters. Optionally, the simulation is thereby allowed to be more detailed/focused on some part of the spectrum and/or reduce the number of sweeps needed.

An aspect of some embodiments of the invention relates to an RF heater including a temperature protection feature. Optionally, the feature comprises preventing over-heating of food absent a security code (or other authorization method), to prevent danger to children. Alternatively or additionally, a food quality is maintained by preventing overheating (e.g., absent user authorization or code). Alternatively or additionally, a door to the heater is kept locked until food (and/or part of packaging, depending on embodiment) has cooled down sufficiently.

An aspect of some embodiments of the invention relates to an RF heater including a browning or other heating element, which is selectively activated by selectively applying frequencies to it to which it responds.

An aspect of some embodiments of the invention relates to a method of reducing evaporation in an RF heater, in which a maximum temperature is allowed in a heated object (or significant portions thereon), whether or not the heating is uniform. Optionally, the temperature is selected to be below a boiling point of a liquid. Alternatively or additionally, the temperature is selected according to a temperature-depending evaporation graph of the liquid and a desire maximum evaporation rate. Optionally, higher temperatures are allowed deeper inside the food, where evaporation is reduced by the existence of surrounding food.

A broad aspect of some embodiments of the invention relates to controlling the uniformity of heating of food and/or other objects, such as biological tissue, in a RF oven and/or in a microwave cavity oven. It has been realized that the measures taken by prior art investigators to provide uniform heating were inadequate and could not, by themselves, lead to a viable methodology for uniform heating (or defrosting) of irregular shaped objects such as organs, foods or the like. In particular it was discovered that the prior art suffered from many problems. As used herein, the term irregular means objects that depart from spherical or ellipsoid shape by more than 5% RMS volume.

Conventional microwave ovens are configured to feed into the oven chamber microwave energy that is essentially of a single frequency. Due to device constraints the energy is fed at different frequencies in a small range, normally between 2.4 and 2.5 MHz. The inventors realized that the constraints of using a substantially constant frequency, or even tracking a single dissipation peak in a small frequency range, significantly limited the ability to achieve uniform heating. In fact, heating at a single frequency is found to be one of the main reasons of hotspots. However, using different frequencies (using one or more feeds), may improve the uniformity of heating.

While some proposed prior art heaters did utilize more than one microwave input, the frequency differences between the two inputs are small, less than 6 MHz.

The inventors also found that the structure of the cavity of a conventional microwave oven, and especially the mode structure of the cavity, inherently did not allow achievement of uniform heating. In general, the fields for a given mode in a cavity vary with position and the heating varies with the strength of the fields.

In the art, attempts were made to set the parameters of the microwave oven to match features of a heated object before heating begins. However, during heating features of a heated object (e.g. the tendency to absorb energy of a given frequency) change. Hence the inventors realized that even if a heater was tuned to a heated object before operation, after even a short period of operation the features of the object will have changed and the tuning will no longer be significant.

Another problem is that at times, the absorption at a given location of an object is higher as the temperature increases. This can give rise to a "thermal runaway" problem (even in conventional microwave oven), wherein a relatively hot place absorbs more than a colder one thus continuously increasing the temperature difference. When an effort is made to tune the energy input of the device to the object's impedance, the efficiency of energy delivery into the object may be maximized, but hotspots are also generally increased.

The inventors also noted that known publications dealing with dissipation of energy deal with absorption of energy by the resonator (e.g. surface currents) and not necessarily the object. Furthermore, no attention was drawn to the distribution of dissipation of energy in the object (with the exception of some discussion of penetration depth).

Furthermore, when feeding from multiple directions into a cavity, coupling between the feeds can be a major problem. While for spherical samples these effects are minimal, for even moderate variations from this shape, the coupling between inputs can be quite large. Such coupling caused a number of problems including uneven heating and low power efficiency.

Some exemplary embodiments of the invention deal with one or more of these problems As used herein the term "heating" means delivering electromagnetic (EM) energy into an object. At times, an object may be heated according to the present invention without temperature increase (e.g. when it is concomitantly cooled at a rate that is at least equal to the heating rate or at a phase change where the transmitted energy is taken up for the phase change). Heating includes thawing, defrosting, heating, cooking, drying etc, utilizing electromagnetic energy.

An aspect of some embodiments of the invention deals with more uniform heating of a real life, i.e., non-uniform or irregular geometry object. As used herein the term "object" means any object, including a composition of one or more objects. In an embodiment of the invention, the hottest part of a thawed organ is 6° C. or less, when the coldest part reaches 0° C. This has been confirmed with a cow liver. In experiments with a cow liver, after thawing from −50° C., the range of temperatures in the thawed liver ranged from 8° C. to 10° C. In general, it is desirable to thaw the object such that all parts are above freezing point, to avoid recrystallization. In another embodiment objects are heated to other temperatures (e.g. serving or cooking temperatures, or a subzero temperature being above the temperature of the object before heating), while preserving a post heating uniformity of temperature within 50° C. At times, the uniformity of temperature in a heated (or thawed) object is maintained during heating such that at all times the uniformity of temperature is within 50° C. or even within 10° C. or 5° C.

An aspect of some embodiments of the invention is concerned with sweeping the frequency of the feed (or feeds) over a finite set of frequency sub-bands (i.e. feeding energy into the heater over many frequencies belonging to each sub-band). For example, the dissipation of energy is measured for a band of RF frequencies (e.g. the whole operation range of the heater), and based on the measured results, a finite set of frequency sub-bands is selected. The width of band over which the energy efficiency is measured may for example be up to 2 GHz. At times, the band may have a width between 0.5% (5/1000 [MHz]) and 25% (100/400 [MHz]) of the center frequency.

The measurement may be performed before heating an object, at one or more times during heating the object, or in advance (with a sample object to define the sub-bands for additional essentially identical objects). In an embodiment of the invention, RF energy is fed to the cavity at a plurality of frequencies and power levels responsive to the energy efficiency measurements. For example, the input may be frequency swept. Other methods described below may also be used.

An aspect of some embodiments of the present invention is concerned with assuring the efficiency of the heating process. The heating efficiency is defined as portion of the power generated by an RF energy source (amplifier or other) that is absorbed in a heated object. Higher efficiency of the heating process results in a higher efficiency of the whole process.

In an embodiment of the invention, the power coupled to other feeds at each frequency in certain band ($S_{ij}$) and the return loss at each frequency ($S_{ii}$) are taken into account in determining the heating efficiency and in adjusting certain characteristics of the apparatus, for example, a decision what power at what frequencies to transmit and the timing of transmitting those frequencies at matching powers. Optionally, the absorbed power (input power less coupled power) fed into the system from one feed is adjusted to be the same as the absorbed power fed into each of the other feeds.

In an embodiment of the invention, the width of the efficiency "spectrum" (related to the Q factor) is desirably increased. It is known, from the general theory of RF, that bigger loss in the object (or load) matches lower Q factor. In addition, wide dissipation peak allows for sweeping the frequency about the peak of efficiency, a technique that is believed to further improve the uniformity of heating. Based on the band width, coupling between antennas and surface currents may be reduced. If dissipation is measured (even in an empty chamber) the dissipation peaks caused by antenna's and/or metal components, and/or surface currents appear as narrow dissipation peaks. Thus, by avoiding transmittal in such bands (e.g. width being below 0.25% or even below 0.75%) the energy loss may be reduced. Such measurement may be carried out before and/or during heating of an object or during manufacture of a heater to prevent transmission of such wavelengths. Furthermore, coupling between inputs can be measured during manufacture and bands with high coupling avoided.

In some embodiments of the invention, the power input to the feeds at each transmitted frequency is adjusted to take into account differences in power absorbed by the object being heated, which may serve to provide a uniform or more uniform power absorption. Applicants have found that changing the transmitted frequency in some chosen sub-bands and the input power at each frequency, within a those chosen subbands, optionally about the absorption peaks, results in a change in the heating pattern within the heated object. Thus, by sweeping the frequency in chosen sub-bands, while the powers are properly adjusted, various portions of the object are heated. Keeping the total energy absorbed in different locations of an object uniform results in more even heating of the object.

An aspect of some embodiments of the invention is concerned with the design, construction and calibration of a cavity for RF heating. The cavity may be designed in order to meet certain needs of the present invention.

In an embodiment of the invention, the RF heater comprises one, two or more electromagnetic energy feeds that feed energy to the cavity. Optionally, the feeds are antennas, preferably, wideband and/or directional antennae. Optionally the feeds are polarized in different directions to reduce coupling. These characteristics may be used to lower the coupling and provide a higher degree of freedom in working the invention. In an exemplary embodiment of the invention three feeds which are placed parallel to orthogonal coordinates are used. Optionally two or more than three, for example six feeds are used. Optionally, only two (or in some embodiments even one) feeds are provided, when a lesser uniformity is acceptable and utilizing other aspects of the invention provides sufficient uniformity.

In some embodiments, rather than using an antenna having a single main wire, through which the incoming wave reaches all parts of the antenna structure (which can be an array of antennas) several antennas may be used. This group of antennas may be operated as an antenna array by delivering energy to each of the six antennas at a different time, thus matching the phase resulting from the geometrical design of the complex antenna. This allows summing the RF energy on the object versus summing it before the antenna. Among the benefits of such groups of antennas is the potential reduction of production costs (cheaper amplifiers). In addition, a possibility to control the phases of each input dynamically (and independently) provides an additional degree of freedom in controlling the RF (EM) modes.

Furthermore, it is noted that an antenna array would normally have a bigger area than a single antenna. A possible advantage would be reducing the dependence of location of a heated object on the heating protocol. Possibly two or more of the antenna sources are coherent, making the antenna structures have a common behavior. Furthermore, an antenna array may have a higher directionality or bandwidth and may thus provide advantages in working the invention. Furthermore, arrays can often be made steerable, to provide variable directionality of the antenna and to allow better transfer of energy to the object being heated.

In some embodiments of the invention, a wide band solid state amplifier may be used as an RF energy source. Among the potential benefits is the wide band of frequencies that may be introduced by the solid state amplifier.

In an embodiment of the invention, at least one field adjusting element is placed in the cavity to improve one or more parameters of the heating process (e.g., coupling). Optionally more than one field adjusting element is used. Optionally, any of the boundaries of at least one of the field adjusting elements is electrically floating (not touching the metal walls of the cavity). Optionally any part of the boundaries of at least one element are attached to one of the walls of the cavity. In an exemplary embodiment of the invention, at least one of the elements is not fixed in place, so that it can be moved and/or rotated and/or folded/unfolded to improve one or more parameters of the heating process. In an exemplary embodiment, of the invention, at least one of the elements rotates about an axis. In an exemplary embodiment of the invention, the at least one element slides along a wall of the cavity.

In an exemplary embodiment of the invention the field adjusting element is a metal or other conductor. Alternatively, any material, such as a dielectric, optionally loaded with metal, which is known to perturb electromagnetic fields, can be used as a matching element. The size, structure, place and material of a field adjusting element may affect the effectiveness of the field adjusting element. The effect of the size is dependent also on the location of the element. At one location the effect of the element on the measured energy transfer and other heating parameters and in another it is not. In general, when the element is in the direction of the directivity of the antenna it has a relatively large effect.

Additionally, the relation of height to radius of a chamber, and the geometric design (e.g. box shape vs. cylinder shape) are known affect the dissipation pattern of the chamber and the modes within the chamber. In designing a device according to some embodiments of the present invention, a simulation or trial error measurement of dissipation may be used to select a chamber being better suited, e.g. having wider dissipation peaks (low Q factor) in the object, or more adaptable (i.e. enabling a more dramatic change of the dissipation pattern, using similar field adjusting elements, for example as detailed below) for the desired heating.

An aspect of some embodiments of the invention is concerned with feeds used for feeding a cavity. According to an embodiment of the invention, energy is fed into the cavity via a coaxial input and the center conductor of the coaxial input is extended past the wall of the cavity to form a partial loop. In an exemplary embodiment of the invention, the end of the extension is not attached to the wall of the cavity. Optionally, the partial loop comprises an antenna that radiates toward the position of the object being heated to improve power transfer to the object.

According to another embodiment of the invention, the energy is fed into the cavity via a helical antenna optionally fed via a coaxial input. Optionally, the helix period, its diameter and/or its orientation are adjustable, thereby changing the modes and dissipation within the chamber. In some embodiments of the invention, one or more of the inputs utilize a right hand rotating helix while others utilize a left hand rotating helix. This may minimize coupling between the helices. Alternatively, all helices have the same orientation.

According to yet another embodiment of the invention, fractal antennas are used at one or more of the inputs.

According to some additional embodiments of the invention, different antenna types are used at different input ports.

In accordance with some embodiments of the invention antennas are designed according to a wavelength correction factor that converts the free space center wavelength of an antenna to the effective center frequency in the cavity. The inventors have found that this conversion is substantially independent of the shape or size of the object being heated.

An aspect of some embodiments of the invention relates to a method of controlling the input of electromagnetic energy to a cavity of a heater.

In an exemplary embodiment of the invention one or more characteristics of the heater are adjusted during heating of an object, responsive to changes in the object or during initial adjustment of the heater. In an exemplary embodiment at least one of the (i) position and/or orientation of at least one field adjusting element and/or (ii) at the power of transmission in at least one frequency (or sub-band of frequencies) and/or (iii) characteristics of one antenna structure or more and/or (iv) the location of the heated object are adjusted to improve the net power and/or efficiency and/or uniformity of energy transfer to the object being heated. Optionally, two or more of input frequency, position and/or orientation of at least one field adjusting element are adjusted In an exemplary embodiment of the invention, the frequencies of the inputs are substantially different. While in the prior art cited above, the frequencies are allowed to differ by up to 6 MHz, in the exemplary embodiment of the present invention, the frequencies may differ by 10, 20, 50, 100 or even several hundreds of MHz. This allows for greater flexibility in providing power evenly to the object. In prior art, by immersing the object in an anti-freezing liquid, uniformity of the object was achieved. This resulted in a system in which the characteristics of the liquid were dominant, the frequency changed little during heating, but the object itself was not well matched to the microwave environment. Moreover, at times it is preferred not to subject the object to uniformity induction (e.g. exposure to a fluid that might be hazardous to biological material or consumption or damage the taste or structure of food).

Optionally, the chamber environment is controlled using conventional environmental control elements (such as introduction of humidity, cooling or warming), is provided to the outside of the object. Such external cooling may allow avoiding overheating of the outside. Alternatively, some heating may be provided to the outside to start the defrosting process. This may help prevent recrystallization, or in the case of an egg being boiled, the heating would reduce the temperature gradient (and therefore stress) across the egg shell, thus reducing the chances of cracking and bursting. Accordingly, in some embodiments of the invention, heat radiating, concentrating or reflecting elements are provided on the outside or within the object being heated. Control of the humidity can provide moisture to the object being heated to avoid drying out of the object. For some objects, such as meat, it can cause a moisture retaining layer to be formed on the object, to avoid drying out of the object.

In some embodiments of the invention, RF sensitive objects are placed on or near the object being heated. Such object may act as passive sources. Examples of such sources include a rod of metal, which acts as a dipole radiator or a metal powder which may be used as a reflector or a piece of foil which may shield a small portion of the object being heated.

In an aspect of some embodiments of the invention, the end of heating (e.g. the end of defrost or boiling) is automatically detected and the heating stopped. Alternatively, during heating, the characteristics of the heating process may be adjusted to take the dielectric properties into account (e.g., more power is transmitted at the phase change to avoid spending a long time in this process). In an embodiment of the invention, the phase change is sensed by a change in dielectric properties of the object, for example, as they are represented by various measurements of return loss and coupling of the feeds or a desired operating frequency. Optionally, the object may be encased in a bag which will comprise temperature sensors. Optionally, a thermocouple, IR sensor and/or optical sensor are used to determine end of defrost, cooking or other heating processes.

Optionally, during heating, current temperature of an object is determined, based on the amount of RF power needed for a certain kind of an object and an exact measurement of the RF power absorbed in the object, through the continuous knowledge of the efficiency of power transfer and the power into the feeds of the cavity.

An aspect of some embodiments of the invention relates to providing a microwavable package, wrapper, tag, attachment or other indicator including heating instructions which indicate a desired driving profile for RF signals, rather than mere power as a function of time. In an exemplary embodiment of the invention, the indicated profile comprises an index to a table or a simulation which generates RF driving profiles including multiple frequencies. Optionally, at least 3, at least 5 or more distinct frequencies and/or one or more ranges of frequencies are indicated. Optionally, the driving profiles include one or more of number of inputs to use, phase of the input(s), temporal schedule and/or package relative information, such as package thermal and RF behavior.

In an exemplary embodiment of the invention, resonant circuits are embedded in the object and/or on its surface (as for example in a bag in which the object is packaged). Such sensors may be identified by performing a frequency scan and looking for a change in input impedance at the resonant frequency. Such circuits can be used to identify the object.

If the bag is provided with temperature sensitive elements, then they can also be used to determine temperature (and detect the end and/or progress of the heating process). Optionally, the frequency of these circuits is far from frequencies generally used for heating. Alternatively, the heater is configured so as not to transmit power in the frequency that interacts with the specific resonance structure (while potentially transmitting higher and lower frequencies).

There is thus provided, in accordance with an embodiment of the invention, an electromagnetic heater for heating an irregularly shaped object, comprising:

a cavity within which an object is to be placed;

at least one feed which feeds UHF or microwave energy into the cavity; and a controller that controls one or more characteristics of the cavity or energy to assure that the UHF or microwave energy is deposited uniformly in the object within ±30%, 20% or 10% over at least 80% or 90% of the volume of the object.

Optionally, the at least one feed comprises a plurality of feeds.

In an embodiment of the invention, the one or more controlled characteristics include a frequency of the energy inputted at one or more feeds. Alternatively or additionally, the one or more controlled characteristics include a position or orientation of a field adjusting element inside the cavity. Optionally, the characteristics are controlled to provide a desired net efficiency of power into the cavity.

There is further provided, in accordance with an embodiment of the invention, a method of heating an irregularly shaped object, the method comprising:

placing the object in a cavity of a heater;

feeding UHF or microwave energy into the heater;

controlling one or more of the characteristics of the cavity or energy to assure that the UHF or microwave energy is deposited uniformly in the object within ±30%, 20% or 10% over at least 80% or 90% of the volume of the object.

In an embodiment of the invention, the one or more controlled characteristics include a frequency of the energy inputted at one or more feeds. Alternatively or additionally, the one or more controlled characteristics include a position or orientation of a field adjusting element inside the cavity. Optionally, the characteristics are controlled to provide a desired net efficiency of power into the cavity. Optionally, controlling the frequency comprises feeding energy at a plurality of frequencies covering a band of at least 0.5%.

On an embodiment of the invention, is frozen prior at the commencement of heating. Optionally, the object is heated until thawed. Optionally, the temperature differential in the object when thawing by said heating is complete throughout the object is less than 50° C., 20° C., 10° C., 5° C. or 2° C. In an embodiment of the invention, the frozen object is an animal or human organ.

There is further provided, in accordance with an embodiment of the invention, a method of heating an object in a cavity having at least one RF port, the method comprising:
  feeding energy into at least one port; and
  varying the frequency of the energy during heating of the object so that it varies over a band greater than 0.5%, 2%, 5%, 10% or 20%.

In an embodiment of the invention, the frequency is swept across the band.

Optionally, the band is at least 20 MHz or 100 MHz wide.

There is further provided, in accordance with an embodiment of the invention, electromagnetic heating apparatus, comprising:
  a cavity;
  at least one UHF or microwave energy feed; and
  at least one adjustable field adjusting element situated within the cavity.

Optionally, the at least one field adjusting element is a metal element.

Optionally, the at least one adjustable field adjusting element is rotatable to produce a desired power coupling. Alternatively or additionally, the at least one field adjusting element is slideable to produce a desired power coupling. Optionally, the at least one adjustable field adjusting element comprises a plurality of independently adjustable elements.

There is further provided, in accordance with an embodiment of the invention, a method for electromagnetic heating, comprising:
  placing an object to be heated into a cavity;
  feeding UHF or microwave energy into the cavity; and
  adjusting a characteristic of the cavity to achieve a desired uniformity of heating.

Optionally, the cavity comprises at least one adjustable field adjusting element within the cavity; and
  wherein adjusting the cavity comprises adjusting the at least one field adjusting element.

Optionally, the at least one adjustable field adjustable element comprises a plurality of said elements.

Optionally, adjusting is performed at least once as heating proceeds.

There is further provided, in accordance with an embodiment of the invention, apparatus for electromagnetic heating comprising:
  a cavity;
  a plurality of feeds (optionally 2, 3 or 6) which feed UHF or microwave energy into the cavity;
  a controller that determines the efficiency of net power transfer into the cavity and adjusts the frequency of the plurality of inputs such that the efficiency of net power transfer into the cavity is controlled.

Optionally, the controller adjusts the frequency during the period between commencement and ending of heating.

Optionally, the apparatus comprises at least one adjustable field adjusting element situated in the cavity. Optionally, the controller adjusts the field adjusting elements to enhance the efficiency of net power transfer.

Optionally, the controller adjusts the frequency as heating proceeds.

Optionally, the controller is configured to feed at least two of the frequencies at different power.

Optionally the controller sweeps the frequency as heating proceeds.

There is further provided, in accordance with an embodiment of the invention, a method of electromagnetic heating comprising:
  placing an object to be heated into a cavity;
  feeding UHF or microwave energy into the cavity via a plurality of feeds;
  determining the efficiency of net transfer of energy into the cavity for each of the feeds as a function of frequency over a range of frequencies; and
  adjusting the frequencies of the energy fed, responsive to the determined efficiency function.

In an embodiment of the invention, the method includes adjusting the frequency as heating proceeds.

Optionally, the method includes sweeping the frequency over the band.

Optionally, the method includes adjusting the power at each feed responsive to the efficiency function as the frequency is adjusted.

In an embodiment of the invention, the overall efficiency of energy transfer into the object to be heated as compared to the energy fed into the feeds is greater than 40% or 50%.

There is further provided, in accordance with an embodiment of the invention, apparatus for electromagnetic heating comprising:
  a cavity;
  at least one feeds which feed UHF or microwave energy into the cavity;
  a controller that determines a change in a desired frequency of energy as heating proceeds and changes the frequency by at least one MHz, 10 MHz or 25 MHz.

In an embodiment of the invention, the desired frequency change is determined from a measurement of the net efficiency of energy transfer to the cavity over a band of frequencies.

There is further provided, in accordance with an embodiment of the invention, a method of electromagnetic heating comprising:
  placing an object to be heated in a cavity; and
  changing a frequency of UHF or microwave energy fed into the cavity for heating the object by at least 1 MHz, 10 MHz, 25 MHz or 25 MHz during the course of the heating.

In an embodiment of the invention, the desired frequency change is determined from a measurement of the net efficiency of energy transfer to the cavity over a band of frequencies.

In an embodiment of the invention, the frequency is swept over at least one sub-band of frequency of at least 5 MHz.

In an embodiment of the invention, the power is adjusted for each frequency responsive to the measurement of the net efficiency.

There is further provided, in accordance with a method of electromagnetic heating comprising:
  placing an object to be heated into a cavity; and
  feeding UHF or microwave energy into the cavity via a plurality of feeds;
  wherein the frequencies of the energy fed to two of the feeds differs by at least 8 MHz, or 20 MHz.

In an embodiment of the invention, the net energy fed into the object from each of the plurality of feeds is equal to within 25%.

There is further provided, in accordance with an embodiment of the invention, a method of electromagnetic heating, comprising:
  subjecting an object that is to be heated to UHF or microwave energy in an amount capable of heating the object;
  determining a characteristic of the heating process that is responsive to a change in state of the object; and adjusting the heating when a desired state is achieved.

There is further provided, in accordance with an embodiment of the invention, a method of electromagnetic heating, comprising:

subjecting an object that is to be heated to UHF or microwave energy in an amount capable of heating the object;

determining an amount of energy that is absorbed by the object; and adjusting the heating when a desired amount of energy is absorbed.

There is further provided, in accordance with an embodiment of the invention, apparatus for electromagnetic heating comprising:

a cavity;

at least one feed for UHF or microwave energy; and a source of static or low frequency electric or magnetic field arranged to subject an object in the cavity to an electric or magnetic field, effective to affect the heating of an object in the cavity.

There is further provided, in accordance with an embodiment of the invention, a method of electromagnetic heating comprising:

subjecting an object to be heated to UHF or microwave energy in an amount suitable for heating the object; and subjecting the object during heating to a static or low frequency electric or magnetic field effective to increase the uniformity or efficiency of heating.

There is further provided, in accordance with an embodiment of the invention, apparatus for electromagnetic heating comprising:

a cavity;

at least one feed into the cavity that includes an antenna including a radiating element chosen from the group consisting of a patch antenna, a fractal antenna, a helix antenna, a log-periodic antenna, a spiral antenna and a wire formed into a partial loop that does not touch a wall of the cavity.

In an embodiment of the invention, the radiating element comprises an array of radiating elements.

In an embodiment of the invention, the at least one feed comprises a plurality of feeds and wherein the radiating elements of at least two feeds is different.

There is further provided, in accordance with an embodiment of the invention, a method of producing selective heating on a portion of an irradiated object comprising:

providing an object to be heated;

providing an energy concentrating element on, in or near the object;

placing the object and the energy concentrating element in a resonant cavity; and irradiating the object and the element to cause a concentration of energy at selected places in the object.

Optionally, the energy concentrating element is irradiated at a frequency at which it is resonant.

Optionally, the object and the element are placed in the cavity separately.

There is further provided, in accordance with an embodiment of the invention, an RF heater comprising:

a resonant cavity;

at least one source of microwave or UHF energy;

at least one feed for feeding energy generated by the at least one source into the cavity;

a power supply for the at least one source; and a housing for the RF heater, wherein the RF heater weighs 15 Kg, 10 Kg, 7 Kg or less.

In an embodiment of the invention, the resonant cavity has a volume of at least 20, 30 or 40 liters.

There is further provided, in accordance with an embodiment of the invention, a method of determining the temperature of a portion of an object being heated in an RF heater, comprising:

placing the object in resonant cavity of the heater;

providing a temperature sensitive sensor having a resonant frequency that varies with temperature;

irradiating the object with UHF or Microwave power via a feed; and determining the temperature based on energy reflected from the feed.

In an embodiment of the method comprises:

placing a non-temperature sensitive resonant element adjacent to the temperature sensitive element, wherein determining comprises determining based on a frequency difference between resonances of the temperature sensitive sensor and the non-temperature sensitive resonant object as indicated by said reflected energy.

In embodiment of the invention, the method comprises: controlling characteristics of the irradiation of the energy responsive to the determined temperature.

There is further provided, in accordance with an embodiment of the invention, a method for RF heating of an object in a cavity, comprising:

irradiating the object with UHF or Microwave energy;

adjusting the humidity of or cooling the air in the cavity.

In an embodiment of the invention adjusting the humidity of or cooling the air in the cavity comprises adjusting the humidity of the air in the cavity. Additionally, the temperature may be adjusted. Alternatively or additionally to adjusting the humidity adjusting the humidity of or cooling the air in the cavity comprises cooling the air in the cavity.

There is further provided, in accordance with an embodiment of the invention, an RF heater comprising:

a resonant cavity;

at least one RF source having a power output of at least 50 watts and being sweepable over a frequency range of greater than 0.5% with an efficiency of greater than 40% at least one feed for feeding energy generated by the at least one source into the cavity;

a power supply for the at least one source; and a housing for the RF heater.

Optionally, the RF source comprises:

a signal generator that produces selective frequencies within the band; and an RF amplifier.

Optionally, the at least one RF source comprises a plurality of sources.

Optionally, the at least one feed comprises a plurality of feeds.

Optionally, the at least one RF source comprises one or both of a UHF source or a Microwave source.

Optionally, the source is sweepable over a frequency range greater than 2%, 5%, 10%, 20% or 25%.

Optionally, the power output available for each feed is at least 200 Watts or 400 Watts.

There is further provided, in accordance with an embodiment of the invention, an RF heater comprising:

a resonant cavity;

at least one RF source having a power output of at least 50 watts and being sweepable over a frequency range of greater than 200 MHz with an efficiency of greater than 40% at least one feed for feeding energy generated by the at least one source into the cavity;

a power supply for the at least one source; and a housing for the RF heater.

Optionally, RF source comprises:
a signal generator that produces selective frequencies within the band; and
an RF amplifier.

Optionally, the at least one RF source comprises a plurality of sources.

Optionally, the at least one feed comprises a plurality of feeds.

Optionally, the at least one RF source comprises one or both of a UHF source or a Microwave source.

Optionally, the power output available for each feed is at least 200 Watts or 400 Watts.

There is further provided, in accordance with an embodiment of the invention, a package suitable for use in an RF heating oven, comprising at least one indicator having a machine-readable indication of heating instructions thereon, which indication indicates uniform or controlled heating instructions.

In an embodiment of the invention, the machine readable indication is readable by a scanning RF field in an RF cavity.

There is also provided in accordance with an exemplary embodiment of the invention, a method of heating using an RF heating oven, comprising:
(a) providing a general purpose RF heating oven, designed to accommodate and heat multiple different items;
(b) providing at least one food item to be heated, said item having a spatial geometry; and
(c) automatically or manually setting at least one parameter of the RF heating oven, optionally in addition to time and/or power, in response to a spectral image resulting from said spatial geometry and other characteristics of an object to be heated.

In an exemplary embodiment of the invention, said spatial geometry comprises multiple different food items arranged together and optionally package elements.

There is also provided in accordance with an exemplary embodiment of the invention, a method of controlling an RF heating oven, comprising:
(a) heating a food item using an RF heating oven;
(b) receiving feedback on the heating process by the oven; and
(c) automatically changing a heating profile of the oven in response to said feedback.

In an exemplary embodiment of the invention, said changing comprises increasing a uniformity of said heating. Alternatively or additionally, said changing comprises reducing a uniformity of said heating.

There is also provided in accordance with an exemplary embodiment of the invention, a method of heating food using an RF heating oven, comprising:
(a) providing a food item having an regular or irregular shape;
(b) selecting a desired temperature profile for the item or a heating speed and or wanted uniformity extent; and
(c) applying the heating profile using an RF heating oven to achieve a wanted temperature profile.

In an exemplary embodiment of the invention, the method comprises maintaining said temperature profile for at least 10 or even 2 minutes using said RF heating oven.

In an exemplary embodiment of the invention, said food item comprises a plurality of food items, each one of which is to be heated differently.

There is also provided in accordance with an exemplary embodiment of the invention, a package suitable for an RF heating oven, comprising at least one indicator having a machine-readable indication of heating instructions thereon, which indication indicates uniform or controllable non-uniform instructions.

There is also provided in accordance with an exemplary embodiment of the invention, a method of food classification, comprising:
(a) processing food including at least one of freezing, thawing and cooking;
(b) tracking actual behavior of the food during at least one of said freezing, thawing and cooking; and
(c) generating a food quality/safety indication other than safety based on said actual behavior.

There is also provided in accordance with an exemplary embodiment of the invention, a method of food provision, comprising:
(a) preparing food at a first location, optionally at least an hour before expected consumption thereof;
(b) transporting the food in an unread-to-eat form to a second location;
(c) processing the food at the second location using a RF heating oven with controllable uniformity, to make the food ready to eat; and
(d) picking up of the food with a short wait time of less than 15 minutes.

There is also provided in accordance with an exemplary embodiment of the invention, a method of RF heating of items, comprising:
(a) inserting a first item into an RF heater;
(b) heating the item using the RF heater to achieve a certain effect; and
(c) repeating (a)-(b) at least 3 times, with items of different shapes, achieving the same effect and without user reconfiguration of the RF heater.

Optionally, said repeating comprises at most the user operations inserting an item and activating the RF heater.

There is also provided in accordance with an exemplary embodiment of the invention, an RF heater comprising:
(a) a user interface having fewer than 20 settings accessible at 2 levels of menu or interaction;
(b) an RF heating element; and
(c) a controller adapted to react to an item inserted into the heater and control the heater according to the user setting, said controller adapted to control said heater in at least 30 different ways depending on the item and the setting.

Optionally, said interface includes fewer than 10 temperature settings.

Alternatively or additionally, said interface include a single control for thawing.

There is also provided in accordance with an exemplary embodiment of the invention, an RF heater comprising:
(a) an RF heating element; and
(b) a controller adapted to control said element so as to maintain a temperature of an item placed in said heater to within 10 degrees Celsius of a defined temperature.

Optionally, said heater is adapted to at least one of thaw or heat said item placed therein.

Alternatively or additionally, said heater is adapted to provide said maintaining on demand.

There is also provided in accordance with an exemplary embodiment of the invention, an RF heater, comprising:
(a) an RF heating element; and
(b) a controller,
wherein said controller controls said heating element to heat an item of at least 200 gr placed therein within 1 minute by at least 20 degrees Celsius.

Optionally, said RF heating element has a power of at least 4 KW

Alternatively or additionally, said RF heating element has a power of at least 10 KW Alternatively or additionally, said RF heating element has a power of at least 20 KW Alternatively or additionally, said controller controls said element to thaw said item.

Alternatively or additionally, said controller controls said element to have an efficiency of greater than 50%.

There is also provided in accordance with an exemplary embodiment of the invention, a package for RF heating, comprising:

a package body;

a food item within said body; and at least an indication associated with said package and indicating one or more of a spectral image, s-parameters and heating instructions.

There is also provided in accordance with an exemplary embodiment of the invention, a method of heating a package, comprising:

(a) inserting a package into an RF heater;

(b) reading an indication of at least one of a spectral image, s-parameters and heating instructions; and (c) controlling said RF heater according to said read indication.

Optionally, said controlling comprises determining that there is a problem with one or more of the package, the RF heater and a food item in the package.

Alternatively or additionally, said controlling comprises using said indication as an input to a control simulation used to decide on controlling.

Alternatively or additionally, said controlling comprises using said indication to reduce a number of sweeps of said package to determine said control.

There is also provided in accordance with an exemplary embodiment of the invention, a method of using an RF heater, comprising:

(a) inserting an item to be heated into an RF heater; and (b) preventing heat damage to a user or the food, by said RF heater.

Optionally, said preventing comprises locking a door of said heater responsive to a temperature of said item.

Alternatively or additionally, said preventing heating of said food to a certain temperature absent authorization.

There is also provided in accordance with an exemplary embodiment of the invention, an RF heater, comprising:

(a) an RF heating element adapted to provide power at a plurality of frequencies;

(b) a secondary heating element configured to be activated by only certain of said frequencies; and (c) a controller adapted to determine which frequencies to use for said RF heating element according thereby setting a time of operation of said secondary heating element.

There is also provided in accordance with an exemplary embodiment of the invention, a method of reducing evaporation in an RF heater, comprising:

(a) providing an item to be heated;

(b) heating said item while ensuring a maximum temperature in at least part of said item does not raise above a threshold temperature where increased evaporation occurs.

Optionally, said heating comprises heating while maintaining uniformity of heating.

There is also provided in accordance with an exemplary embodiment of the invention, an RF heater, comprising:

(a) an RF heating element; and (b) a controller configured to control said RF heating element, said controller including at least two heating modes with different tradeoffs between speed of heating and uniformity of heating.

Optionally, the heater includes a user interface for selecting which mode to use.

There is also provided in accordance with an exemplary embodiment of the invention, a method of cooking meat, comprising:

providing at least 500 gr of uncooked meat; and cooking said meat in an RF heater, using RF energy to provide cooking of at least 80% of said meat, in less than 20 minutes.

Optionally, said time includes thawing.

Alternatively or additionally, said time is less than 10 minutes.

There is also provided in accordance with an exemplary embodiment of the invention, a method of answering orders in a food-serving establishment, comprising:

(a) receiving an order;

(b) thawing at least one item in response to said request; and (c) using said item for putting together an order within less than 20 minutes form receiving said order.

Optionally, said put-together order is said received order.

Alternatively or additionally, said item is used in less than 10 minutes from receiving of said order.

Alternatively or additionally, said item is used in less than 5 minutes from receiving of said order.

BRIEF DESCRIPTION OF THE DRAWINGS

Exemplary non-limiting embodiments of the invention are described below with reference to the attached figures. The drawings are illustrative and generally not to an exact scale. The same or similar elements on different figures are referenced using the same reference numbers.

FIG. 18A and FIG. 18B are graphic representations of uniform and non-uniform heating of a chunk of meat, cut as a steak, in which FIG. 18A shows the temperature changes during heating at two locations within the steak, a fat portion and a meat portion; and FIG. 18B depicts the temperature differences between the two locations; and FIG. 19A and FIG. 19B are graphic representations of uniform heating of a chunk of meat, in which FIG. 19A shows the temperature changes during heating at three different locations within the meat and FIG. 19B depicts the temperature differences between two pairs of the above three locations.

DETAILED DESCRIPTION OF EXEMPLARY EMBODIMENTS

Figure 1A:
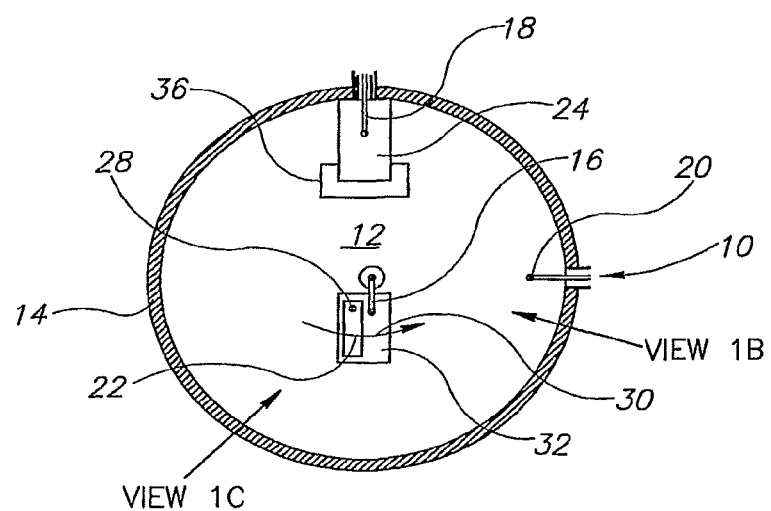
FIGS. 1A, 1B and 1C are respective schematic top and side section views of a cavity 10, in accordance with an exemplary embodiment of the invention.

The present application describes various methods of processing foodstuff and/or other materials. Prior to detailing such methods (e.g., in FIG. 13 and on), a description is provided of exemplary methods of control of heating in an RF cavity which is useful for some embodiments of food preparations and for other uses as well.

The present application describes a number of advances in the field of RF heating (e.g. microwave or UHF) heating. While, for convenience these advances are described together in the context of various apparatus and methods, each of the advances is generally independent and can be practiced with prior art apparatus or method (as applicable) or with a non-optimal version of the other advances of the present invention.

Thus, for example, parts of the method of adjusting the input power can be used with the prior art apparatus of Penfold, et al., referenced above. Conversely, the inventive apparatus of the present invention (or parts thereof) can be used with the method of Penfold et al. It is expected that these combinations will not be ideal, but they are expected to give improved results over the prior art apparatus and methods.

Furthermore, advances described in the context of one embodiment of the invention can be utilized in other embodiments and should be considered as being incorporated as optional features in the descriptions of other embodiments, to the extent possible. The embodiments are presented in somewhat simplified form to emphasize certain inventive elements. Furthermore, it is noted that many features that are common to most or all embodiments of the invention are described in the Summary of the Invention and should also be considered as being part of the detailed description of the various embodiments.

The following are believed to novel features or variations present in some or all the embodiments described. It is understood that not all of these features may be present in any particular embodiment and that not all features are described for every embodiment for which they are applicable.

1) An apparatus and method that allow for RF heating an irregular object such that the temperature of the object is uniform within 50° C. (optionally, to within 10, 6, 4 or 2° C.) when heating is completed. Exemplary embodiments provide this uniformity mainly by directly RF heating the object such that over 50% of the heating is by direct RF heating and not by conduction from other portions of the device. In some embodiments of the invention, such direct RF heating can reach 70, 80, or 90 or more percent.

2) An apparatus that includes field adjusting elements inside the cavity and method of designing and using same.

3) A heating apparatus with one or more coupling antenna for coupling energy into the cavity; a method of designing said antenna; and method of feeding energy to the heater including a method of tuning the radiated pattern of the antenna. This includes, utilizing an antenna array (with one or more feeds, having controlled phases), loop antenna, wide band antenna, fractal antenna, directional antenna, helix antenna, operating the antennas separately or coherently, designing the antenna to obtain a desired radiated pattern etc.

4) An apparatus and method to gain knowledge of a heating process before, and potentially also several times during, heating (e.g. several times a second) using a measurement of the efficiency of absorption of energy in the object being heated as function of frequency 5) An apparatus and method that is adapted to control one or more characteristics of the heating process, for example the amount of power absorbed in the heated object, based on the measurement of energy absorption efficiency (e.g. by transmitting power to compensate for the variations of energy absorption). This may be done by adjusting, for example, input power at each transmitted frequency and/or choosing frequencies to be transmitted and/or moving the field adjusting element's and/or moving the heated object and/or changing the antennas characteristics. This may be done before operation, and preferably also one or more times during operation (e.g. several times a second), based on measurements of energy absorption during heating or during a short hiatus in the heating.

6) An apparatus and method for applying a DC or low frequency electric (e.g. below 300 MHz, or below some other value substantially lower that the heating frequencies used) or magnetic field to the object during RF heating. Such application is believed to change the dielectric properties of the object being heated and this provides yet another method of adjusting the power provided to the object being heated.

7) An apparatus and method in which during operation the transmitted frequencies and/or power from one or more feeds are varied in a controlled manner to get a desired heating pattern (e.g. by more than 1, 2 or 5 MHz). This variation may occur several times during operation (e.g. several times a second). In an embodiment of the invention, the desired pattern is a uniform heating pattern.

8) Apparatus and method of controlling heating based on reading of dielectric characteristics of the heated object. Reading may be obtained one or more times during heating (e.g. several times a second). For example end of thawing or boiling process, when a phase change is sensed. This can implement a cessation of heating.

9) An electromagnetic heater including multiple inputs in which the frequencies of the inputs are different by more than 5, 10 or 25 MHz.

10) An electromagnetic heater including multiple inputs in which the frequencies of at least one of the inputs changes dynamically during heating such that the frequencies at the inputs vary by 5 MHz or more.

11) An apparatus that utilizes a wideband and high efficiency (above 40%) solid state microwave amplifier to feed energy into the cavity and optionally utilize waste heat generated by the generator to heat the air in the cavity.

12) An apparatus that utilizes wasted heat generated by the RF energy generator to heat a medium, for example air in the cavity, or water, as in a water heater.

13) A method of causing a resonance structure and/or designed pattern, inside a resonator to radiate by (selectively or generally) irradiating said resonance structure and/or designed pattern thus using it as a radiation source (i.e. creating a passive source) and an apparatus comprising same.

14) Apparatus and method of using RF reflecting object, such as metals, for concentration of energy in close environment of these objects, inside a resonator, for example within the heated object or in the close environment of the heated object.

15) Apparatus and method of high-efficiency (at least 50%, at times above 70% or even 80%) RF heater. The efficiency is defined as power absorbed in the object versus power at the output of the power source. This opens the possibility of a heater that operates from a solar energy source.

16) An RF heater weighing less than 15 Kg, or even less than 10 Kg. In accordance with some embodiments of the invention a the use of a high efficiency solid state amplifier rather than a microwave tube allows for using a low weight DC power source instead of the heavy duty transformer. This heat saving is additional to the replacement of a heavy magnetron with a light solid state amplifier. Furthermore, the high efficiency eliminates the need for a heat sink, e.g. by using the resonator as a heat sink. In some embodiments of the invention, the requirement for a heat sink is obviated or partly reduced by feeding the waste heat from the amplifier back into the microwave cavity.

17) Apparatus and method of temperature information of a heated object using a TTT (a temperature sensitive, preferably passive Temperature transmitting tag the resonance of which changes due to temperature changes or which transmits the temperature information using a modulated response). This may be done if the TTT frequency is remote from the transmittal range of the device, or if the TTT's frequency is within the device's band width, and avoiding the specific TTT frequencies during heating. In some embodiments of the invention a tag having two resonant elements, one that is temperature sensitive and one that is not can be used since measurement of frequency difference is more accurate than measurement of absolute frequency.

18) An apparatus and method for RF heating including means for chamber environment control (e.g. introduction and/or removal of humidity, cooling and/or warming etc.). For example, in the case of an egg being boiled, heating would reduce the temperature gradient (and therefore stress) across the egg shell, thus reducing the chances of cracking and bursting. Optionally, the air temperature in the chamber may be varied with time, depending on the present temperature of the object and objectives such as causing condensation that closes the object being heated (such as meat).

19) An apparatus in which the power absorbed by the object being heated can be calculated based on knowledge of power input and efficiency of power transfer to the object being heated. This allows for the calculation of a current temperature and/or a turn off-time based on actual heating rather than some estimated heating time as presently used with microwave cookers.

Figure 1B:
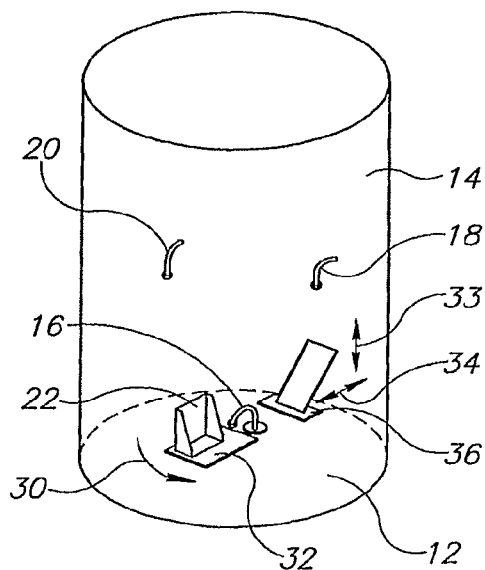
Figure 1C:
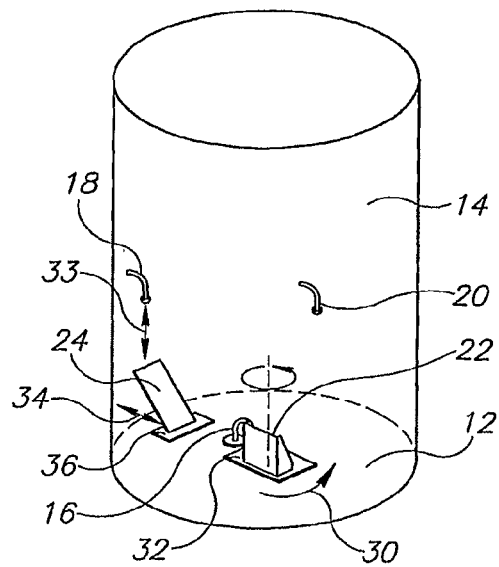

FIGS. 1A, 1B and 1C show respective top and side section views of a cavity 10, in accordance with an exemplary embodiment of the invention.

Cavity 10, as shown is a cylindrical cavity made of a conductor, for example a metal such as aluminum, and is resonant in the UHF or microwave range of frequencies, optionally between 300 MHz and 3 GHz, more preferably between 400 MHz and 1 GHZ. In some embodiments of the invention, the cavity is a spherical, rectangular or elliptical cavity. However, it should be understood that the general methodology of the invention is not limited to any particular resonator cavity shape.

Figure 4A:
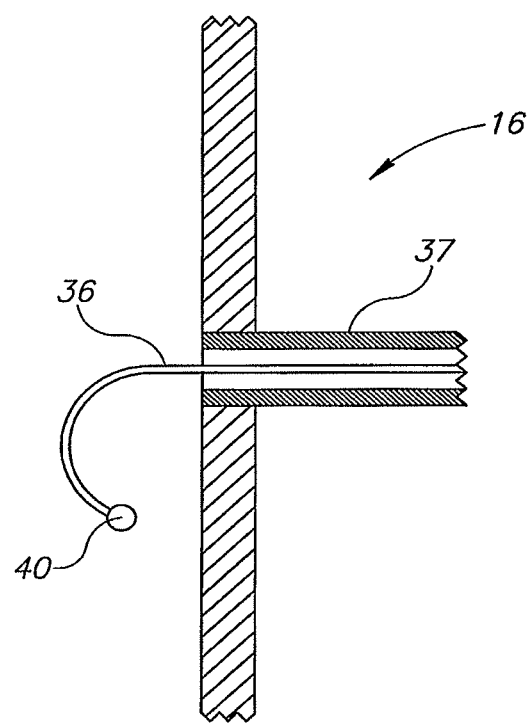
FIG. 4A is a schematic drawing of an antenna useful for coupling energy into the cavity, in accordance with an embodiment of the invention.
Figure 4B:
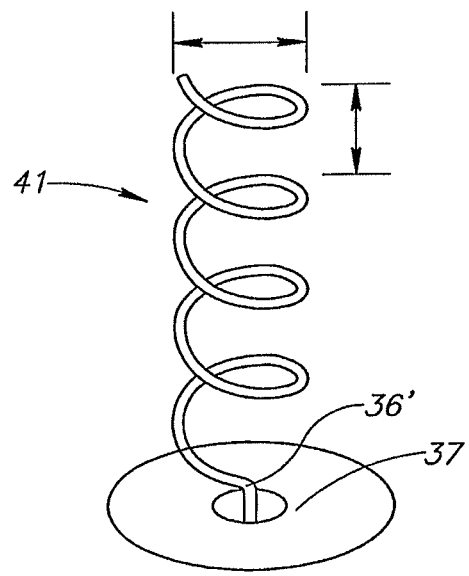
FIG. 4B is a schematic drawing of a helical antenna useful for coupling energy into the cavity, in accordance with an embodiment of the invention.
Figure 4C:
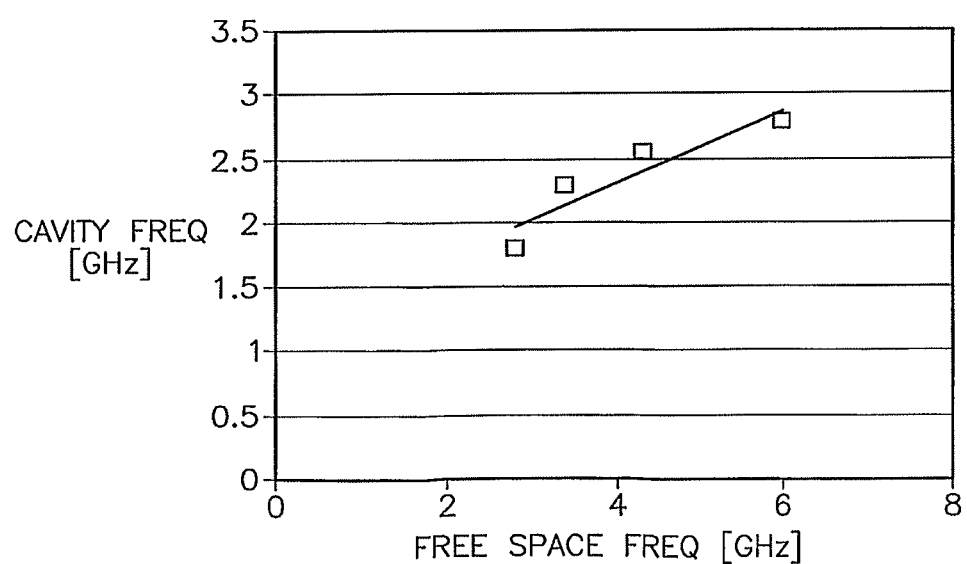
FIG. 4C shows a graph of correlation of free space matched frequencies and cavity matched frequencies of a helical antenna feed.

On one end 12 of the cylinder and on two sides of the cylindrical portion 14 feed antennas 16, 18 and 20 are positioned to feed energy at a frequency which is optionally chosen using the methods described below. Various types exemplary but not limiting antennae useful in carrying out the invention are shown in FIGS. 4A-4C.

Figure 2A:
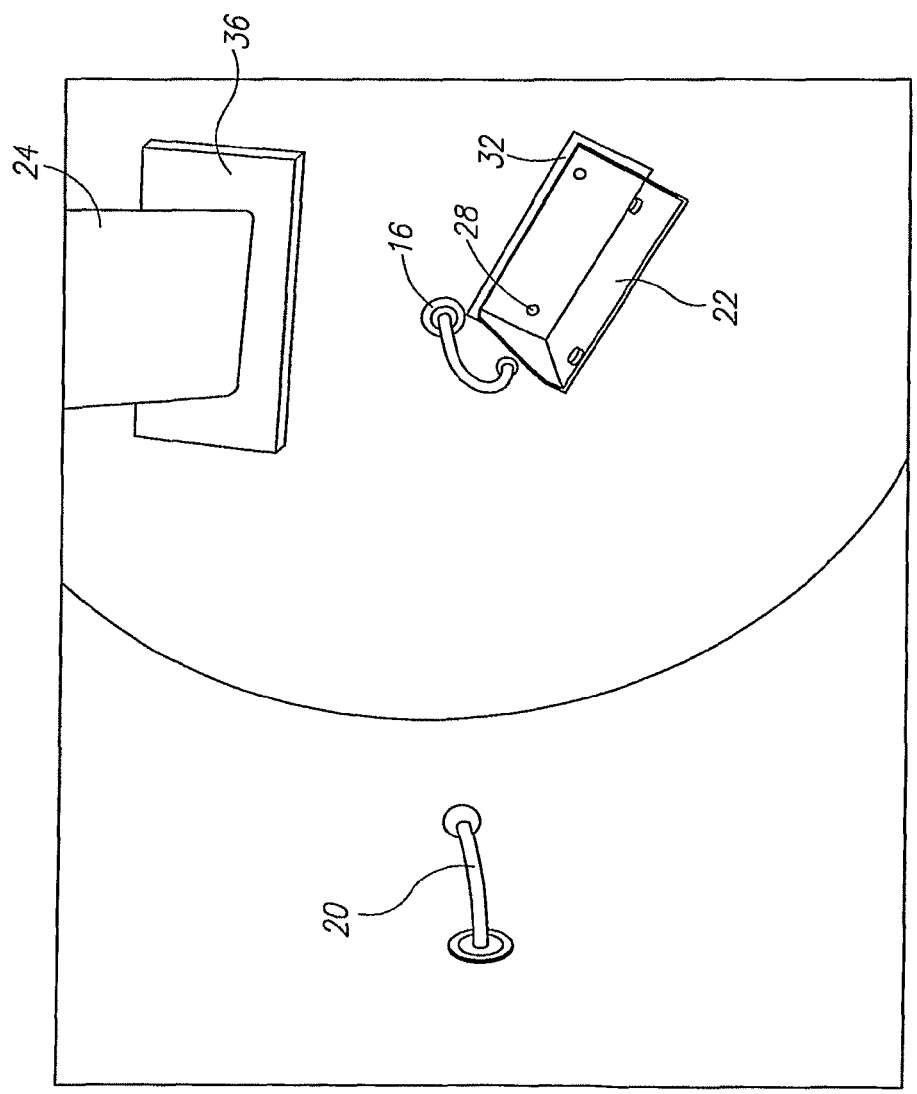
FIGS. 2A and 2B show two exemplary matching elements, in accordance with an embodiment of the invention.

In an exemplary embodiment of the invention, one or more matching elements 22, 24 are placed inside the cavity, optionally near the feed antennas. Two types of field adjusting elements are shown, however, other shapes and materials can be used. First field adjusting element 22, shown more clearly in FIG. 2A is situated on end 12 of cavity 10. In this embodiment the element is rotatable about an axis 28 attached to the end, in a direction 30. Optionally, it is insulated from the end by an insulating sheet 32 which couples element 22 capacitively to end 12. Alternatively it is conductively attached.

It is believed that element 22 (as well as the other field adjusting element) has a dual effect, when properly adjusted. On the one hand it changes the modes of the cavity in a way that selectively directs the energy from the feeds into the object to be heated. A second and related effect is to simultaneously match at least one of the feeds and reduce coupling to the other feeds.

Figure 2B:
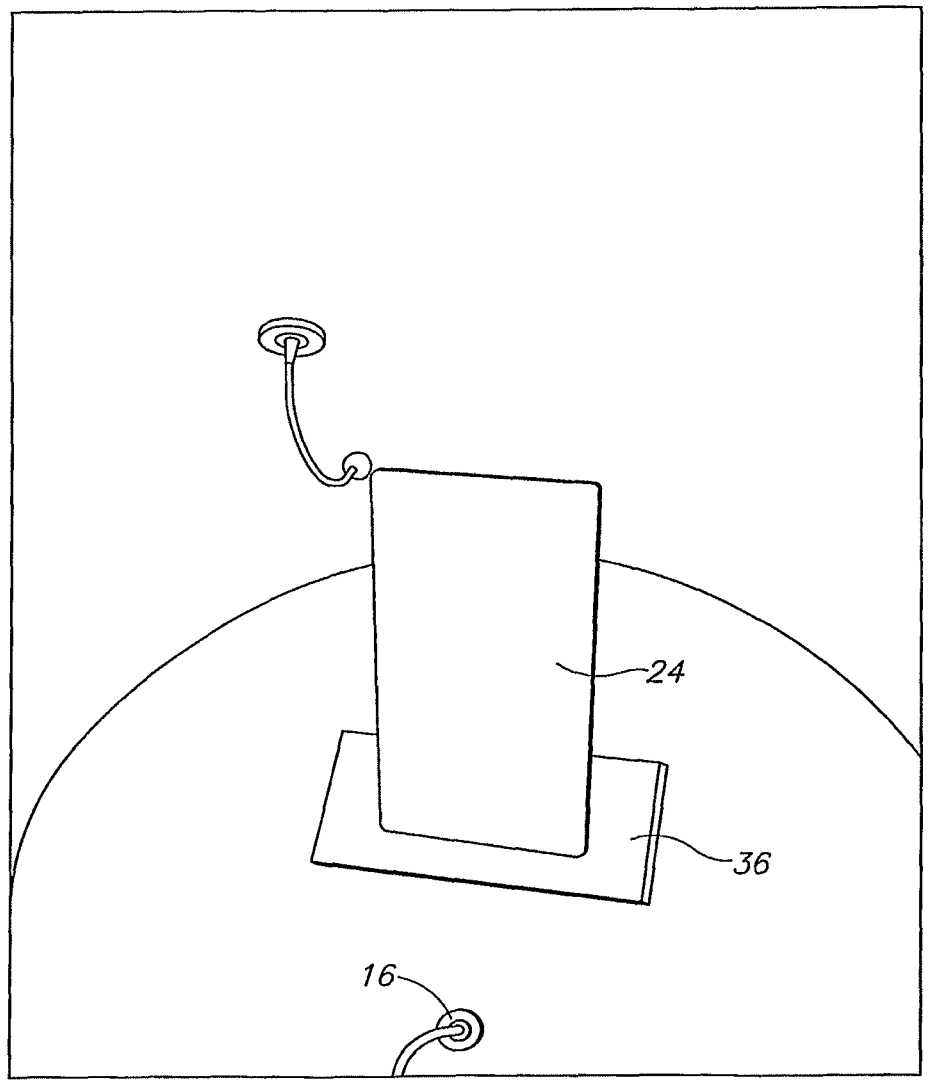

Field Adjusting element 24, shown more clearly in FIG. 2B is situated between feed 18 and end 12. One end of the element optionally is electrically attached to cylindrical portion 14 of the cavity. The other end of element 24 is spaced and insulted from end 12 by insulating material 36. It is free to slide along end 12 and cylindrical portion as shown by arrows 33 and 34. This sliding changes the spectral variation of the energy absorption efficiency.

Figure 3:
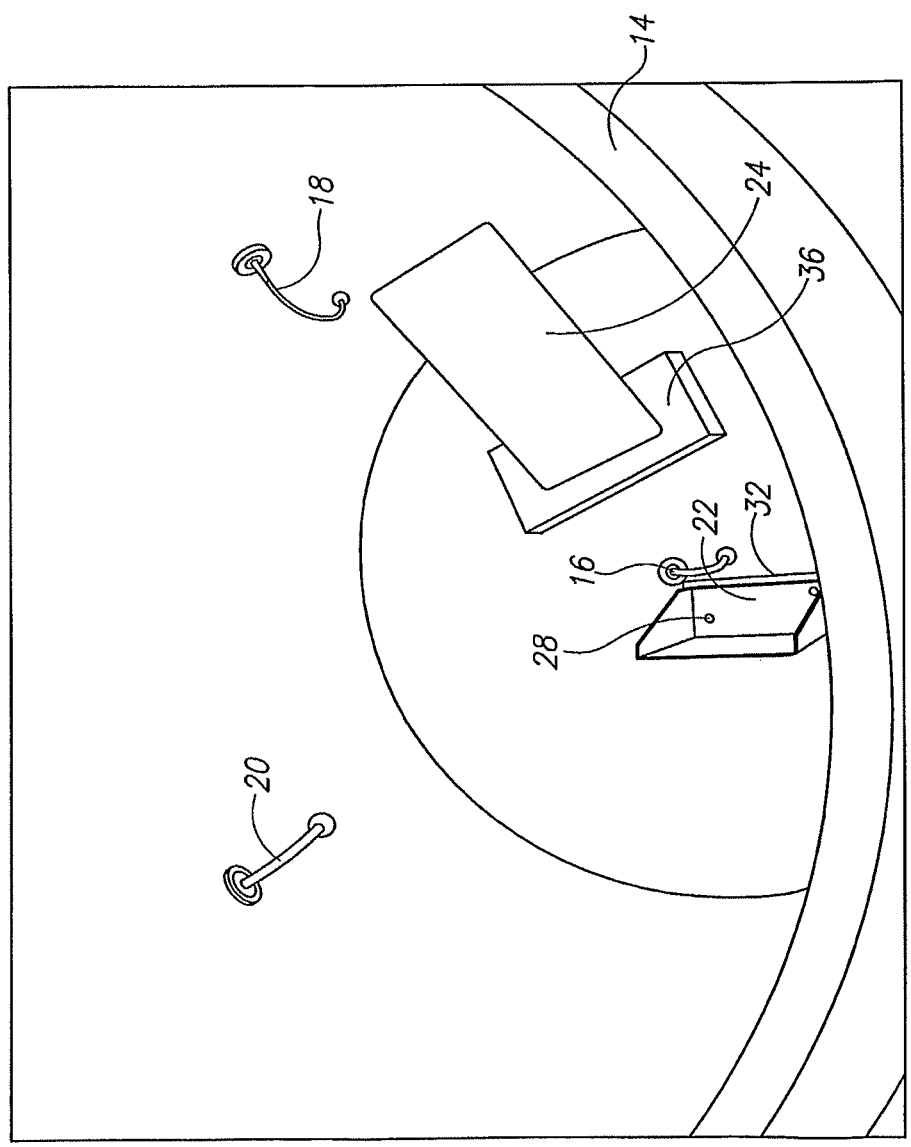
FIG. 3 is a schematic isometric drawing of the interior of the cavity of FIG. 1.

FIG. 3 is a perspective drawing of the interior of the cavity to more clearly show the position and orientation of the feed and elements.

FIGS. 4A-4H show three different types of antennas that are useful in carrying out the invention. These antennas are either novel per se, or if known have never been used for feeds in a microwave oven or heater, especially in a cavity type heater. In general, in most microwave cavity type heaters, the feeds used are not directional to any great extent and not wideband, as defined in free air. The object of the feeds to excite the modes of the cavity. Since the cavities of the prior art are excited at a single frequency or a narrow band of frequencies, the antennas were designed specifically to excite these modes. In addition, prior art microwave cavities, use waveguides or loop antennas which are not designed to lower the coupling of energy from one feed to another (they generally have only a single feed). The present inventors have discovered that the use of directional antennae and/or wideband antennae allows for better coupling to the heated object and lower coupling to other feeds.

In some embodiments the antennas are supplied as arrays. There are some advantages in using an antennas array. The band may be larger and there is a lower dependence of the heated object location on the results. The directivity may be controlled, even adjusted during heating. It is possible to control the phase of every single antenna of the array, controlling the RF mode. It is possible to alter the antenna structure, for example, using the helix antenna, the radius and the height of the antenna may be changed in order to tune the impedance and change the RF mode.

FIG. 4A shows an antenna useful for coupling energy from feeds 16, 18 and 20 into cavity 10, in accordance with an embodiment of the invention. As shown feed 16 includes a coaxial feed 37 with its center conductor 36 bent and extending into the cavity. The center conductor is bent but does not touch the walls of the cavity. Optionally, the end of the wire is formed with a conductive element 40 to increase the antenna bandwidth. The present inventors have found that antennas of the type shown are able to couple energy better to an irregular object in the cavity. It is believed that such antennas transmit directionally and if the bend is aimed toward the object being heated, then coupling to the object (as opposed to coupling to the cavity) will be improved.

FIG. 4B shows a helix antenna useful for coupling energy from feeds 16, 18 and 29 into cavity 10, in accordance with an embodiment of the invention. As shown feed 16 include a coaxial feed 37 with its center conductor 36' having an extension that is formed into a helix. This antenna can be designed for matching into free space over a relatively wide band of frequencies (such as that useful for the present invention) and can be made more or less directional by changing the number of turns. The free space design is then adjusted for the presence of the cavity as described below with respect to FIG. 4C. The graph of FIG. 4C shows experimental results for a helix of 7 turns, with a diameter equal to the free space wavelength and a turn pitch of less than 0.2 wavelengths. However, the present inventors have found that curves of the type shown in FIG. 4C can be found, by experimentation, for other turn characteristics as well.

Fractal antennas are known in the art. Reference is made to Xu Liang and Michael Yan Wan Chia, "Multiband Characteristics of Two Fractal Antennas," John Wiley, MW and Optical Tech. Letters, Vol. 23, No. 4, pp 242-245, Nov. 20, 1999. Reference is also made to G. J. Walker and J. R. James, "Fractal Volume Antennas" Electronics Letters, Vol. 34, No. 16, pp 1536-1537, Aug. 6, 1998. These references are incorporated herein by reference.

Figure 4D:
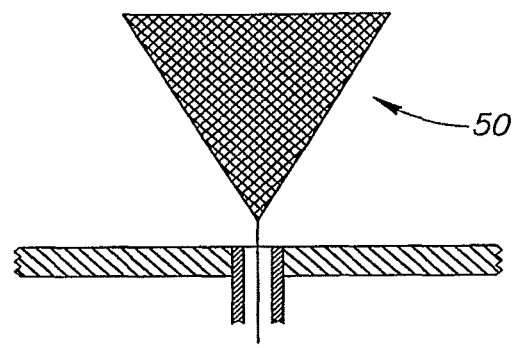
FIG. 4D-4H are schematic drawings of various fractal antenna useful for coupling energy into the cavity, in accordance with an embodiment of the invention.

FIG. 4D shows a simple bow-tie antenna 50 as known in the art, for radiation into free space. The Bandwidth of the bow-tie (in free space) is: 604 MHz @ 740 MHz center frequency (−3 dB points) and 1917 MHz @ 2.84 GHz center frequency. This antenna has a monopole directivity pattern but a broadband one (being an advantage over the narrow BW of a dipole antenna). However, monopole directivity does not irradiate in a direction parallel to the feed.

The band width (BW) of this antenna varies between 10 MHz and maximum of 70 MHz depends of the load (object) position inside the cavity.

This and the following fractal antennas can be useful in the present invention to feed energy into a cavity.

Figure 4E:
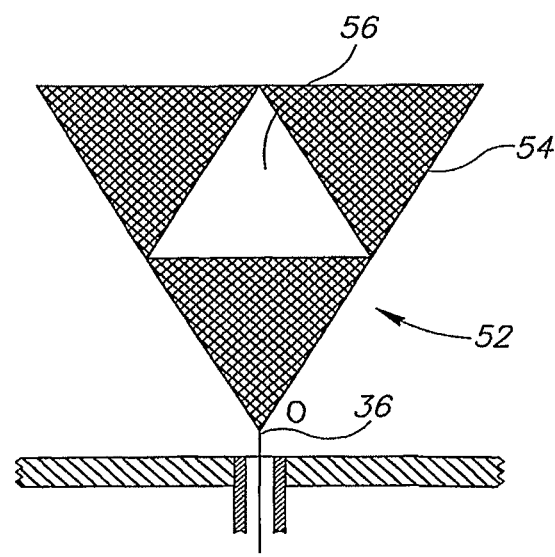

FIG. 4E shows a simple Sierpinski antenna 52, useful in the practice of the present invention. Generally, the cross-hatched areas 54 are metal plate and the white central area 56 is a non-conducting region. The metal plates are mounted on a preferably low dielectric constant dielectric and are connected at the corners and to center conductor 37 of coaxial feed 36, as shown. It's characteristics in the cavity are similar to those of the bow-tie antenna.

Figure 4F:
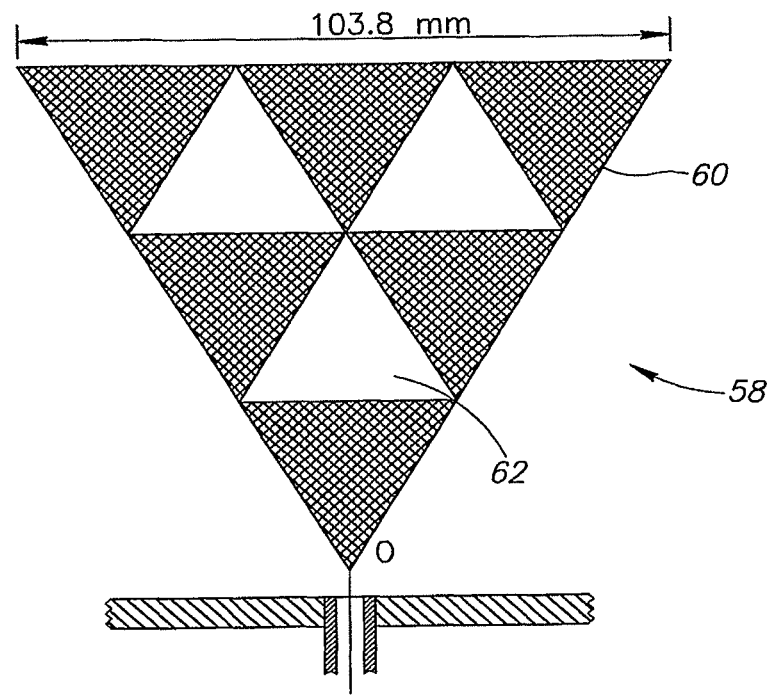

FIG. 4F shows a modified Sierpinski antenna 58, useful in the practice of the present invention. Generally, the cross-hatched areas 60 are metal plate and the white areas 62 are non-conducting regions. The metal plates are mounted on a preferably low dielectric constant dielectric and are connected at the corners and to center conductor 37 of coaxial feed 36 as shown.

For an overall extent of 103.8 mm utilizing equal size equilateral triangles, the center frequency of this antenna is about 600 MHz inside the cavity.

Figure 4G:
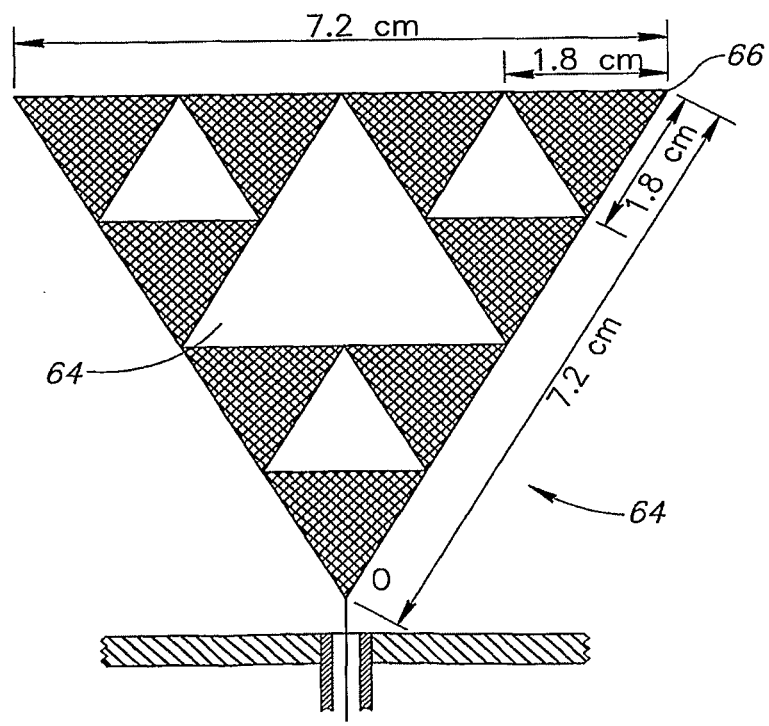

FIG. 4G shows yet another modified Sierpinski antenna 64, useful in the practice of the present invention. Generally, the cross-hatched areas 66 are metal plate and the white areas 68 are non-conducting regions. The metal plates are mounted on a preferably low dielectric constant dielectric and are connected at the corners and to center conductor 37 of coaxial feed 36.

Dimensions are shown on FIG. 4G for an antenna having a center frequency of 900 MHz in the cavity.

Figure 4H:
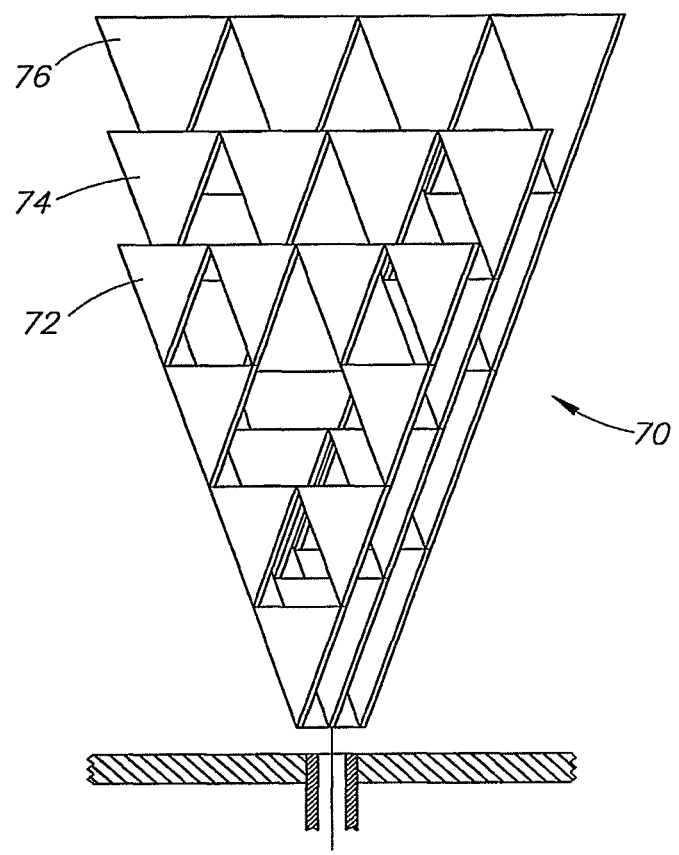

FIG. 4H shows a multi-layer fractal antenna 70 made up of three fractal antennas spaced a small distance (e.g. 2 mm) from each other. The size of each of these antennas is staggered in order to broaden the bandwidth of the antenna. In the example shown a first antenna 72 is scaled to 0.8 of the dimensions given in FIG. 4G. A second antenna 744 has the same dimensions as the antenna of FIG. 4G and a third antenna 76 is increased in size over antenna 74 by a factor of 1.2. The volume fractal antenna (FIG. 4G) has an overall bandwidth of 100 MHz—this is an improvement over the 70 MHz maximum BW achieved in prior single fractal antenna (FIGS. 4D-4H).

Fractal antennas also show a center frequency change when placed in a cavity. This difference is used (as with the helical antenna to design antennas for use in cavities by scaling the frequencies.

In general, it is desired to utilize wideband, directional antennas to feed power into the object being heated such antennas include patch antennas, fractal antennas, helix antennas, log-periodic antennas and spiral antennas.

FIGS. 5A to 5D are schematic block diagrams of an electromagnetic heating system, in accordance with an embodiment of the invention.

Figure 5A:
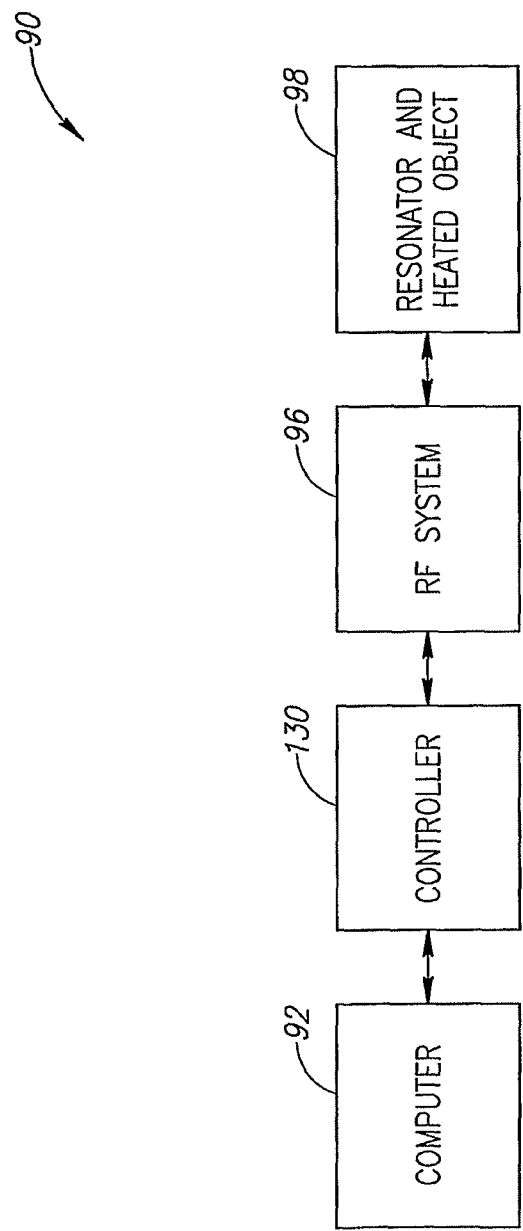
FIGS. 5A-5C are schematic block diagrams of electromagnetic heating systems, in accordance with an embodiment of the invention.

FIG. 5A shows a general block diagram of each of the power feeds 90 of the system, in an exemplary embodiment of the invention. The system is controlled by a computer 92 which via a control interface (Controller) 130 controls an RF system 96 which provides power to the heated object 98.

Figure 5B:
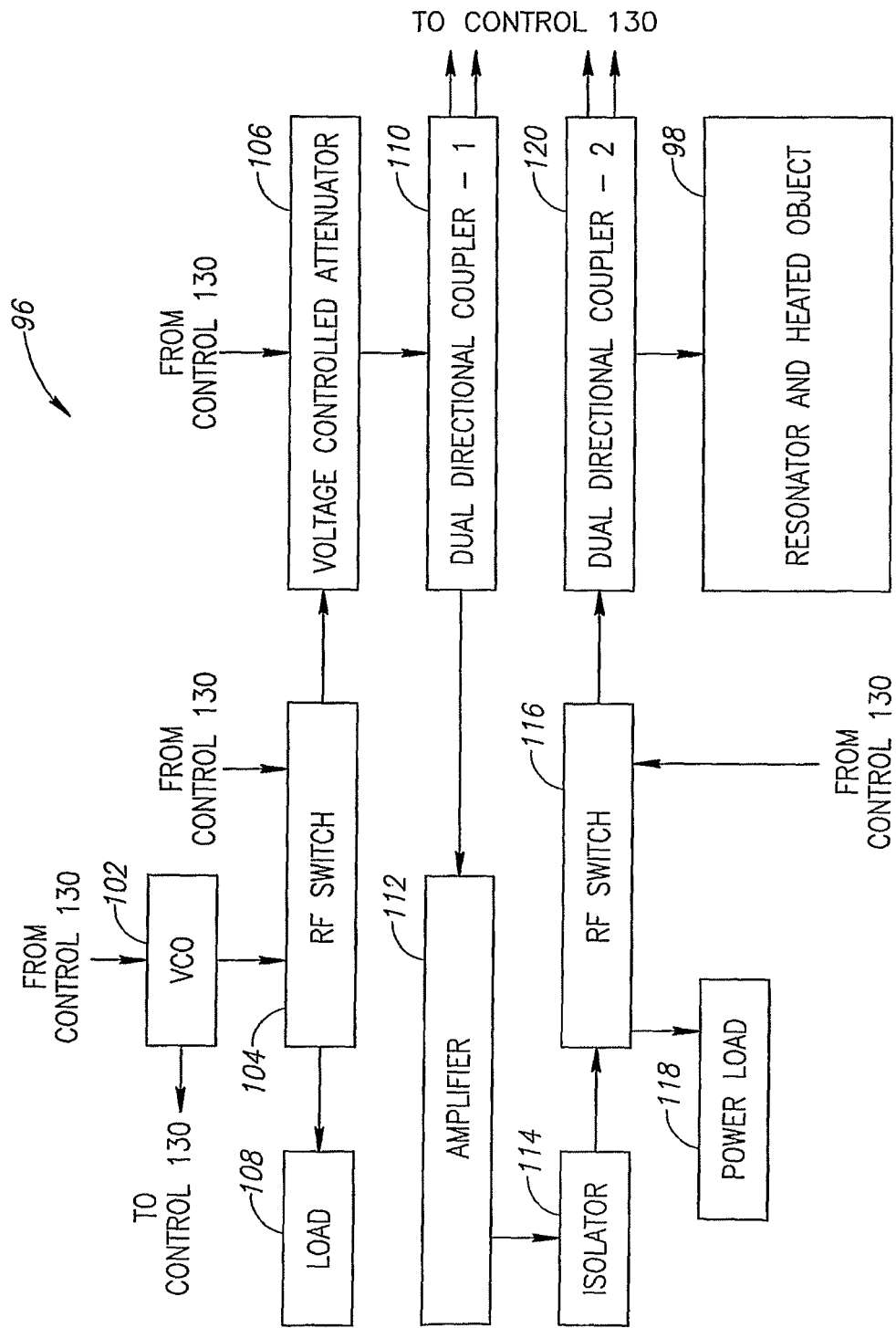

FIG. 5B is a block diagram of the electronics of one of the RF feed systems 96, in accordance with an exemplary embodiment of the invention. A VCO 102 receives a signal from a control circuit 130 (FIG. 5C) which sets the frequency of the energy into the port. This energy is passed through an RF switch 104 and a voltage controlled attenuator (VCA) 106, both of which are controlled by control circuit 130. After passing through the VCA, the power and frequency of the signal have been set. A load 108 is provided for dumping the signal generated by VCO 102 when the signal from VCO 102 is not switched to the VCA.

The signal is then sent through the main line of an optional first dual directional coupler 110.

The output of the VCA is then amplified by a power amplifier 112 and after passing though an isolator 114. A signal proportional to the power reflected from amplifier 112 is also fed to the control circuit.

Coupler 110 feeds back a portion of the signal entering it (after detection or measurement of power) to control circuit 130. A signal proportional to the power reflected by amplifier 112 is also sent to controller 130. These signals enable supervision of VCO/VCA and the amplifier. In a production system, the directional coupler may not be necessary.

An RF switch 116 switches the power either to a load 118 or to the feed of resonator 98, via a second dual directional coupler 120. Dual directional coupler 120 samples the power both into and out of the resonator and sends power measurement signals to controller 130.

In an embodiment of the invention, RF amplifier 112 is a solid state amplifier based on the LDMOS technology. Psat=300 W, Efficiency=about 22%, Effective band—800-1000 MHz Such amplifiers either have a relatively narrow bandwidth or a low efficiency (<25%) or both. This limits the optimal utility of the advances of the present invention. Recently, amplifiers have become available based on SiC (silicon carbide) or GaN (gallium nitride) semiconductor technology. Transistors utilizing such technologies are commercially available from companies, such as Eudyna, Nitronex and others. Amplifiers having a maximum power output of 300-600 W (can be built from low power (50-100 Watt) modules) and a bandwidth of 600 MHz (at 700 MHz center frequency) or a bandwidth of 400 MHz (at 2.5 GHz center frequency are available, for example. Such amplifiers have a much higher efficiency than prior art amplifiers (efficiency of 60% is available) and much higher tolerance to reflected signals, such that isolator 114 can often be omitted for these amplifiers. A particular configuration utilizing this type of amplifier is described below in conjunction with FIGS. 12A-D.

Figure 5C:
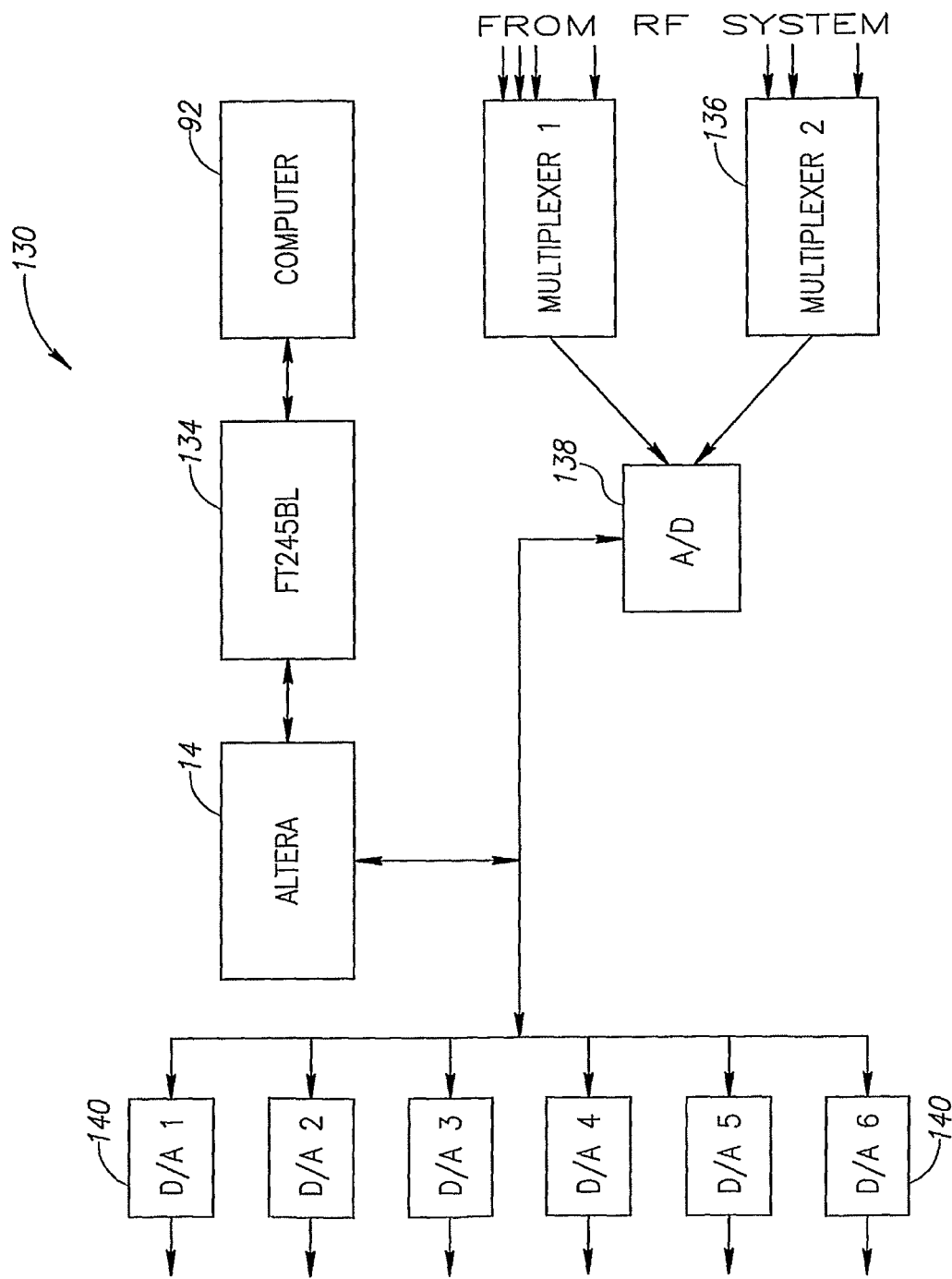

Turning now to FIG. 5C controller 130 comprises computer 92 which performs computations and provides a logging function of the system as well as acting as a user interface. It also controls the rest of the elements in performing the calibration and control method of the flow charts of FIG. 7.

Computer 132 is coupled to the rest of the system through an interface 134 which is designed to provide communication to, for example, an ALTERA FPGA 140, which interfaces with and provides control signals to the various elements of the RF system. The Altera receives inputs (as described above with respect to FIGS. 5A-5C), via one or more multiplexers 136 and an A/D converter 138. In addition, it sets the frequency and power of each of the feeds (also described with respect to FIGS. 5A and 5B) via D/A converters 140 and the positions of the field adjusting element optionally utilizing the method described with aid of the following flow charts. In a production system, the computer may not be necessary and the Altera or a similar controller may control and process all the necessary data. In some embodiments of the invention, the frequency is swept as described below.

Figure 6:
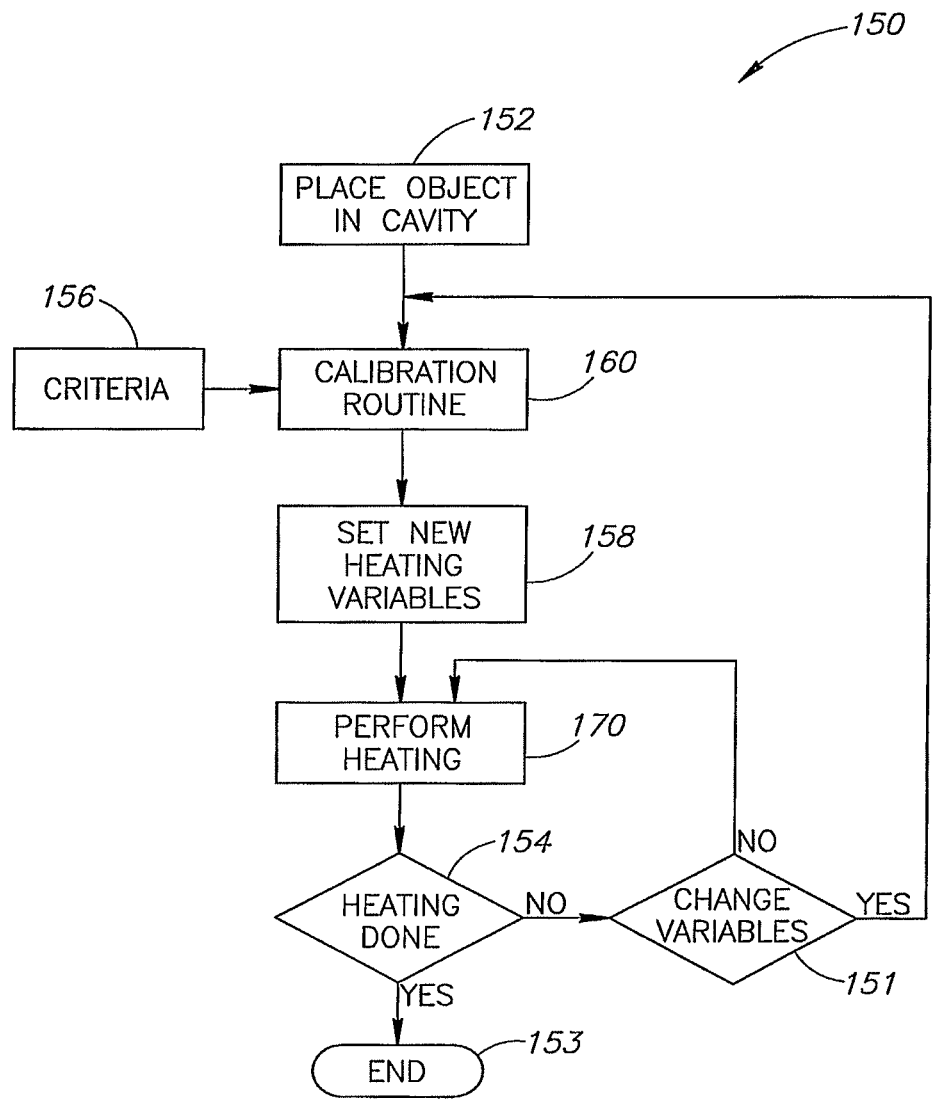
FIG. 6 is a simplified flow chart of the operation of the system, in accordance with an embodiment of the invention.
Figure 7:
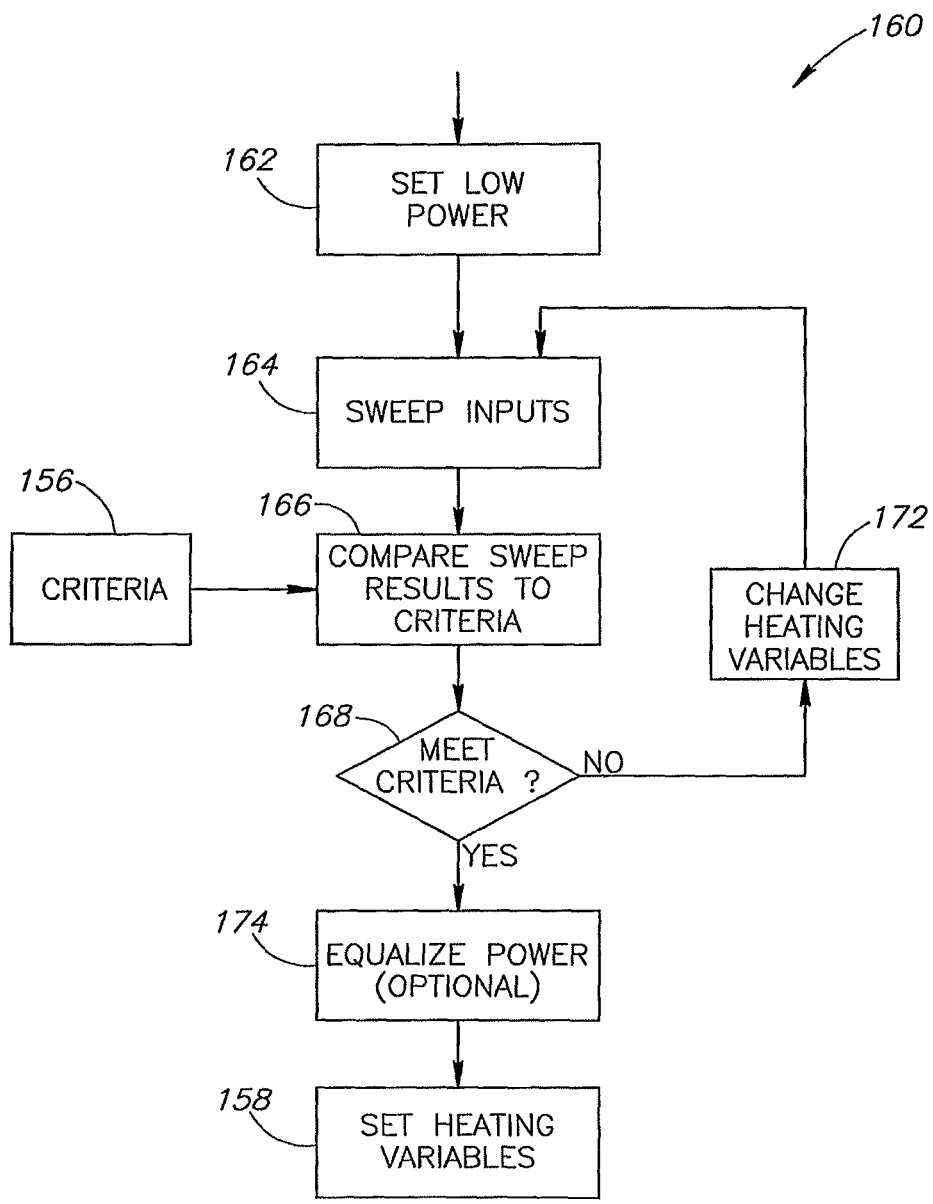
FIG. 7 is a flow chart of a process of adjusting elements and frequency in the heating system illustrated in FIG. 5, in accordance with an embodiment of the invention.

FIG. 6 is a simplified flow chart 150 of the operation of a heating system having the structure described above. FIG. 7 is a simplified flow chart of calibration 160 of the system. As will be evident, the method operation and calibration of the system is also usable with only minor changes for operating systems with lesser or greater numbers of power feeds and/or a greater or less number of matching elements.

At 152 an object, for example a frozen organ or frozen or non-frozen food object, is placed in cavity 10. A calibration or adjustment routine is then optionally performed to set the variable elements in the system. These can include power output of the amplifiers 112 in each of the power feeds to the cavity at each frequency, chosen to be transmitted, the finite set of sub-bands of frequencies of each VCO 102, the method of providing energy at the various frequencies (for example sweep or other frequency variation, or the provision of a pulsed signal embodying the desired frequency and power characteristics), positioning of the matching elements (e.g., 22, 24), position of the heated object and any other variables that affect the various characteristics of the heating process, for example—the uniformity and/or efficiency of power transfer to the object. A memory contains the criteria 156 for calibrating the system. Exemplary criteria are described below. Calibration is carried 160 out to determine the new heating variables. An exemplary calibration routine is outlined in the flow chart of FIG. 7, discussed below.

After the new variables are determined, the new variables are set 158 and heating commences 170.

Periodically (for example a few times a second), the heating is interrupted for a short time (perhaps only a few milliseconds or tens of milliseconds) and it is determined 154, optionally based on a method described below, whether heating should be terminated. If it should, then heating ends 153. If the criterion or criteria for ending heating is not met, then the calibration (or re-adjustment) routine 160 is entered. If not, the heating 170 is resumed. It is noted that during the measurement phase, the sweep is generally much broader than during the heating phase.

Calibration routine 160 for each individual channel will be described, with reference to the flow chart of FIG. 7.

In order to perform calibration, the power is optionally set at a level low enough 162 so that no substantial heating takes place, but high enough so that the signals generated can be reliably detected. Alternatively, calibration can take place at full or medium power. Calibration at near operational power levels can reduce the dynamic range of some components, such as the VCA, and reduce their cost.

Each of the inputs is then swept 164 between a minimum and a maximum frequency for the channel. Optionally, the upper and lower frequencies are 430 and 450 MHz. Other ranges, such as 860-900 MHz and 420-440 can also be used. It is believed that substantially any range between 300-1000 MHz or even up to 3 GHz is useful depending on the heating task being performed. When the broadband, high efficiency amplifiers described above are used, much larger bandwidth of several hundred MHz or more can be swept, within the range of the amplifiers. The sweep may be over several non-contiguous bands, if more than one continuous band satisfies the criteria for use in heating.

The input reflection coefficients $S_{11}$, $S_{22}$, and $S_{33}$ and the transfer coefficients $S_{12}=S_{21}$, $S_{13}=S_{31}$, $S_{23}=S_{32}$ are measured during the sweep and a net power efficiency is determined as (for port I for example), as:

$$\eta_1 = 1 - (\text{Reflected power from port 1} + \text{coupled power to ports 2 and 3})/\text{Input power}.$$

The present inventor has found that under many operating regimes it is desirable to maximize certain criteria.

In a first embodiment of the invention, the maximum net power efficiency for each port is maximized, in the sense, that the net power efficiency at a point of maximum efficiency within the sweep range is made as high as possible. The efficiency and the frequency at which the efficiency is a maximum is noted. Optionally, the width of the efficiency peak and a Q-factor are noted as well.

A second embodiment of the invention is based on a similar criterion. For this embodiment the area under each resonance peak of the net efficiency of transfer is determined. This area should be a maximum. The efficiency, the center frequency of the resonance having the maximum area and its width are noted.

In an embodiment of the invention, the criteria for determining if the variables are properly set is when the peak net efficiency (first embodiment) or the area or a width (second embodiment) is above some predetermined level or a Q-factor is below some predetermined level. For example, there may be a restriction that the area above 60% net efficiency is maximized for each of the feeds.

It is noted that energy that is neither reflected nor transmitted to the other ports is absorbed either in the walls of the cavity or in the object being heated. Since absorption in the conducting walls is much lower than that in the object by a large factor, the net efficiency is approximated by the proportion of the input power that is absorbed in the object. It is also noted that the frequency of maximum net efficiency is not necessarily the same as the frequency at which the match is best.

In an embodiment of the invention, the frequency is swept, optionally while adjusting the power. The term swept should be understood to include serial transmission of individual non-contiguous frequencies, and transmission of synthesized pulses having the desired frequency/power spectral content.

The present inventors have discovered that each frequency has maximal absorption at a specific location within an object within a cavity, which locations may vary between different frequencies. Therefore sweeping a range of frequencies may cause movement of the peak heating region within the object, Computer simulations have shown that, at least when the Q factor of a peak is low (i.e., a lot of energy is dissipated in the object being heated) the movement of the peak heating region can be quite substantial. Furthermore, the inventors have found that each mode (represented by a different peak of efficiency) acts differently when swept.

Figure 11A:
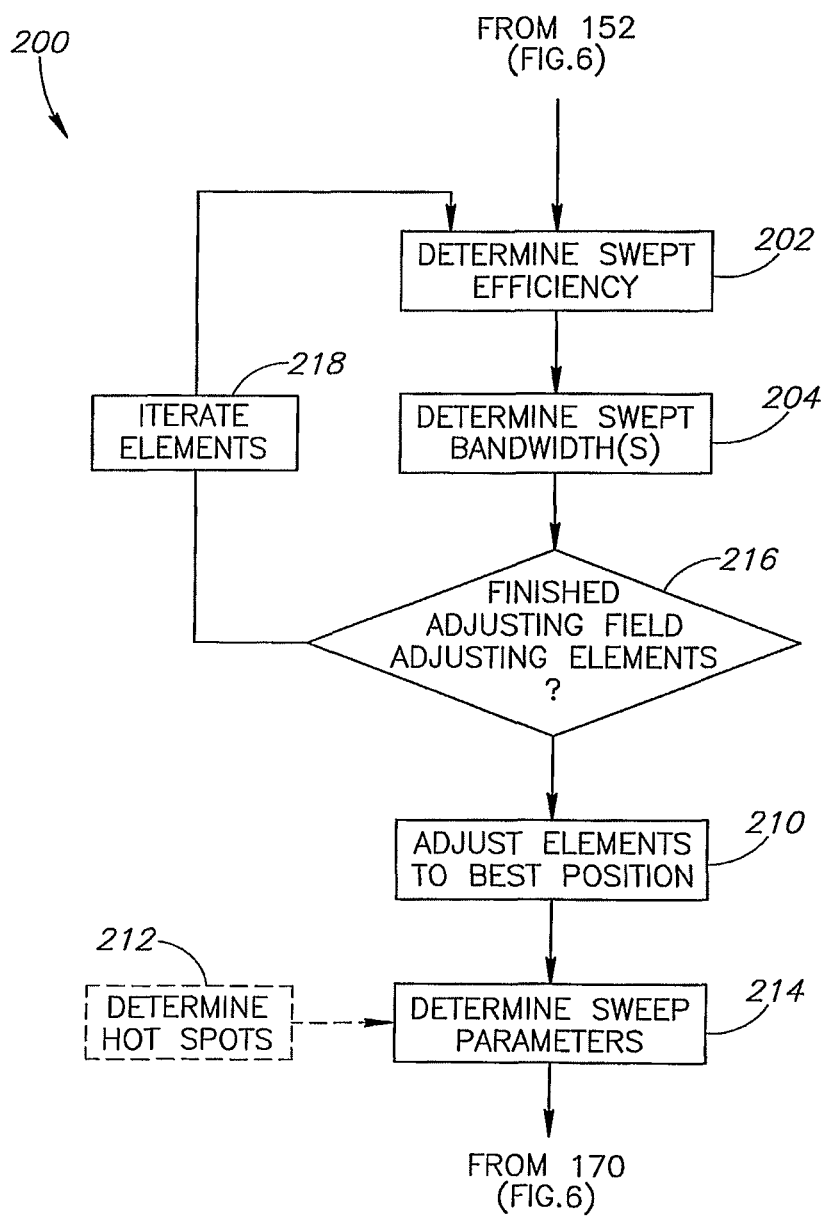
FIG. 11A is a simplified flow chart of a method of determining swept power characteristics, in accordance with an embodiment of the invention.

FIG. 11A is a simplified flow chart 200 of a method of determining swept power characteristics, in accordance with an embodiment of the invention. This method corresponds to acts 160 and 158 of the flow chart of FIG. 6.

After placing the object in the cavity (152) the cavity is swept to determine the input efficiency as a function of frequency (202) (e.g., obtain a spectral image). Determination of input efficiency is described in detail above. Alternatively, a pulse of energy, having a broad spectrum in the range of interest is fed into the input. The reflected energy and the energy transmitted to other inputs are determined and their spectrums are analyzed, for example using Fourier analysis. Using either method, the net power efficiency as a function of frequency can be determined.

Under some conditions, where similar objects have been heated previously, a set of tables for different types and sized of objects can be developed and used as a short-cut instead of closely spaced measurements.

Figure 11B:
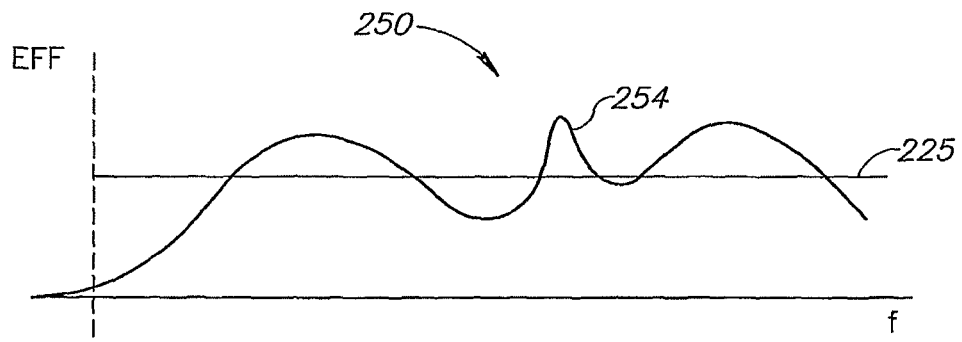
FIGS. 11B and 11C illustrate how a swept power spectrum is determined, in accordance with an embodiment of the invention.

FIG. 11B shows a simplified net power efficiency curve 250 at an input. It is noted that there are regions in which the efficiency is high and others in which the efficiency is low. Furthermore, some of the efficiency peaks are broader and others are narrower.

Next, the overall swept bandwidth (BW) is determined (204). This may include sweeping across a single peak or across several peaks.

In an embodiment of the invention, during the heating phase, the frequency is swept across a portion of each of the high efficiency peaks. For example, to provide even heating of objects it is believed that the power inputted to the cavity at each frequency should be the same. Thus, in an embodiment of the invention, the power at each frequency is adjusted such that P*η is a constant for all the frequencies in the sweep. Since the power available is always limited to some value, this may set a limit on the available bandwidth for the sweep. An example of a lower limit to efficiency is shown as dashed line 252 in FIG. 11B. The sweep may be limited to frequencies having efficiency above this value.

Next, the positions of the field adjusting elements are set. This adjustment is optional and in some situations, even where such elements are present, they do not need to be adjusted. In general, the criterion for such adjustment is that the peaks have as high efficiency as possible with as broad a peak as possible Specific applications may introduce additional goals, such as moving the peak to a certain band.

An iterative process (206, 208) is used to determine a desired position and/or orientation of the field adjusting elements. When the search process which may be any iteration process as known in the art, is completed the elements are set to the best position found. (210).

In an embodiment of the invention, the sweep is adjusted (212) to avoid feeding excess power into certain parts of the object. For example, if the object contains a metal rod or a metal zipper, a high peak in efficiency 254 may be generated. A metal rod can cause a concentration of energy near the ends of the rod. Avoiding irradiation at this peak can sometimes reduce the effects of such objects on even heating.

Next, the sweep parameters are determined (214).

Figure 11C:
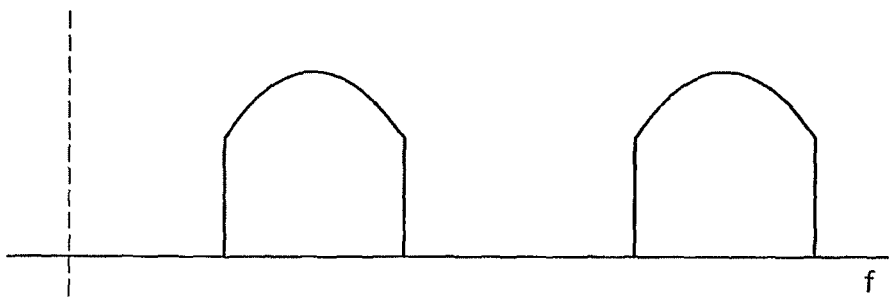
Figure 11D:
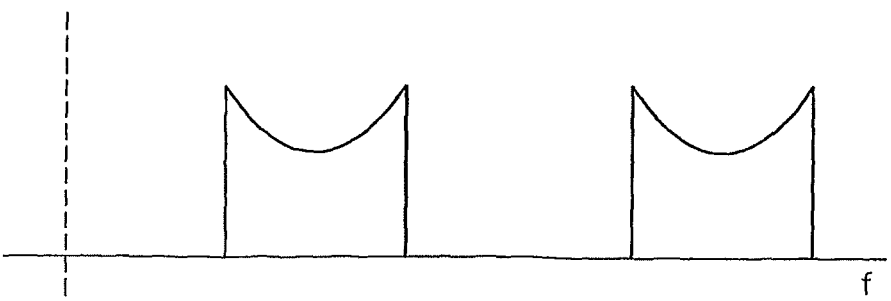
FIG. 11D shows a pulse shape, for a pulse operative to provide the spectrum shown in FIG. 11B, in accordance with an embodiment of the invention.

FIG. 11C shows the power spectrum 256 of energy to be fed to the input, in accordance with an embodiment of the invention. It should be noted that no energy is transmitted at the frequency characteristic of the rod and that for other frequencies for which the efficiency is above the minimum shown at 252 in FIG. 11B. The power has a shape that is such that the product of the efficiency η and the power fed is substantially constant.

In an alternative embodiment of the invention, the energy is fed to the port in the form of a pulse rather than as swept energy. First a pulse, such as that shown in FIG. 11C is generated by a pulse synthesizer. This pulse is amplified and fed into the input. The pulse synthesizer would then replace VCO 102 (FIG. 5B). It is understood that the pulse synthesizer can also be programmed to produce a sweep for use in determining the frequency dependence of η (act 164 of FIG. 7).

A search is performed for a position of the matching elements at which the net power efficiency at all of the feeds meets the criteria. This is indicated at boxes 214 and 216, which represent a search carried out by changing the positions and/or orientations of the matching elements. Standard search techniques can be used (iteration) or a neural network or other learning system can be used, especially if the same type of object is heated repeatedly, as is common for industrial uses.

When the criteria are met, then the power is raised to a level suitable for heating and optionally swept. The power into the respective amplifiers is optionally normalized to provide a same net power into the cavity (and therefore, into the object) for each port. Optionally, the least efficient port determines the power to the object. While in prior art ovens, the user decides on the heating time, in some embodiments of the present invention the desired heating time can generally be predicted.

Returning again to FIG. 6, there are a number of methodologies for performing the heating 170.

In one embodiment of the invention, power is fed to all of the feeds at the same time. This has the advantage that heating is faster. It has the disadvantage that three separate sets of circuitry are needed.

In a second embodiment of the invention, the power is fed to the feeds seriatim, for short periods. Potentially, only a single set of most of the circuitry is needed, with a switch being used to transfer the power from feed to feed. However, for calibration, a method of measuring the power transmitted from port to port should be provided. This circuitry could also be used to match the feeds when power is not being fed to them. A different type of circuitry for providing both the heating and calibration functionality, in accordance with an embodiment of the invention, is shown in FIG. 8, corresponding to the circuitry of FIG. 5B.

The same reference numbers are used in FIG. 8 as for FIG. 5B, except as indicated below. Such a system has the advantage of being much less expensive. It is, of course, slower. However, it does allow for an additional method of equalization, in which the time duration (either alone or in conjunction with changing the input power) during which each feed is fed is adjusted so that the energy into each feed is the same (or different if that is desired).

Figure 8:
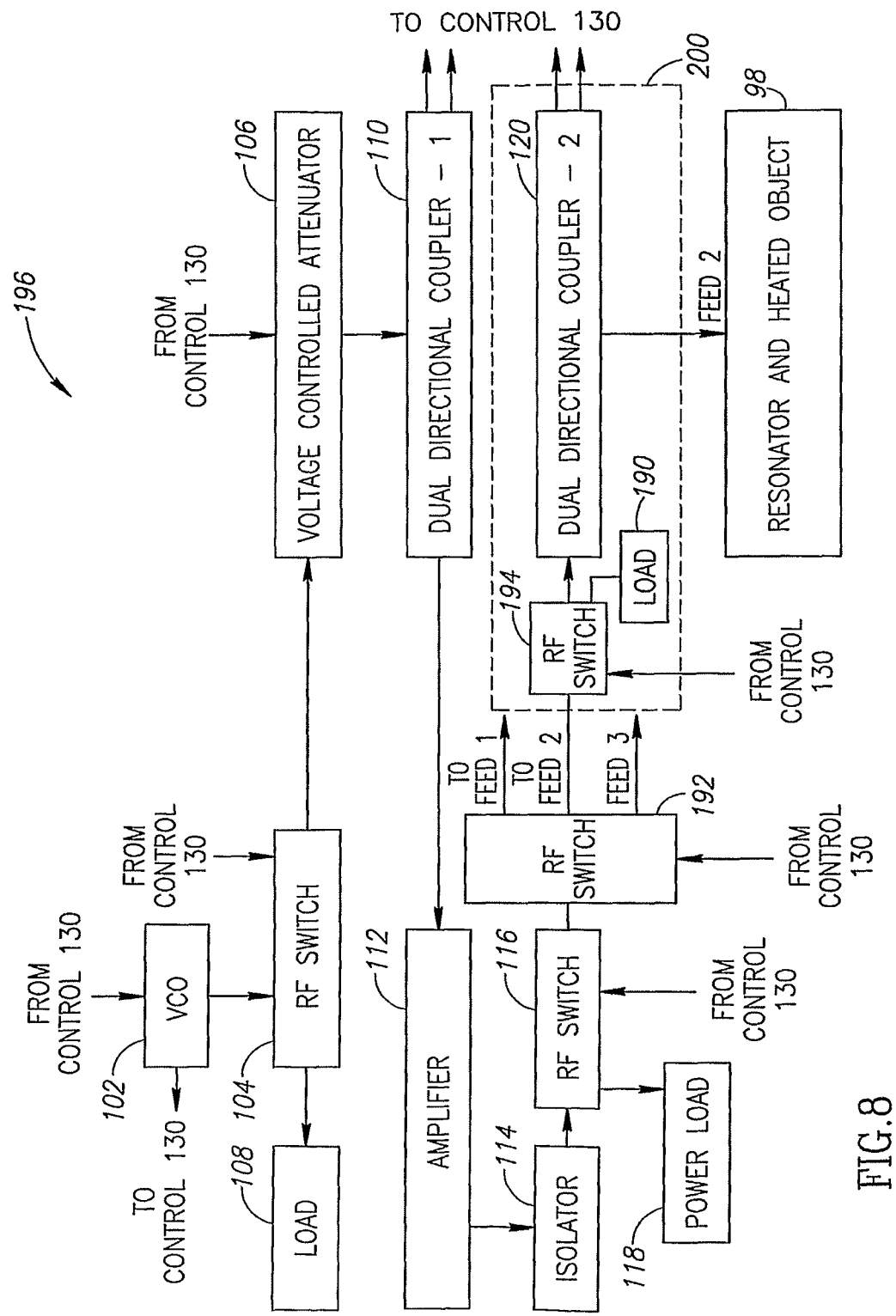
FIG. 8 illustrates alternative RF circuitry, in accordance with an embodiment of the invention.

FIG. 8 is similar to FIG. 5B up to the output of RF switch 116. Following RF switch 116 a second RF switch 192 transfers the power delivered by amplifier to one of the feeds. Only circuitry 200 related to feed 2 is shown.

Circuitry 200 operates in one of two modes. In a power transfer mode, a signal from control 130 switches power from RF switch 192 to dual directional coupler 120, via an RF switch 194. The rest of the operation of the port is as described above. In a passive mode, the input to RF switch 194 does not receive power from amplifier 112. Switch 194 connects a load 190 to the input of dual directional coupler 120. In the passive mode, load 190 absorbs power that is fed from the cavity into the feed. For production systems additional simplification of directional coupler 120 may be possible, replacing the dual directional coupler with a single directional coupler.

It should be noted that switches 116 and 192 and optionally the local switches can be combined into a more complex switch network. Alternatively or additionally, RF switch 194 can be replaced by circulator such that power returned from the feed is always dumped in load 190.

In either the embodiment of FIG. 5B or the embodiment of FIG. 8, the frequency of the power fed to a port can be fed at the center frequency of the resonance mode that couples the highest net power, i.e., the point of maximum efficiency of energy transfer to the object being heated. Alternatively, the frequency can be swept across the width of the resonance or, more preferably along a portion of the width, for example between the −3 dB points of the power efficiency curve, or as described above with respect to FIGS. 11A-11C. As indicated above, optionally, the power is adjusted during this sweep so that the net input power remains constant or more nearly constant during the sweep. This can be accomplished by changing the power amplification of the power amplifier inversely to the power efficiency of the instantaneous frequency being fed.

Figure 9:
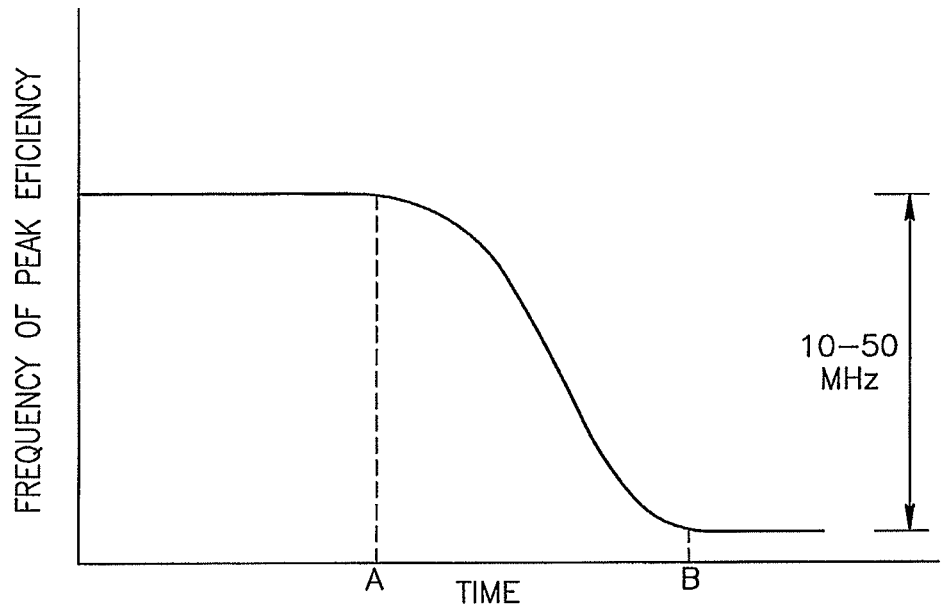
FIG. 9 is a graph of frequency vs. time for a typical thawing process, illustrating an automatic turn-off capability in accordance with an embodiment of the invention.

Returning again to FIG. 6, reference is additionally made to FIG. 9, which shows a graph of frequency of a particular peak with time for a typical thawing process. This graph illustrates one method of using the changes in the properties of the object during a thawing process to determine when the process is complete.

The ordinate of FIG. 9 is the frequency chosen as an input for one of the feeds. The abscissa is time. During thawing of an object, the ice in the object turns to water. Ice and water have different absorption for microwave or UHF energy, resulting in a different return loss and coupling as a function of frequency. Not only does this change the match, but at least after rematching by adjustment of the matching elements, the frequency of the absorption efficiency peak changes. At point A, some of the ice has started to change into water and the frequency of match changes. At point B, all of the ice has changed to water and the frequency of match stops changing. By monitoring the frequency described above and especially its rate of change, the point at which all of the ice is turned into water can be determined and the heating terminated, if only thawing is desired. It is noted that the frequency change during thawing is large, as described herein, compared to allowed frequency changes in the prior art.

One of the problems of thawing a solid mass of irregular shape and irregular internal structure is that it is generally impossible to determine when all of the ice has been turned to water. Thus, in general, in the prior art, one overheats to assure that no ice is left, which, considering the uneven heating of the prior art, would enhance re-crystallization, if any were left.

Heating methods and apparatus of the present invention, which allow for both even heating and provide knowledge of the progress of the thawing, can result in much lower or even non-existent re-crystallization.

Apparatus and method according to the present invention have been used to defrost a pig's liver, Sushi or Maki and to cook an egg in the shell.

The following table shows a comparison of thawing of a cow liver by the system of the present invention and using a conventional microwave oven.

TABLE 1

Comparison of Inventive Method and Conventional Microwave-Cow Liver

| Measurement | Inventive Method | Conventional Microwave |
|---|---|---|
| Initial Temperature | −50° C. | −50° C. |
| Final Temperature after thawing | 8° C. to 10° C. | −2° C. to 80° C. |
| Power | 400 Watt | 800 Watt |
| Thawing time | 2 Minutes | 4 Minutes |
| Visible damage | None | The texture of the thawed sample was destroyed. There are frozen regions along side burned ones. No chance of survival of living cells. |

The following table shows a comparison between thawing of Maki containing raw fish covered by rice and wrapped in seaweed, by the system of the present invention and using a conventional microwave oven.

TABLE 2

Comparison of Inventive Method and Conventional Microwave-Maki

| Measurement | Inventive Method | Conventional Microwave |
|---|---|---|
| Initial Temperature | −80° C. | −80° C. |
| Final Temperature after thawing | 2° C. to 6° C. | −5° C. to 60° C. |
| Power | 400 Watt | 800 Watt |
| Thawing time | 40 Seconds | 1 Minute |
| Visible damage | None | The thawing process cooked part of the salmon, therefore it was not Maki anymore. |

An egg was cooked using the present method. Generally, eggs burst if an attempt is made to cook them in a microwave oven. However, using the system described above an egg in the shell was cooked. The white and yellow were both well cooked, and the white was not harder than the yellow. Neither part was dried out or rubbery and the taste was very good, with little if any difference from a conventional hard cooked egg. In addition, deep frozen fish have been defrosted without leaving any frozen portions and without any portions being heated above cooking temperatures.

In each of the above experiments, the frequency and power were adjusted automatically and the matching elements were adjusted manually, in accordance with the method given above for automatic adjustment.

The inventors believe that the methodology of the present invention is capable of thawing objects that are deep frozen to just above freezing with a temperature variation of less than 40° C., optionally less than 10° C., 5° C. and even as low a difference as 2° C. Such results have been achieved in experiments carried out by the inventors, for a cow liver, for example.

Thawing objects such as meat and fish with such low differences and at high speed has the potential for prevention of development of salmonella, botulism and other food poisons. Controlled, uniform thawing has important implications in thawing organs for transplanting, without tissue destruction.

Figure 10:
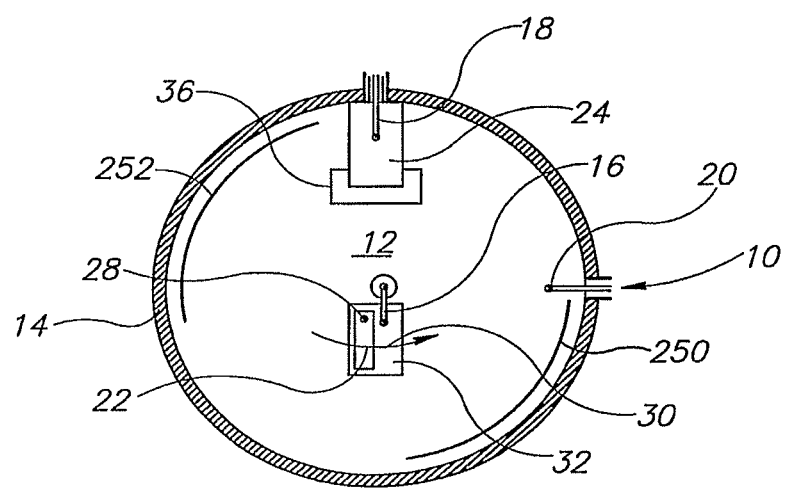
FIG. 10 shows the layout of a low frequency bias structure, in accordance with an embodiment of the invention.

FIG. 10 shows apparatus for applying a DC or relatively low frequency (up to 100 kHz or 100 MHz) to an object in the cavity, in accordance with an embodiment of the invention. This figure is similar to FIG. 1, except that the cavity includes two plates 250 and 252. A power supply (not shown) electrifies the plates with a high differential voltage at DC or relatively low frequency. The objective of this low frequency field is to reduce the rotation of the water molecules. Ice is water in a solid state therefore its rotational modes are restricted. A goal is to restrict the rotational modes of the liquid water in order to make the heating rate be determined by that of the ice. The present inventors also believe that the low frequency fields may change the dielectric constant of the materials making up the object being heated, allowing for better match of the input to the object.

In an alternative embodiment of the invention a DC or low frequency magnetic field is applied by placing one or more coils inside or preferably outside the cavity to cause alignment of the molecules in the object. It is possible to combine low frequency or DC electric and low frequency or DC magnetic fields with possible different phases from different directions.

Figure 12A:
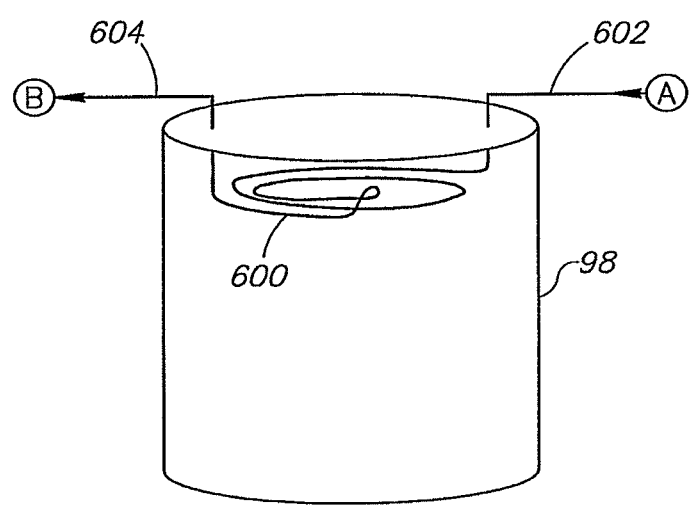
FIG. 12A shows an RF heater with an auxiliary heating coil, in accordance with an embodiment of the invention.

FIG. 12A shows a cavity 98 with an internal heater coil 600 placed inside the cavity. An inlet 602 and an outlet 604 allow for feeding a hot fluid through the coil to heat the air within the cavity.

Figure 12B:
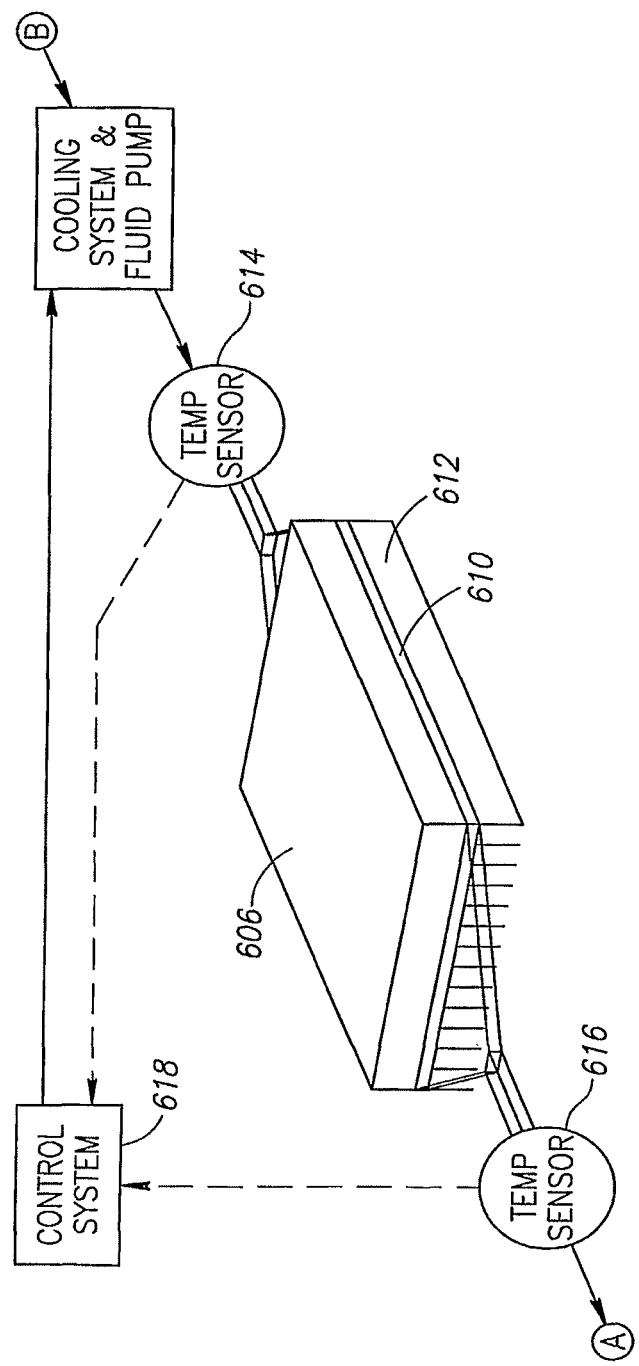
FIGS. 12B and 12C schematically illustrate a scheme for transferring waste heat from an amplifier to the heater of FIG. 12A.
Figure 12C:
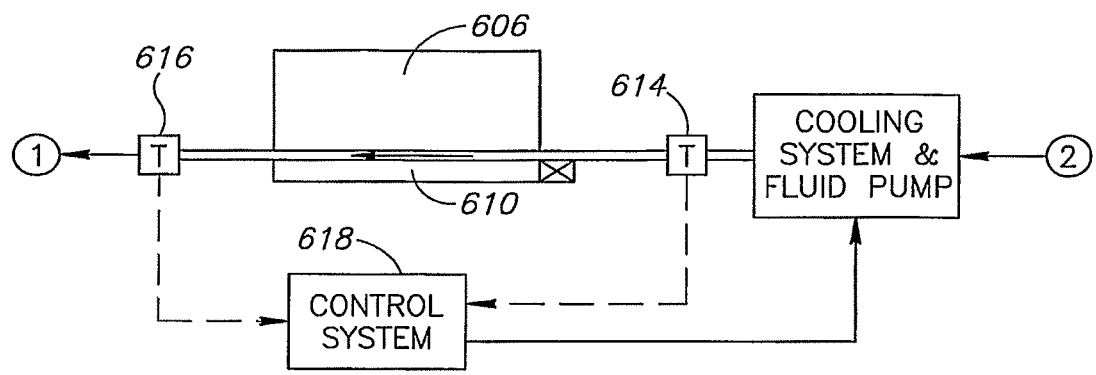

FIGS. 12B and 12C show two schematic illustrations of a system for transferring heat from a high power amplifier 606 to the coil. Even at an efficiency of 60%, the amplifier can generate several hundred watts. This energy (or at least a part of it) can be transferred to heat the air and to produce infrared radiation (as a resistive coil does) in the cavity to increase the efficiency of heating.

FIG. 12B shows a very schematic diagram to illustrate how waste heat from an amplifier 606 can be captured. FIG. 12C shows a block diagram of the same system. Element 608 represents a cooling system for returning fluid and a fluid pumping system. It receives return fluid from outlet 604, cools the liquid (if necessary) and pumps the liquid into a gap 610 between the between amplifier 606 and an optional heat sink 612. The temperature at the input to the gap and at its output are preferably measured by sensors 614 and 616 and fed to a control system 618, which controls one and optionally more than one of the cooling and pumping rate to provide a desired heat transfer to the cavity. A fan 620 may be provided to cool the heat sink as necessary. The fluid passing between the amplifier and the heat sink also functions to transfer heat from the amplifier and the heat sink. Optionally heat conducting rigs may transfer heat between the amplifier and the heat sink with the fluid passing between the ribs to collect heat.

Alternatively, heat pipes or other means can be used to collect and transfer energy to the cavity. Alternatively, hot air could be passed over the amplifier and/or heat sink and passed into the cavity.

Use of high efficiency amplifiers with or without heat transfer to the cavity can result in highly efficient systems, with an overall efficiency of 40-50% or more. Since amplifiers with relatively high (40V-75V) voltages are used, the need for large transformers is obviated and heat sinks can be small or even no-existent, with the amplifier transferring heat to the housing of the heater.

Figure 12D:
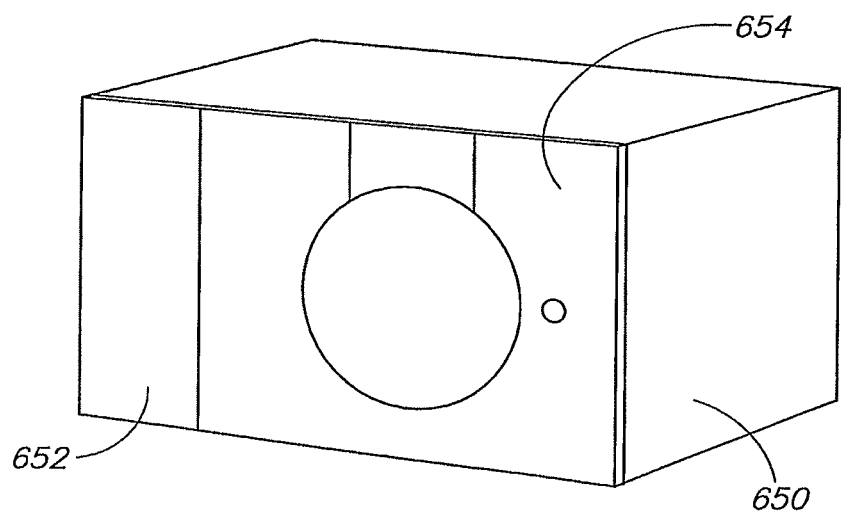
FIG. 12D shows an external view of a low weight, high efficiency RF heater, in accordance with an embodiment of the invention.

By optimizing the system, a heater as shown in FIG. 12D, including a housing 650, amplifiers and controller, as well as a user interface 652 and a door 654, as normally found on a microwave oven can weigh as little as 10 or 15 Kg or less. While applicants have utilized UHF frequencies for heating in the examples described above, rather than the much higher 2.45 GHz used in the prior art, for heating applications other than thawing, a different frequency may be desirable. UHF frequencies are absorbed preferentially by ice and have a longer wavelength than the higher frequencies, so that the fields within the object are more uniform and the ice is preferentially heated as compared to the water. This provides for preferential heating of the ice and more even thawing.

Additional measures that may be taken to improve the uniformity are:

1) Various types and sizes of conducting materials such as tiny grains of powdered conductive material (gold) may be inserted into the sample preceding the freezing process (e.g. through the circulation of the blood or cooling fluid) and serve as reflecting sources. The insertion can be done using some template of non-conducting material (absorbing or not) holding the conducting objects. These passive energy sources can improve the uniformity of EM radiation absorption.

2) Penetration of materials that change their dielectric characteristics dependent upon temperature in a fashion that is different than that of the sample. Injecting these materials will enable changes in the dielectric characteristics of the sample in the direction desired for achieving uniform and fast warming.

3) Use of probes for measurement of various parameters of the warming process such as temperature, pressure, and so on: These probes can be inserted inside the sample preceding the freezing process or attached adjacent to the sample at any stage of the process. Measurement of these parameters provides a means for supervision (control) of the warming process such that if the warming is not optimal it will be possible to make changes in various parameters of the process. There are probes available that are suited for measurement during warming in a microwave device. These probes can also serve as an indication of when to stop a thawing or cooking process.

Such probes may be included in a bag in which the object to be heated is placed and may include a resonant element whose resonant frequency is made to vary with temperature by the inclusion of a temperature dependent element such as a temperature dependent resistor or capacitor.

Probes may be provided with resonant circuits whose frequency depends on temperature. Such probes may be scanned during the scanning used for setting sweep parameters to determine temperature. During power transfer, these frequencies should generally be avoided. In an embodiment of the invention, a temperature sensitive tag is paired with a temperature insensitive tag and the changes in the frequency of the temperature sensitive tag are determined by a difference frequency between the two. This allows for a more accurate measurement of temperature that utilizing an absolute measurement of the frequency of the temperature sensitive tag.

4) Wrapping of the sample in material that does not absorb EM radiation at the specified frequencies: This type of wrapping can serve as packaging for the sample during transportation and as part of the probe system by which it is possible to measure temperature and additional parameters at the edges of the sample. This wrapping can serve as local refrigeration for the outer surfaces of the sample (which usually have a tendency to warm faster than the rest of the sample) in order to achieve uniformity in the warming of the sample.

Further, the wrapping can include identification of the object to help track the object and also to provide an indication to the system of a preferred protocol for heating the object. For example the wrapping may be provided with a number of resonant elements which can be detected when the cavity is swept during calibration. The frequencies of the elements can be used to provide an indication of the identity of the object. This allows for the automatic or semi-automatic setting of the starting parameters for calibration and/or for a particular heating protocol, optimized for the particular object and conditions.

Alternatively or additionally, to resonant circuits, a recording/storage element of a different type is provided, for example, in the form of an RFID element or a bar-code, which includes thereon an indication of the content of a package or wrapper including the object, suggested treatment thereof and/or heating instructions. In an exemplary embodiment of the invention, the instructions are actually provided at a remote site, indexed to a key stored by the recording element. Such instructions may be, for example, stored in a table or generated according to a request, based on information associated with the identification.

A reader is optionally provided in the heater, for example, an RFID reader or a bar-code reader to read information off a package or a wrapper thereof.

In an exemplary embodiment of the invention, after the object is prepared, various types of information are optionally stored on (or in association with) the recording element, for example, size, weight, type of packing and/or cooking/thawing/heating instructions.

In an exemplary embodiment of the invention, the recording element has stored therewith specific cooking instructions. Alternatively or additionally, the recording element has stored therein information regarding the platter shape and/or dielectric properties of its contents. It is noted that for industrial shaped portions, if the shape of the food is relatively regular between platters, movement of the food and/or changes in size and/or small changes in shape will not generally affect the uniformity by too much, for example, shifting a heating region/boundary by 1-2 cm. Optionally, the platter includes a depression and/or other geometrical structures which urge the food item to maintain a desired position relative to the platter borders.

During heating of the food, the parameters of the heating are optionally varied. The effect of the varying may cause non-uniformity in space and/or in time. In an exemplary embodiment of the invention, a script is provided which defines how and what to vary. Optionally, the script includes decisions made according to time (e.g., estimation of an effect) and/or food state (e.g., measurement). Various measuring methods are described above. Estimation is optionally based on a simulation or on empirical results from previous heating cycles. Optionally, the script is conditional (e.g., modified, generated and/or selected), for example, based on the position of a platter in the oven and/or personal preferences (which may be stored by the oven).

In an exemplary embodiment of the invention, a script is provided on the recording element or at a remote location. Optionally, a script is selected by a user selecting a desired heating effect.

In one example, a single food item may experience different power levels for different times, in order to achieve a desired texture/flavor.

In an exemplary embodiment of the invention, a script is used to set different energy levels and/or different times to apply such energies.

In one example, a script is as follows:
(a) Heat all platter so that the food reaches a relatively uniform temperature of 5 degrees Celsius.
(b) Uniformly heat whole platter at 80% for 5 minutes and then full power for 10 minutes.
(c) Heat to 40 degrees Celsius.
(d) Maintain heat for 10 minutes. It is noted that a desired heat can optionally be maintained by estimating the energy absorption while applying a known amount of cooling. Alternatively, actual heat absorption may be estimated based on a known amount of energy absorption and a measurement of air temperature leaving the cavity. Optionally, the oven includes a source of cooling air and/or has coolable walls and/or tray.
(e) Reduce heat to 30 degrees Celsius.
(f) Wait 10 minutes.
(g) Report "done" but leave at 30 degrees Celsius until removed.

In an exemplary embodiment of the invention, the script includes other conditions, for example, detecting changes in color (e.g., browning), steaming (e.g., by phase change of water), volume (e.g., dough rising will change the behavior of the cavity in ways that can be anticipated).

Optionally, the script includes a request to the user to add ingredients (e.g., spices), or to mix or reposition object.

In an exemplary embodiment of the invention, the script takes into account the quality of uniformity control achievable by the oven. For example, if a higher level of uniformity is desired than basically provided by the oven, heating may include pauses where power is reduced, to allow heat to even out in the object. The length of the delays is optionally precalculated for the food substances and a calibrated lack of uniformity of the oven. Alternatively or additionally to reducing power, the food and/or the heating areas may be moved one relative to the other so as to better distribute heating.

In an exemplary embodiment of the invention, no script is provided. Instead, the heating times and/or parameters are based directly on the desired results, measured food properties and/or measured heating properties. Such desired results may be user provided or indicated by the recordable element.

5) Liquid injection: (similar to cooling liquid) that is suitable for a biological sample, the purpose of which is to cause uniform warming: This liquid is used in the field of hyperthermia. In this field warming of a biological area is done in order to remove a cancerous growth. From knowledge derived from this field it is possible to understand that a liquid such as this can cause a drastic change in the warming uniformity and can enable use of a warming device that is more simplified than would be required without its use.

6) Penetration of active radiation sources in the sample during the freezing process: These sources are active, which means connected to an external supply line that will be used as a source of EM radiation that will emanate from within the sample.

The present invention has been described partly in the context of thawing. The inventors believe that based on the results shown above, it can be expected that the methods of the present invention, can be used for baking and cooking, areas in which conventional microwave ovens are notoriously weak or for other heating operations, especially those for which a high level of uniformity or control is needed and/or in which a phase change takes place.

Utilizing various embodiments of the invention, the UHF or microwave energy may be deposited uniformly in an object to within less than ±10%, ±20% or ±30% over 80% or 90% or more of the object.

Exemplary Food Preparation Processes

Figure 13:
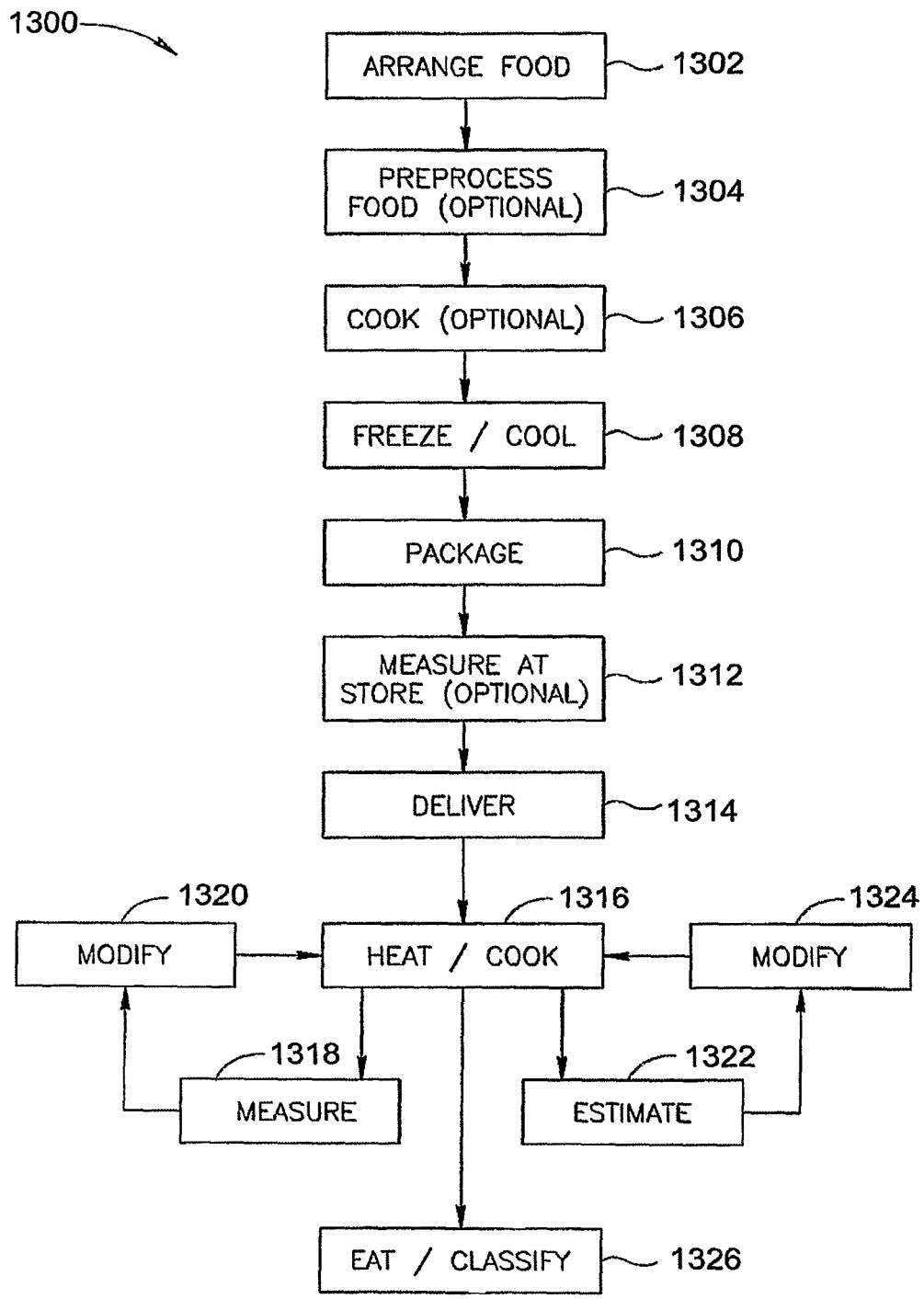
FIG. 13 is a flowchart of a method of food preparation in accordance with an exemplary embodiment of the invention.

FIG. 13 is a flowchart of an exemplary process 1300 of food preparation in accordance with exemplary embodiments of the invention. After a brief review of the flowchart, each act will be expanded on. It should be appreciated that the order of acts may be varied and that several of the acts shown are optional. The process shown includes food preparation, storage and consumption, generally at a remote location. In some cases, only the preparation and/or consumption portions of the process are carried out.

At 1302, the food is arranged for processing, for example, being cut to size.

At 1304, the food is optionally pre-processed, for example, a surface thereof dried (e.g., air-dried) or spices added.

At 1306, the food is optionally cooked. Optionally, food is processed during cooking, for example, spices added.

At 1308, the food is cooled, frozen, canned and/or otherwise prepared for storage.

At 1310, the food is packaged. As will be described below, the packaging is optionally selected to match the food shape and/or reheating process. In some cases, the food is packaged at an earlier stage.

At 1312, one or more properties of the food are optionally measured. Such measurements may be stored for example, on the package or at a central location.

At 1314 the food is delivered, for example, to stores and/or restaurants.

At 1316, the food is heated, for example, for thawing or cooking. Optionally, various properties of the heating/food (e.g. a spectral image, e.g., a scan of the dissipation of RF energy at different frequencies) are measured (1318) and used to adjust heating parameters (1320). Alternatively or additionally, one or more properties of the heating/food are estimated (1322) and the heating parameters are modified (1324). The modification may be, for example, spatial (e.g. moving patches and or the heated object and/or changing the frequencies), and/or heating profile (i.e. the frequencies transmitted and the matching powers) (e.g., a time/frequency/power triplet).

It is noted that the movement of the object affects the spectral image (e.g. the absorption in each frequency). The triplet defines the transmission selected. For each frequency there is a time of transmission and a power of transmission (thereby generating the triplet). The longer the heater transmits in a given frequency at a given power, the more energy is dissipated in the object. Movement may affect the decision of whether or not to transmit at a given frequency, at what power and for how long. IT should be noted that in some embodiments of the invention, location/movement are not "measured" directly, but often affect the spectral image. It is noted that the total absorbed power may be estimated using methods as described herein.

At 1326, the food is optionally consumed and/or classified for consumption according to the quality of the food preparation and/or storage.

The following discussion is loosely based on two examples, one of preparation of food portions, in which multiple food items are provided on a single platter and one of industrial preparation of food, such as a fish. Other examples include, omelet, rice, meat, cake, fresh fruit or vegetables, salad, dairy products, seasonal products, short shelf life products, medicine and/or food additives.

Exemplary RF Heater

Figure 14:
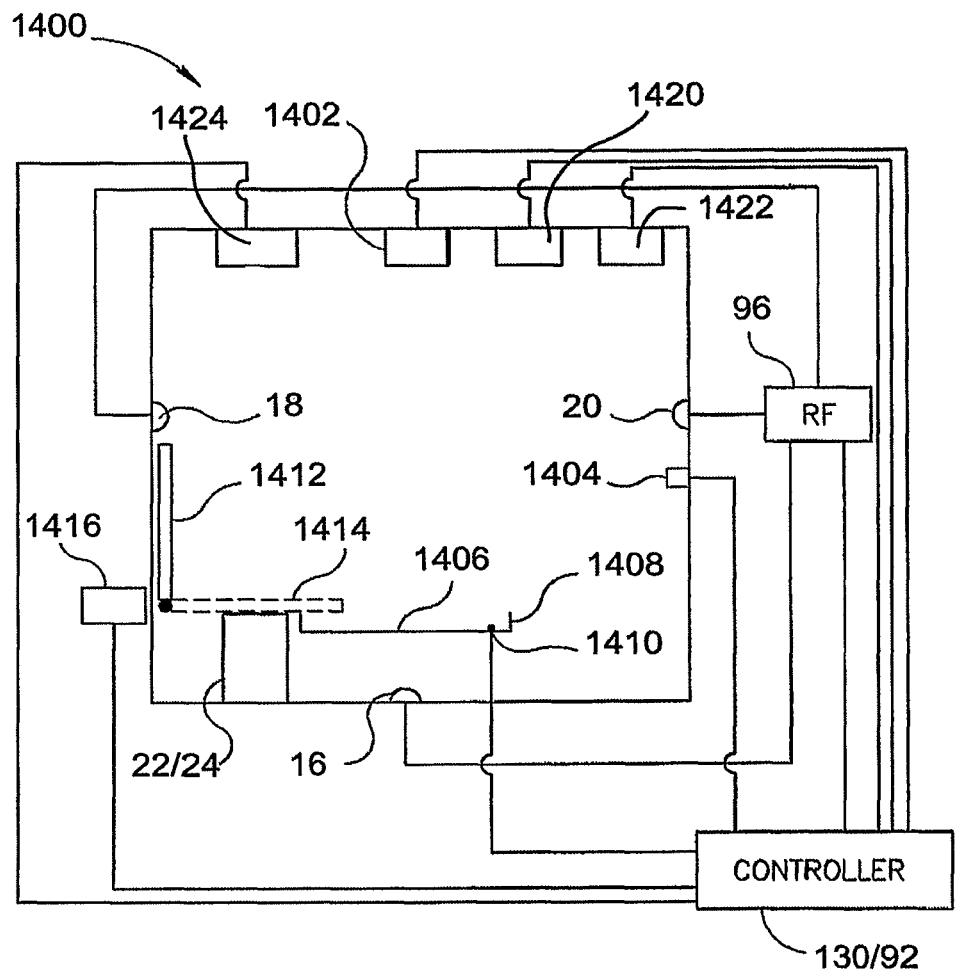
FIG. 14 is a schematic side-cross-sectional view of a microwave cavity oven in accordance with an exemplary embodiment of the invention.

FIG. 14 is a schematic cross-sectional view of an RF heater 1400, in accordance with an exemplary embodiment of the invention. This heater may be used, for example, for cooking/heating/thawing, including 1306 and 1316 of FIG. 13. Heater 1400 generally follows the description of FIGS. 1-10, showing radiator antennas 16, 18 and 20 and field adjusting elements 22/24. RF system 96 and computer/controller 130/92 as described above may be used, optionally with different programming as described below. As indicated by the shape in the figure, the cavity may be rectangular or have another form. In particular, the controller may contain an ASIC and optionally include an ability to execute RF simulations. Other implementation methods, including software, firmware and hardware may be used. Optionally, the controller includes one or more tables of desirable settings to use under various input conditions to achieve desired outputs. Such tables may be generated/calibrated on an individual device basis or for a plurality of optionally similar devices. Variations of the above design may be provided as well. Some embodiments of the invention may be practiced, possibly with reduced quality, using a standard microwave oven. The following elements are described briefly and then again as part of the exemplary food preparation process.

Optionally, the oscillators for sweeping and for heating are different, for example, using a VCO for sweeping, optionally with periodic calibration and a stable oscillator for heating. An exemplary such system is described in U.S. Provisional Patent Application No. 60/924,555 filed 21 May 2007 for ELECTROMAGNETIC HEATING, the disclosure of which is incorporated herein by reference.

An optional imager 1402, for example an X-Ray imager, a millimeter wave imager or CCD is used to obtain an image, optionally including water concentrations and/or dielectric properties of a food item placed on a tray 1406.

Tray 1406 optionally has one or more guide elements 1408 to ensure correct placement of food (especially food provided in suitably designed packages) thereon. Optionally the oven is programmed or programmable to act differently for certain package designs. Tray 1406 is optionally mobile, for example, using an actuator (not shown).

A reader 1404 is optionally provided, for example, an RFID reader or a bar-code reader to read information off a package. Optionally, the reading is done by same sensor as used for the sweeping, possibly at a different frequency. It is noted that even if the heating antenna are optimized for a certain frequency range, they ca still operate at other ranges, harmonic or not.

The information read off the package may, in some embodiments, include instructions regarding the desired taste, texture and/or other effect of the food preparation (e.g. browning, whether a steak should be raw or well done, etc.). For example, a steak package may include at least two distinct operation instructions—well done but less crispy or medium and more crispy. After acquiring the information from the package, the oven may prompt the user to select between the modes. Each mode dictates, for example, what power level(s) to use at what frequency and when, whether or not to provide power that would dissipate in a crisping element and how much and when to provide same. In addition, the oven might be sensitive to the power absorbed in the object or a portion thereof, and upon achieving a pre-determined change, the change is detected by the oven and the oven can react and change the heating mode For example, the package can include a liquid that expands during heating. As the cooking progresses the steam created by the liquid opens the package, and the device detects the change in the spectral image (due to the phase change of water), which can be used to decide to turn on a browning mode. Alternatively, a packaging site (take away at a restaurant or industrial facility) may use different packages, each with distinct instructions for heating modes (e.g. fast and less uniform or vice versa). Thus a user may purchase packed food that would heat at the user's preferred heating rate (rather than only the desired cooking effect). Alternatively or additionally, one or more sensors 1410 read a size, weight and/or machine readable information of a package, once the package is placed on the tray. Alternatively or additionally, a user enters the information, for example, into a keypad of an RF oven or using an external bar-code reader.

In an exemplary embodiment of the invention, a radiation blocking baffle 1412 is provided which can be selectively positioned (e.g., 1414) to block radiation from food on tray 1406. While a rotary hinge activated by an actuator 1416 is shown, other designs may be used, for example, baffles which come from two or more sides of the food, and sliding baffles.

In an exemplary embodiment of the invention, one or more environmental control elements 1420 are provided, which may be used, for example, to control ambient temperature, air turbulence, humidity and/or pressure. Optionally, the one or more environmental control elements 1420 include a UV lamp. Optionally, the UV lamp is used to reduce contamination and/or bacterial growth during a keep warm operation or other long-term operations. Optionally, an environmental sensor 1422 is provided to assist in closing a feedback loop on the environment. In some cases, the RF absorption spectra indicate one or more environmental conditions, such as humidity level. In some cases, heating is modified to take into account existing environmental conditions.

In an exemplary embodiment of the invention, one or more conventional heating modules 1424 are provided, for example, an IR heater or a steam source.

Dedicated Devices and/or Modes

In some embodiments, the heater may be configured to maintain food at about a given temperature (e.g. about a given temperature or within a predetermined zone such as 40-45° C.). In some embodiments, a dedicated heater capable of substantially only maintaining temperature is provided. In an exemplary embodiment of the invention, a heater can be set to a mode where any opening and closing of its door (if any) cause the device to automatically attempt to heat/cool an object therein (optionally only if the presence of an object is detected, e.g. by a frequency scan or weight detection) to the target temperature. Maintaining a temperature may be useful, for example, in restaurants, where a dish is maintained at a temperature suitable for serving, but desirably without damaging of the dish and/or allowing growth of pathogenic microbes. The heater may include one or more cooling elements (e.g., refrigerator coils or a cool air source) for reducing temperatures.

A "keep warm" mode may be provided in various manners, including:

(a) In an exemplary embodiment of the invention, the heater allows the food to cool or even freeze (e.g., the heater actively cools the food), and then warms the food to the desired temperature upon demand. Optionally, the cooling and heating effects apply to a same portion of the oven. Alternatively, the food may be moved between parts and/or compartments of the oven and/or a cooling coil and/or an RF heating element may so be moved (e.g., using rails or a robotic arm). In an exemplary embodiment of the invention, the heating terminates when the object reaches the desired keep-warm temperature. Alternatively, or additionally, the heater includes one or more radiation sensors which detect energy/heat emission during cooling and the controller controls the heater to input the same missing energy upon demand. Temperature measurement may be, for example, in the heater chamber, on the plate, or by sensing the food itself (e.g. IR sensor or optical fiber). In an exemplary embodiment of the invention, the reheating on demand uses a suitable power so that heating time is very short, for example, less than 1 minute, less than 30 seconds, less than 10 seconds or less than 3 seconds (e.g., if sufficient power is provided for the food size, for example, 27 KW for 300 gr of meat.

In an exemplary embodiment of the invention, an optimized starting configuration is determined during a prior heating step, so that reheating can proceed faster and with greater assurance. Alternatively or additionally, a fast scanning is carried out (e.g., 3-4 msec. For example, if an object is to be thawed in 20 seconds significant changes in the spectral image could be detectable in about 2 seconds. Optionally, 10 sweeps/second are carried out, which slow down the thawing by about 1.5% of the time. Fewer sweeps can be carried out, for example 2 sweeps/sec. It should be noted however, that if the heating includes adjusting patches, each adjustment typically requires a repeated sweep before heating begins and takes time to perform. In an exemplary embodiment of the invention, a package is provided that details the starting conditions/configuration and the maximal bandwidth that may be reached by moving the patches (e.g., a best achievable result). Optionally, the package includes an average convergence time (or other statistic of the simulation). A significant deviation from the average can indicate that there might be a problem with the package and/or the heater. Optionally, in such a case, the heater uses the best result that was found even if it is not nearly as good as the expected result. Alternatively or additionally, the heater may report a problem (e.g., to user or via network).

Alternatively or additionally, the package information is used to reduce the number of sweeps. For example, if one heater repeats the sweep 15 times and averages the results, having "original" sweep results can allow the number of sweeps to be reduced (e.g., only to find a deviation), thus allowing a single sweep to be shorter than 1 msec, for example, 10 s or 100 s of microseconds.

Based on experimental results, the following heating times are estimated for food preparation using a 27 KW heater:

i. 400 gr beef from fresh to well-done in under 9 seconds at 27 KW.

ii. 100 gr sushi from −80 deg C. to thawed at 2-6 deg—less than one second at 27 KW.

iii. 1.3 Kg chicken from −10 to about 2-6 deg C.-about 4 seconds at 27 KW (b) In an exemplary embodiment of the invention, the food is maintained continuously at a same temperature, for example, to within 10 degrees, 5 degrees, 3 degrees or 1 degree or even 0.5 degrees (Celsius). In an exemplary embodiment of the invention, the temperature is maintained by one or more of providing heated air at the target temperature, blowing steam at a desired temperature at the food into the device or by inputting RF at low power or intermittently, such that the object would not cool below a first temperature nor heat above a second temperature. The temperature may be measured as detailed above or a predetermined heating may take place based on experimental results with like food quantities.

In an exemplary embodiment of the invention, the user interface of an oven according to the present invention may be reduced and/or simplified to improve the ease of operation. An oven may be for example dedicated to reach a desired final temperature (e.g. refrigeration temperature 4-8° C. or room temperature (20-25° C.) or any other temperature (e.g. 50-65° C., etc.). By inserting food into the oven (and optionally pressing a single button) the user activates the oven and the device terminates heating upon reaching the desired temperature, at which time it may notify the user and optionally switch to a keep-warm mode. Optionally, the oven has several final temperatures (e.g., 5-10 options each defining a temperature range of 4-10° C., covering a range between 0 and 100° C.) and the user may choose the final temperature. For example, the options may be limited to partially thaw (−5-0° C.), thaw (4-8° C.), room temperature (20-25° C.), warm (40-50° C.), hot (60-70° C.) and very hot (90-100° C.).

In an exemplary embodiment of the invention, the heater has a mode that prevents unauthorized users (e.g. children) from reaching a temperature that is considered less safe (e.g. 35-40° C. or more or 45-50° C. or more). A similar feature may be provided to prevent damage to food or packaging or prevent fires (e.g., based on temperature or energy absorption). The temperature is optionally provided on a package or pre-stored in the heater. One setting may be pre-set to override the other. Optionally, the limiting feature is applied by requiring a special code for any step including a temperature above the limit. Alternatively or additionally, the heater door may be locked such that it would not open as long as the object temperature is higher than the safe temperature, unless a user override (e.g. code) is used. This feature may use any method of sensing the object temperature, including those of the prior art in prior art heaters. Alternatively or additionally, the rate of heating of the object may be used to calculate the cooling rate (of the object and/or a part of the packaging) and the time after heating when the door may be opened freely. ($E=mC_p\Delta T$, and E and $\Delta T$ are known). Optionally, the oven supports an option of choosing a desired rate of heating which would cause the oven to either use more power or be less uniform.

In an exemplary embodiment of the invention, the oven is capable of automatically calculating a proper operation mode, regardless of food shape/size/composition/geographic location, using for example the frequency sweep method described herein and/or using a temperature sensor, thereby supporting simplification of the interface.

Arrange Food (1302)

In an exemplary embodiment of the invention, the food is shaped and/or arranged in a manner which matches the intended processing steps. For example, food may be arranged to have (relatively) uniform weight, thickness and/or shape. For foods in meal platters, the different foods are optionally each arranged in a predetermined compartment of a platter. Optionally, a food item is provided which affects the later processing, for example, a layer of fat or of ice may be used to later baste and/or shield a part of the food. In an exemplary embodiment of the invention, when selecting food, a note is taken of the food freshness and/or other properties thereof. Optionally the selection takes into account planned processing steps. Alternatively, the processing is modified to take the food properties into account. For example, different thawing instructions may be provided for overripe and under ripe fruit or for old fruit.

Pre-Process (1304)

In an exemplary embodiment of the invention, the food is pre-processed, for example, injecting water, injecting fat, adding spices or other flavoring agents and/or preservatives, adding cryogenic agents which affect the freezing process (such as alcohol), blanching, pasteurizing or enzyme deactivation (e.g., using a uniform field as described below), washing, sterilization and/or drying out of an outside layer (e.g., to reduce microwave radiation absorption at this layer and/or enhance flavor absorption), optionally using a uniform field which is limited to the layer and does not significantly extend into the food item. In some cases the food is pre-processed before arrangement and/or pre-processed both before and after arrangement, possibly applying different pre-processing types. Optionally, one or more agents are injected to improve heating process characteristics, such as by lowering Q factor, improving absorption (for example by adding salt, such as in kosher products), improve composition homogeneity and others. Other pre-processes may be selected in order to improve the spectral image (e.g. lower Q factor), as well, for example, immersion in an RF absorbing liquid. Optionally, part of the object (e.g., its surface) is differentially treated. For example, the surface is made more moist or more dry than the rest of the object such that during heating it will (or will not) dry and become more crispy or browned.

Cook (1306)

Some types of food are cooked or partially cooked before delivery. Any known method of cooking may be applied, including heating in a relatively uniform manner as described above. In some cases, the food is at least partially packaged before being cooked.

Freeze/Cool (1308)

The food (cooked or otherwise) is cooled or frozen, or otherwise prepared for storage, for example, by canning (where uniform microwave heating may be applied for non-metallic packages). In an exemplary embodiment of the invention, cooling uses controlled directional cooling, for example, using a temperature gradient as described in U.S. Pat. No. 5,873,254 and PCT publications WO 2006/016372 and WO2003/056919, to applicant IMT, the disclosures of which are incorporated herein by reference, or by uniformly heating a part of the food using microwave energy while cooling the food, and changing the heated part (relative to the food item) so that a freezing front propagates in a controlled manner. In an exemplary embodiment of the invention, the freezing is controlled to prevent damage to the texture of the food. It is noted that the feedback from microwave heating signals can be used to determine the state of freezing of a food sample, for example, by detecting dielectric property changes associated with phase and/or temperature changes.

Package (1310)

As noted above, the food may be packaged at an earlier stage, for example, before cooking. In an exemplary embodiment of the invention, the packaging is selected to assist in later spatially controlled microwave heating.

Figure 15:
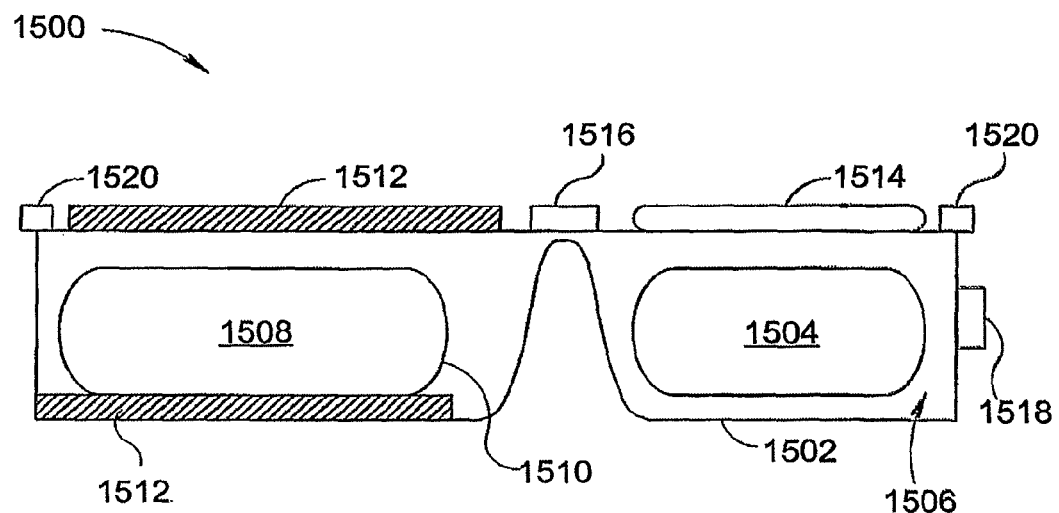
FIG. 15 is a schematic side cross-sectional view of a food package in accordance with an exemplary embodiment of the invention.

FIG. 15 illustrates an exemplary food platter 1500 for use in packaging in accordance with exemplary embodiments of the invention (e.g. in a microwave oven and/or RF heater). A body 1502, for example of molded plastic defines one, two or more compartments 1506 and 1510, in which foodstuffs, for example different foodstuffs 1504 and 1508 are provided.

In an exemplary embodiment of the invention, platter 1500 is designed to assist in non-uniform heating of food (e.g. so that at least one food item is heated differently from at least one other food item or that a certain food is heated in layers). In an exemplary embodiment of the invention, the RF is emitted into cavity is uniformly and one or more techniques are used to vary the uniformity of energy absorbed by food. Methods that relate to utilizing packaging for controlling non-uniformity are described following.

In an exemplary embodiment of the invention, a microwave absorbing element 1512 is provided on one or more sides of a food compartment, changing the amount of energy entering into a portion of the compartment to heat food therein. Alternatively or additionally, energy absorbing and/or reflecting element 1512 is used to scorch/burn a pattern on the food when warmed (e.g., in the form of a grilling mesh on a meat dish). According to an embodiment of the present invention, the oven may select one or more times during heating wherein the frequencies that interact with element 1512 are transmitted (or are not transmitted), thereby defining when the effect of this element will, or will not, take place.

In an exemplary embodiment of the invention, a radiation absorbing and phase changing element 1514 is provided which changes its radiation absorption as it heats, thereby temporally modifying the radiation entering a nearby compartment. For example, the material may be set to melt at a certain desired temperature. Alternatively or additionally, the change in absorption is noted by a feedback system of the oven and used to detect temperature changes in the food. Optionally, heating of element 1514 is used to provide radiative or contact heating of a nearby foodstuff 1504. Multiple elements 1514, each with different phase change temperatures may be provided. Element 1514 may be a passive source (e.g. an organized structure with a predetermined frequency response, such as dipole). Optionally, passive sources (optionally completely non-emitting) are provided which are selectively activated by selectively applying or not applying frequencies to which these sources react.

One or more microwave transponders 1520 are optionally provided which generate a coded interference with the microwave in the cavity. In general, interference with the microwave cavity behavior can be detected by analyzing the resonant properties of the cavity. The coding may be used to determine the relative amplitude of the field at each point along the platter, thereby assisting in matching the modes of the microwave cavity to the placement of food therein. If only one transponder is used, it may be uncoded (since there may be no need to differentiate between transponders) and comprises, for example, a reflective element, possibly one which preferentially reflects at a certain frequency. In an exemplary embodiment of the invention, the interference element is an active element that includes a receiving element, a modulator and a transmitting element, for example a frequency doubling element may be used.

A non-RF transponder may be provided, for example, an ultrasonic transponder.

One or more temperature sensors 1516 are optionally provided. Optionally, the sensors generate a signal or interference with the field, for example, until a critical temperature is reached, at which time a part of the sensor melts or otherwise changes its electrical behavior (e.g. using a resonant structure that has a specific absorption profile. If the structure melts, its absorption pattern is no longer detected). Alternatively or additionally, an RF responding temperature sensor is provided. A more complex transponder element may include a temperature sensor that modifies the modulation according to the temperature. Another example is a simple circuit including a coil and/or a capacitor, wherein the geometry of the element (and therefore its behavior) changes as a function of temperature, for example, due to mechanical distortion thereof. In an exemplary embodiment of the invention, the oven is designed to work with a TTT (temperature sensitive/transmitting tag), as described above. As noted above, the oven is optionally designed and/or controlled to avoid transmission at the frequencies used by the TTT. In a non-RF example, there is provided a bar-code that darkens (at least in part) as a temperature is achieved or a material that changes color as a temperature is reached, for example, liquid crystals. Optionally, multiple temperature indicators are provided on the package, thereby giving an indication of uniformity of heating. Optionally an imaging sensor is provided below the tray, to image temperature on the bottom of the tray, where contact between the food and packaging is better guaranteed. Such sensors are optionally used to provide feedback on actual cooking conditions as exhibited by the food.

In an exemplary embodiment of the invention, a recording element 1518 is provided, for example, in the form of an RFID element or a bar-code, which includes thereon an indication of the content of the package, suggested treatment thereof and/or heating instructions. In an exemplary embodiment of the invention, the instructions are actually provided at a remote site; indexed to a key stored on element 1518.

Measure (1312)

In an exemplary embodiment of the invention, after the food is ready (e.g., packaged for storage), various types of information are optionally stored on element 1518, for example, size, weight, type of packing and/or cooking/thawing/heating instructions. In an exemplary embodiment of the invention, measuring includes radar, ultrasound or RF imaging which indicates shape uniformity and/or amount of water. Optionally, measuring is performed before sealing the packaging. In an exemplary embodiment of the invention, the information is not directly stored on element 1518. When element 1518 is read, an index is read which is used to access remotely stored information.

In an exemplary embodiment of the invention, an oven is configured as a condition recorder. For example, a user may put an object in the oven (condition recorder). The oven will measure a few characteristics (e.g. RF response (dielectric function), weight, color and/or the volume or any other characteristic) and provide a record of the object (e.g. stored in the oven, sent over a network and/or printed out as a sticker or tag or programmed into a programmable tag). Optionally, when the same object is inserted again in the oven, the oven may measure the object again and provide a comparison between the first and second sets of measurements. This comparison may indicate a condition of the sample, for example, dehydration.

In an exemplary embodiment of the invention, a first device is used for the first measurement and a tag is issued with that data (e.g. at a site of production) and later (e.g., at a site of consumption) a second oven reads the tag and confirms quality unchanged. If a single oven is used, a user may indicate the identity of the object to the oven (e.g., before and after storage).

An example of unwanted change is that if meat is stored in bad condition it may lose color (scanning can include a CCD or other image) and/or water. The changes indicate normally that the food was not stored properly. Examples of wanted change are ripening of fruit and rising of dough (e.g., if dough is left in the oven while rising, even if the oven only scans the dough). It should be noted that such scanning can be done independent of cooking, for example, purchased food can be scanned it to define an initial vale, and then again, before use scanning may be used to detect damage that might have occurred during storage at home, or possibly even the time that lapsed. Optionally, a table for expected spectral changes for various items is stored in the heater/scanner, for example, changes due to water loss, ripening or decomposition.

In an exemplary embodiment of the invention, an element like element 1518 is used for non-platter items, for example, for frozen fish, for example, in the form of a tag.

Deliver (1314)

Different types of food may be delivered in different ways. In one example, food is delivered to a restaurant on demand based on orders placed the night before. In an exemplary embodiment of the invention, the food is prepared according to individual preference and/or diet restrictions. In an exemplary embodiment of the invention, the preparation instructions associated with element 1518 are modified to match personal preferences. Optionally, the modification is at order time. Alternatively or additionally, the modification is when a user actually comes to collect food.

In an exemplary embodiment of the invention, food is made ready at a time a person orders the food.

In an exemplary embodiment of the invention, delivery is to a supermarket or to users at home.

In an exemplary embodiment of the invention, delivery is to an automated vending machine which optionally includes a controllably uniform/non-uniform heater as described herein for heating/cooking the food. In an exemplary embodiment of the invention, such a vending machine includes one or more storage compartments (e.g., refrigerator and/or freezer) and one or more heating compartments (optionally continuous with storage). When food is "ordered" the vending machine transfers the food (one or more types) to a heating portion and thaws/warms/heats the food, according to user or oven instructions (optionally based on a tag attached to the food. Optionally, a plurality of food-stuffs are heated and served together, for example, on a same platter, to the same or to different temperatures. Optionally, the food is made ready fast, for example, in a minute or less. Optionally, and unlike other vending machines, heating uses the methods described herein so there is less dependence on portion size, composition and/or position, in achieving edible results.

In an exemplary embodiment of the invention, the food is prepared on premises for a large feeding organization, for example, a restaurant or employee meal plan.

Heat/Cook (1316)

In an exemplary embodiment of the invention, the controllably uniform/non-uniform heating method described above is used to heat and/or cook the food. In an exemplary embodiment of the invention, reader 1404 of heater 1400 is used to read element 1518 and determine a desired cooking/heating setting and/or more complex configuration.

In an exemplary embodiment of the invention, element 1518 has stored thereon specific cooking instructions (e.g. the amount of power that is to be absorbed in the food within a given period of time, and potentially also changes in the rate of energy absorption). Alternatively or additionally, element 1518 has stored therein information regarding the platter shape and/or dielectric properties of its contents. It is noted that for industrial shaped portions, if the shape of the food is relatively regular between platters, movement of the food around the effective heating area of the oven and/or changes in size and/or small changes in shape will not generally affect the uniformity by too much, since a similar spectral image would be read and the device may automatically compensate for the minor changes. Optionally, the platter includes a depression and/or other geometrical structures which urge the food item to maintain a desired position relative to the platter borders.

As noted above, in some cases it is desirable to heat different parts of a platter in different ways. In particular, some of the methods of the present invention operate by providing a uniform heating area in the oven and modifying the effect of this region on food. In other methods, a non-uniform heating region is generated and/or non-uniform areas are used. In an exemplary embodiment of the invention, one or more of the following methods is used to provide uniform and/or non-uniform heating:

(a) Provide one or more parts of a platter with materials (e.g., 1512) that prevent radiation from reaching food, for example, by absorption or by reflection. For example, as known in the art, a part of the platter may be covered with aluminum foil, thereby shielding that portion and heating only other parts of the platter.

(b) Provide baffles (e.g., 1412) or other elements in the oven, to keep some radiation away from food. In an exemplary embodiment of the invention, the materials and/or baffles provide a reduction in absorbed energy of between 10% and 100%, for example, 20%, 30%, 40%, 60%, 80%, or intermediate percentages. In an exemplary embodiment of the invention, the oven is controlled so that the energy absorbed by the unprotected region does not go up and/or become non-uniform. As noted above, these baffles optionally move during the heating time.

(c) Use an imager (e.g., 1402) to determine the food shape and drive the RF generation. In an exemplary embodiment of the invention, a simulation is used which accepts as its input the position of the platter, shape of the food and/or its dielectric properties and determines which excitation modes of the oven and/or modification of the oven are required to achieve a desired effect. Optionally, and especially for industrial food which may be relatively regular in shape/size/dielectric constant, a table may be provided on the oven or at a remote location including operating instructions for various "standard" platter shapes and/or food shapes/types arrangements. Optionally, sensors 1410 are used to determine the platter shape and/or other macro-properties. The simulation may be executed locally or remotely. Optionally, when the simulation is executed, billing is carried out, for example, charging according to provision of instructions for uniform/non-uniform heating of an object or per object heated. Optionally, the request for a simulation includes an ID of the heated object which is found on or referenced by element 1518.

In an exemplary embodiment of the invention, a simulation uses the geometry and composition and/or other features of the load (this may be read directly from the load and/or a tag on the load), taken together with the device parameters (that are known in advance). The simulation then calculates the s-parameters and derives from them information on field distribution in the camber (e.g. e-field calculation, H-field calculation, power flow, current density, power loss density and/or other parameters).

In an exemplary embodiment of the invention, s-parameters are measured during operation the simulation is started based on one real solution to the problem to achieve another interesting solution. For example, based on the s-parameters frequency bands of interest may be defined and the simulation be limited to those regions or to one or more specific frequencies.

(d) Image/measure the food previously and store the relevant information and/or heating profile (e.g., what frequencies at what power levels) on element 1518. In some cases, the information is stored remotely and element 1518 stores an access identifier or index thereto. In an exemplary embodiment of the invention, tray 1406 and/or the platter are designed to enforce a certain position of the platter in the oven. In an exemplary embodiment of the invention, the oven is calibrated to generate a certain heating profile which causes uniform and/or non-uniform heating (zones) according to certain food item/platter types and/or positions. In an exemplary embodiment of the invention, 20 platter layouts and 20 matching non-uniform heating layouts are designed and/or found for an oven. Smaller or later numbers of "standard" layouts may be provided, for example, 100 or more. Optionally, standard layouts are stored and accessible by internet or by another data transmission network.

Optionally the calibration is per oven design. Optionally, the calibration information is modified according to the response of the oven to the signals, for example, by shifting the "expected" uniform location from a calculated position to an actual position. Optionally, such shifting is determined using a phantom where absorption is indicated, for example, by temperature-based color indication and which shows the relative shifting of the uniform heating area as compared to the design.

(e) Modifying the heating profile in real-time using sensors. In an exemplary embodiment of the invention, sensors (e.g., 1520, 1516) generate feedback on the actual RF field and/or temperature at certain points. This input is used to modify the heating profile and/or driving of the RF system to achieve desired heating behavior (e.g., even if a first desired field distribution is achieved, this may not cause a desired final temperature distribution for example because the absorption changes during use and hence the energy input should be updated as well). Optionally, such sensors are used to determine relative locations of platter boundaries (including inter-compartment boundaries) and heating field boundaries (including boundaries between differently heated volumes). In an exemplary embodiment of the invention, the feedback of the RF system is used as a sensor, for example, to detect changing in phases of food-stuffs, which indicates cooking/thawing stage and/or to generate a signal when uniform heating is apparently failing. In case of failure the oven is optionally calibrated and/or a more complex simulation executed. Optionally, heating is stopped and a user is notified of failure to heat correctly. Optionally, the sweep mechanism is used as a reader to identify objects/tags with known spectral images.

(f) Moving the food in the cavity, to selectively determine the amount of energy reaching different parts of a platter. Optionally, the times in the field are calculated to take into account the expected absorption of different food types. In a particular example, the tray rotates so that parts of the platter change their absorption. The time in the area (volume) and the energy applied may be used to determine the heating profile of the platter as a whole.

(g) In an exemplary embodiment of the invention, feedback from the food and/or oven is used to determine that a correct amount of heating is applied. For example, changes in dielectric constant of the food and/or feedback from package temperature sensors may be used to determine that food has reached a sufficient temperature (e.g., for flavor reasons or for safety reasons). In an exemplary embodiment of the invention, food heating is stopped when sufficient heating is achieved and/or a user is notified. In an exemplary embodiment of the invention, based on a heating profile of the food, a user is given an alert in advance of the food being ready, for example, several minutes ahead of time (e.g., 1, 3, 5-10), several seconds ahead of time and/or a count-down may be shown. This may be useful for employees that come to pick up their meals at a food preparation site or at a vending machine or for picking up from a busy person in the kitchen. Notification may be provided, for example, using any means known in the art, including sounds, images, SMS messages and e-mail, for example, directly from the oven or from a computer coupled to the oven and/or monitoring it or by a human agency. In an exemplary embodiment of the invention, the advance warning is used for advance preparation of other food stuffs that are part of the meal, for example, a beverage or a salad. In an exemplary embodiment of the invention, this allows a meal to be prepared relatively slowly while still allowing a user to receive the meal with a minimum waiting time. Alternatively or additionally, food heating is stopped or slowed down if other components of the meal are not ready or if a patron announces he will be delayed. In an exemplary embodiment of the invention, multiple platters are heated simultaneously (e.g., side by side and/or stacked), utilizing feedback to ensure that all platters are heated correctly and/or generating signals to a user as a platter is ready to be removed. Optionally, a non-uniform field is applied to selectively heat faster those platters which will be needed sooner and/or to heat platters to different temperatures according to patron preferences and/or according to food heating needs. This allows changing the food readiness time without opening and closing the oven.

According to some embodiments of the invention, a device may include a memory capable of storing a desired heating protocol or a desired heating result to match a patron's (or user's) preferences. The protocol is stored in the device either manually or automatically during use, and is optionally proposed as a default protocol on later use by the same patron (and/or of a same dish). Optionally, the preferences are determined automatically, based on a history of past requests on a same or different heating device (e.g. in a vending machine from a chain of vending machines). Optionally, the user is identified by code, cellular telephone number, social security number and/or a credit card code. Optionally, the credit card is read during payment/ordering and used to set preferences.

In an exemplary embodiment of the invention, the amount of energy applied to a meal is adjusted according to the expected scheduling of the preparation of the meal. Optionally, the scheduling takes into account the desires of multiple patrons, for example, tens or hundreds or thousands or more, all of which come for a meal at approximately the same time (e.g., "lunch hour"). Such scheduling may also take into account, for example, the number of available ovens and/or the desirability for a group of patrons to be served at a same time.

In an exemplary embodiment of the invention, a central (or other) controller is provided which controls a plurality of heaters and assigns tasks for enhancing performance. For example, each heater is assigned a different task (e.g. one prepares meat for several patrons in one batch or in sequence and another machine prepares the greens) so the heaters optimally or near optimally utilize available hardware, for example, to reduce time and/or to improve food delivery timing (parts of a dish should desirably all be ready at a same time, even if heater can "keep warm"). Alternatively or additionally, as a request for a meal arrives, one or more heaters is assigned to the meal, ad hoc. Optionally, this method is used for patrons numbering, for example, between 2 and 10, between 11 and 40, between 40 and 100 or between 100 and 1000 or more. Optionally, the controller of the plurality of heaters also controls one or both of a human scheduling system (e.g., which instructions are provided to which worker) and/or controls one or more food moving systems (e.g., conveyer belts).

Measure (1318), Estimate (1322) and Modify (1320, 1324)

During heating of the food, the parameters of the heating are optionally varied. The effect of the varying may cause non-uniformity in space and/or in time, for example, as will be described below and/or to achieve the effects as described above. In an exemplary embodiment of the invention, a script is provided which defines how and what to vary. Optionally, the script includes decisions made according to time (e.g., estimation of an effect) and/or food state (e.g., measurement). Various measuring methods are described above. Estimation is optionally based on a simulation or on empirical results from previous heating cycles. Optionally, the script is conditional (e.g., modified, generated and/or selected) on the position of the platter in the oven and/or personal preferences (which may be stored by the oven).

In an exemplary embodiment of the invention, a script is provided on element 1518 or at a remote location. Optionally, a script is selected by a user selecting a desired heating effect. The combination of the desired heating effect and the identification of the food/layout may cause the selection and/or generation of a suitable script.

In an exemplary embodiment of the invention, a desired heating program may set target amounts of energy for different parts of a platter and/or of a single food items and/or may set desired target temperatures. For example, a meat item may be heated to one temperature, while a side order is heated to a lower temperature. In another example, a single food item may experience different power levels for different times, in order to achieve a desired texture/flavor.

In an exemplary embodiment of the invention, a script is used to set different energy levels and/or different times to apply such energies.

In one example, a script is as follows:
(a) Heat all platter so that the food reaches a relatively uniform temperature of 5 degrees Celsius.
(b) Uniformly heat whole platter at 80% for 5 minutes and then full power for 10 minutes.
(c) Heat area A at full power for 3 minutes, while not heating area B at all (e.g., by applying baffles or a matching (optionally specified non-uniform) heating profile).
(d) Heat the entire platter for 5 more minutes, with area A receiving 80% power and area B receiving 20% power.
(e) Heat to a uniform temperature of 40 degrees Celsius.
(f) Maintain temperature for 10 minutes. It is noted that a desired temperature can optionally be maintained by estimating the energy absorption while applying a known amount of cooling. Alternatively, actual heat absorption may be estimated based on a known amount of energy absorption and a measurement of energy leaving the cavity. Optionally, the oven includes a source of cooling air and/or has coolable walls and/or tray.
(g) Reduce heat to 30 degrees Celsius.
(h) Wait 10 minutes.
(i) Report "done" but leave at 30 degrees Celsius until removed.

In an exemplary embodiment of the invention, the script includes other conditions, for example, detecting changes in color (e.g., browning), steaming (e.g., by phase change of water), volume (e.g., dough rising will change the behavior of the cavity in ways that can be anticipated).

Optionally, the script includes a request to the user to add ingredients (e.g., spices), or to mix or reposition package.

In an exemplary embodiment of the invention, the script takes into account the quality of uniformity control achievable by the oven. For example, if a higher level of uniformity is desired than basically provided by the specific oven, heating may include pauses where power is reduced, to allow heat to even out in the object. The length of the delays is optionally pre-calculated for the food substances and a calibrated lack of uniformity of the oven. Alternatively or additionally to reducing power, the food may be moved relative to the cavity and/or heating or field shaping elements so to improve heating.

In another example, a script for preparing a frozen food product until ready for consumption (e.g. a product comprising frozen and viable yeast dough), is as follows:

1. Heat the frozen dough to a yeast-growth temperature (e.g. 10-45° C.). This step may be performed in two or more steps, for example:
    a. (optionally) Heat the frozen dough to a thawed temperature (e.g. 4-8° C.) and maintain for a period of time, as necessary (e.g., if a user puts the dough in the device and wishes to have it proofed and baked at a later time);
    b. At the later time (or after a delay) heat the thawed dough to yeast-growth or proofing temperature (e.g. 10-45° C.).
2. Maintain the dough at a yeast-growth or proofing temperature (e.g. 10-45° C.) for a period of time necessary for proofing said dough (e.g. a period of time recommended by the manufacturer or recipe or a period) or using a sensor to sense an predetermined increase in volume (or height), e.g. 2 fold, or an output of volatiles indicating fermentation).
    c. (optionally) Heat the dough to a baking temperature (e.g. 190° C.-200° C.) and maintain for a desired period of time (e.g. as dictated by the recipe, or based on the detection of a desired temperature achieved in an inside portion of the dough). Optionally at the end (or during) of said period an IR body is activated to brown the pastry. This step of baking may, alternatively, be executed in a conventional oven.

The above script may be embodied, for example, in a bread making machine, into which frozen ingredients are placed, optionally into an insulated compartment, whereafter the ingredients are thawed, mixed, proofed and/or baked using methods as described herein. Optionally, one or more steps of the above process include controlling the humidity within the oven (optionally maintaining high humidity during proofing and/or warming and/or storage and maintaining low humidity and/or high humidity during baking). At times, the device may maintain a different humidity at different portions of the same step (e.g. high humidity during early baking a low humidity when IR is introduced). Additional details re humidity control are provided below under the heading "Environmental Control".

As noted above, different portions of the food may have different (desired or specified) absorbed power levels. Alternatively or additionally, different portions may have different target temperatures. Optionally, spatial control is used to achieve selective browning (or other behavior) of a part of a food item, by applying a field which overlap mainly with an outer layer of the food, so that that layer is preferentially heated as compared to the rest of the food item. In another example, a bottom of a food item is made harder, by applying more heat, than an upper part of the food item. Depending on the resolution of the oven and on the size of the food item, the entire outside of an item may be preferentially treated. Optionally, the areas with preferential heating have a smallest dimension of 5 cm, 4 cm, 3 cm, 2 cm or less.

In some embodiments, a user and/or platter specify what a desired spatial and/or temporal heating profile is and the oven determines a suitable set of instructions (e.g., spatial and/or temporal profile). In one example, a best-fit type algorithm is used to select heating ability elements and build a heating program that matches desires. Exemplary heating ability elements optionally used in such a search/construction include, uniform heating methods, baffle movements, platter movements and/or non-uniform heating modes or frequency possibilities.

In an exemplary embodiment of the invention, no script is provided. Instead, the heating times and/or parameters are based directly on the desired results, measured food properties and/or measured heating properties.

Environmental Control

In an exemplary embodiment of the invention, a heater controller controls not only energy provision but also one or more environmental variables that affect food preparation. In an exemplary embodiment of the invention, the environmental control is applied to achieve a desired cooking result, for example, reducing humidity to enhance crust formation. Alternatively or additionally, environmental control is applied to maintain environmental conditions, for example humidity. Alternatively or additionally, environmental control is applied to compensate for heating effects. For example, humidity may be increased if the heated food appears to be drying out.

In an exemplary embodiment of the invention, environmental control includes controlling one or more of ambient air temperature (e.g., by providing hot or cold air), air flow rate (e.g., controlled using a fan), ambient humidity (by adding humidity and/or replacing air with dry air and or by causing a water source within the oven to evaporate), ambient gases (e.g., from a gas source, such as a $CO_2$ balloon), ambient pressure (e.g., increase or decrease using an air pump) and/or UV irradiation (using a UV lamp).

In an exemplary embodiment of the invention, the environmental control is responsive and maintains the environment within 20%, 10%, 5% or better of desired settings.

In an exemplary embodiment of the invention, environmental control is carried out dynamically, where the environmental conditions are adjusted based on real time feedback from the heated object and/or the oven environment. For example, when cooking a given food one may measure a property of the food or of the oven environment and adjust the environment in response to the measured property.

In an exemplary embodiment of the invention, the measured property includes humidity/weight (e.g. loss of water), temperature (e.g., using a TTT) and pressure (e.g., using a pressure sensor internal or external to the food.

The change in environment may be a one time event (e.g. when the object temperature is above X, add humidity) or a continuous process (e.g. maintain ambient temperature or pressure as equal or slightly above or below that of the object; add 1% to humidity whenever the object heats by 1° C., etc.) or a combination of the above. In some cases, different parts of the oven are provided with different environments (e.g., humidity or air temperature). In some embodiments, control is based on a previous estimate, alternatively or additionally, to using real time measurements.

Combined Conventional and RF Heating

In some embodiments of the invention, the heater includes a conventional cooking means, for example, an IR element may be included for brazing or scorching or other surface heating. Optionally, both IR and RF are operate together, thus coking both form inside and from outside. Alternatively or additionally, the heater includes a source of steam or hot air or turbulence within the device. In an exemplary embodiment of the invention, the steam or hot air are heated using waste heat generated by the RF generating system. Such utilization of waste heat may also be practiced in conventional ovens. Alternatively or additionally, a conventional microwave heater is provided.

Eat/Classify (1326)

Once the food is ready, it is optionally consumed. In some cases, consumption is delayed, for example, if the prepared food is further stored. In some cases, the food is thawed at 1316 for cooking at a later time using any known method or the present described methods.

In an exemplary embodiment of the invention, the food is classified according to the process it went through and/or any glitches along the way. For example, such classification may include the quality and/or type of freezing, thawing and/or heating. For example, if a heating script was not followed properly or above-desired temperatures achieved, this may reduce the quality. Similarly, if thawing is identified as being problematic in a manner which may affect texture and/or flavor, this is noted. Optionally, for each food-stuff, there is defined a score system which links a quality value to various imperfections along a process. Optionally, this score is combined with a score indicating an original quality of the food stuff, for example, based on storage conditions or, for natural items, a fat content (for example). It should be noted that fat/water content may be important inputs to the processing, for example, suggesting what heating times, profiles and/or powers would be useful.

Optionally, dedicated sensors are provided to track storage conditions, for example, sensors that measure and/or latch a pH value, a temperature change and/or which detect gas release.

Optionally, while the description has in some cases focused on food, the methods described herein are optionally used for non-food materials, for example, organs for implantation, tissue and/or artificial implants. In general, food processing has higher requirements regarding texture and flavor, while organs for implantation, tissue and/or artificial implants have more stringent constraints on viability and lack of contamination. While these requirements may overlap with those of the food as described above, it is noted that a tissue may be viable for implantation as long as it has sufficient viable cells and/or blood vessels remain intact. Flavor, as such, is immaterial for implantation.

Figure 16:
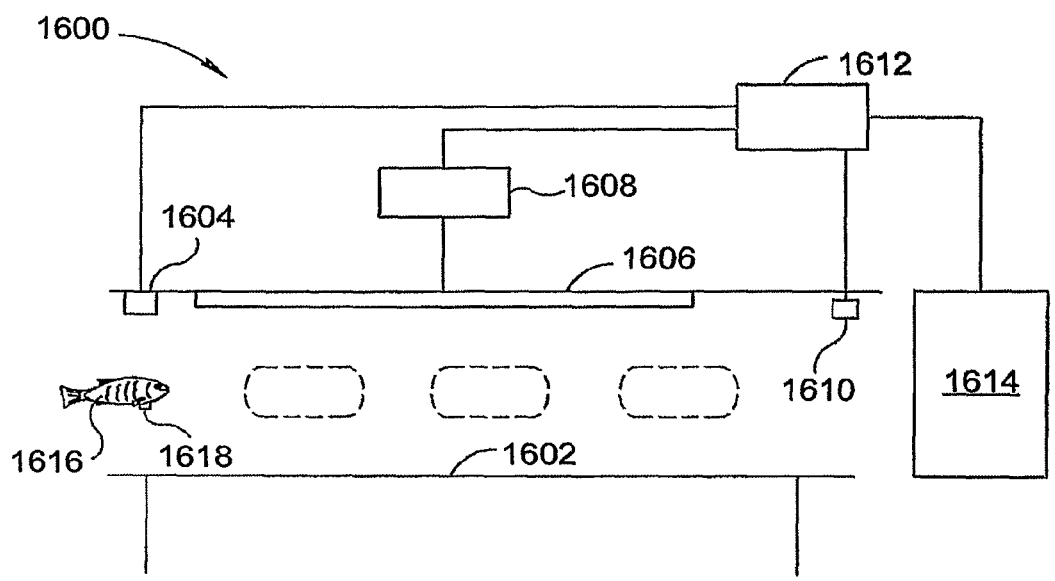
FIG. 16 is a schematic side cross-sectional view of a conveyer belt oven in accordance with an exemplary embodiment of the invention.

FIG. 16 shows a food processing line 1600 including quality classification, in accordance with an exemplary embodiment of the invention.

A food item 1616, for example a fish, is provided frozen and ready for processing (e.g., into cans, fillets, etc.). A tag 1618 is optionally attached to the fish, for example, to track storage conditions and/or to include information about the fish, for example cooking-related properties such as water content, size and/or shape and/or food properties, such as fish type, age and/or growth method. An imager or a reader 1604 provides information about the fish to a controller 1612. A microwave array 1606 represents one or more radiation sources controlled by an RF system 1608, which generates a known (e.g., uniform or non-uniform) heating area, indicated in the figure as a series of areas surrounded by dashed lines.

The areas could be contiguous and/or have various shapes. The fish is conveyed, for example, using a conveyer belt 1602 along the areas and heated appropriately. Optionally, the heated areas are moved and/or fish motion slowed down, as needed, for example, for different fish sizes and/or compositions. Along the way, one or more of the methods described above may be applied, in particular tracking of the fish temperature and/or heat treatment.

A reader/writer 1610 is optionally provided to read from and/or record the properties of the fish on tag 1618. In an exemplary embodiment of the invention, controller 1612 uses the information obtained from the fish and/or the process to classify the fish. The classification is optionally written to tag 1618. In an exemplary embodiment of the invention, a further processing stage 1614 is controlled by (or receives suitable indication from) controller 1612 according to the quality. For example, fish which was improperly thawed may be sent to lower quality canning while well thawed fish is sent for making sushi/sashimi. Optionally, the final product is marked with the quality. Optionally, when the final product is a packaged product, the thawing heating instructions (e.g., machine readable and/or human readable) are modified to match the processing. For example, if, as a result of improper thawing a food item was (or should have been) forcefully heated to a pasteurization temperature, the preparation instructions will include a shorter cooking time and/or recommend well done type cooking.

Industrial and Non-Industrial Settings

The methods as described herein have various ramifications and/or advantages for industrial and non-industrial settings.

In one example, taking advantage of "thaw on demand" option (also for large/thick portions) can change methods of stock management. In the art, prior thawing needs to be done significantly before orders are placed or before cooking should commence (e.g. a day in advance or at least several hours in advance), especially where the thawed portions are bulky, having small surface/volume ratios.

Typical associated problems include:
 (a) long overall process (e.g. begin a day in advance);
 (b) need to thaw excess amounts so as to guarantee meeting peak demands and avoid losing business; and
 (c) need to discard thawed and unused food (due to food safety regulations and hygiene).

A heater according to the present invention may thaw food "on demand" to provide food that is potentially as good as fresh (e.g., no over heated hot spots), and in very short time periods (e.g., less than 10 minutes for a 1 Kg meat portion or even faster, such as less than 3 minutes, 1 minute or tens of seconds).

In an exemplary embodiment of the invention, there is provided a stock management system (e.g., software and/or hardware) where a user's order for immediate preparation drives the immediate thawing of a portion (e.g., including expensive cuts of meat or other food) for that patron and/or for use in cooking within 15 or 20 minutes). Moreover, thawing may be delayed according to preparation of other food for that patron and/or according to the cook's workload, for example delayed for several minutes, such as 2-3 or 5 minutes or longer. Optionally, such delaying is supported by fast thawing and/or keep-warm functions as described herein.

In an alternative scheme, a restaurant may have limited stock of thawed items (e.g., fewer than 10, fewer than 5, fewer than 2 of a type of item) and when an item is used from the small stock a new item is thawed (or when a new order is placed and the use of an item for which thawing is expected is already ordered). Thawing can be automatic or semi-automatic (e.g. as soon as the order is entered in a computer in one location the instructions to thaw are provided to a person at another location who executes the thawing or to a device (e.g., a vending machine like freezer and heater) that executes them automatically. Alternatively, the process may be manual—as in current kitchens, but the cook, rather than using a pre-thawed portion, uses a frozen portion as a starting point.

In an exemplary embodiment of the invention, software is provided for use as a meal planning assist device (e.g., at home or in a restaurant or other commercial site), either for planning the thawing and/or heating of several different meals or for a meal comprising several food types/courses. Optionally, usage is as follows: a user inputs the information. The heater software takes into account the desired relative timing of preparation (e.g., what needs to be ready at a same time and what in a certain sequence) and provides a schedule that may also take into account the desired relative cooling rates/preparation time.

For example, for a dish of meat and mashed potatoes, where one cools at a different rate than the other, the slower-cooling dish may be heated first.

The oven may then regulate the order of heating and the rate of heating. Optionally, the oven may select the timing to begin heating, the order of placing the foods in the device or the relative timing of operating multiple devices or, if heating "simultaneously" in a single oven, the oven may begin with heating one of the foods and then heat both such that they finish heating together. The device may include a sensor of room temperature which si optionally used to provide an ambient temperature for advising a user to reheat the food after a given period of time.

Other settings are possible as well. For example, a small commercial setting might use the methods described herein to prepare a meal on the spot. A large-scale industrial setting may use the methods described herein to heat/cook a batch (e.g., 2, 10, 30, 100 or intermediate or greater numbers of portions) or a continuous flow of products. In an exemplary embodiment of the invention, a flow-through oven uses relatively low cost heating elements, for example, using an antenna array with multiple feeds. The array is thus fed by multiple amplifiers (each amplifier having a relatively low output power, but the power is combined on the heated object.

The range of weights which may be heated varies as well, from sizes considered too large for "standard" microwave heaters, to objects considered too small. For example, objects in the weight range of 1000-0.1 Kg may be heated in accordance with various embodiments of the invention. Similarly, a wider range of volumes may be treated, for example, 2 cubic meters or more, down to 2 cubic centimeters or less. Optionally, for small objects, overheating of a power source (e.g., magnetron) is avoided, using matching methods as described herein.

In an exemplary embodiment of the invention, a higher percentage than conventional of a cavity may be used, for example, above 40%, above 50%, above 70% or above 80% or intermediate values. For example, within a cylindrical volume of 52 cm diameter and 52 cm height, the following heating examples were performed: (a) two large chunks of meat, placed one on the other, with a total weight of 9.5 Kg were defrosted from ca. −10° C. to −0.6-0.5° C. (uniformity being within 1.1° C.). (b) 24 Kg of apples were cooked in a single batch with a final temperature between about 50° C. and 66° C.

In an industrial setting, it may be desirable that all portions have exactly the same characteristics, at least after processing. In a restaurant-type establishment, some variance may be desirable. Furthermore, personalization per patron preferences may be desirable. In a home use, even more repeatability may be desirable; however, for a particular user it may be desirable to test various settings to determine an optimal set of settings. Optionally, a user provides feedback to the oven, for example "too hot", "too moist", "undercooked", "just right", which is used by the device as input how to vary heating parameters for the next usage. This may be applied, for example, every usage, on device initiative and/or on periodically. Optionally, a user can apply an override. Optionally, the input is corrected for changes in food weight between heating events.

Rate of Heating

In an exemplary embodiment of the invention, the rate of heating can be controlled. For example, the rate of heating depends on the specific heat and the absorbed power.

It is possible to heat 300 gr meat to cooking temperature within 1 second, provided that 27 KWatts are provided. Amplifiers that output such power (and even a higher power) may be produced by any person skilled in the art, based for example, on the teachings of US provisional application of May 2007, the disclosure of which is incorporated herein by reference. A lower power can provide a slower heating, which may be intentional. Knowing the food's specific heat (e.g., read form a tag, inputted by a user or read form a table), the device can be programmed to reach the final temperature at a desired slower rate.

Example: In conventional IR oven methods, baking a chicken of ca. 1.13-1.36 Kg at 177° C. normally takes about 1.25 to 1.5 hours (about 15 minutes longer for stuffed chicken), beginning with a thawed chicken. In an experiment, a frozen (ca. −20° C.) stuffed chicken was cooked in 18.5 minutes (ca. 15 minutes for cooking only) at 250-300 Watts.

Figure 17:
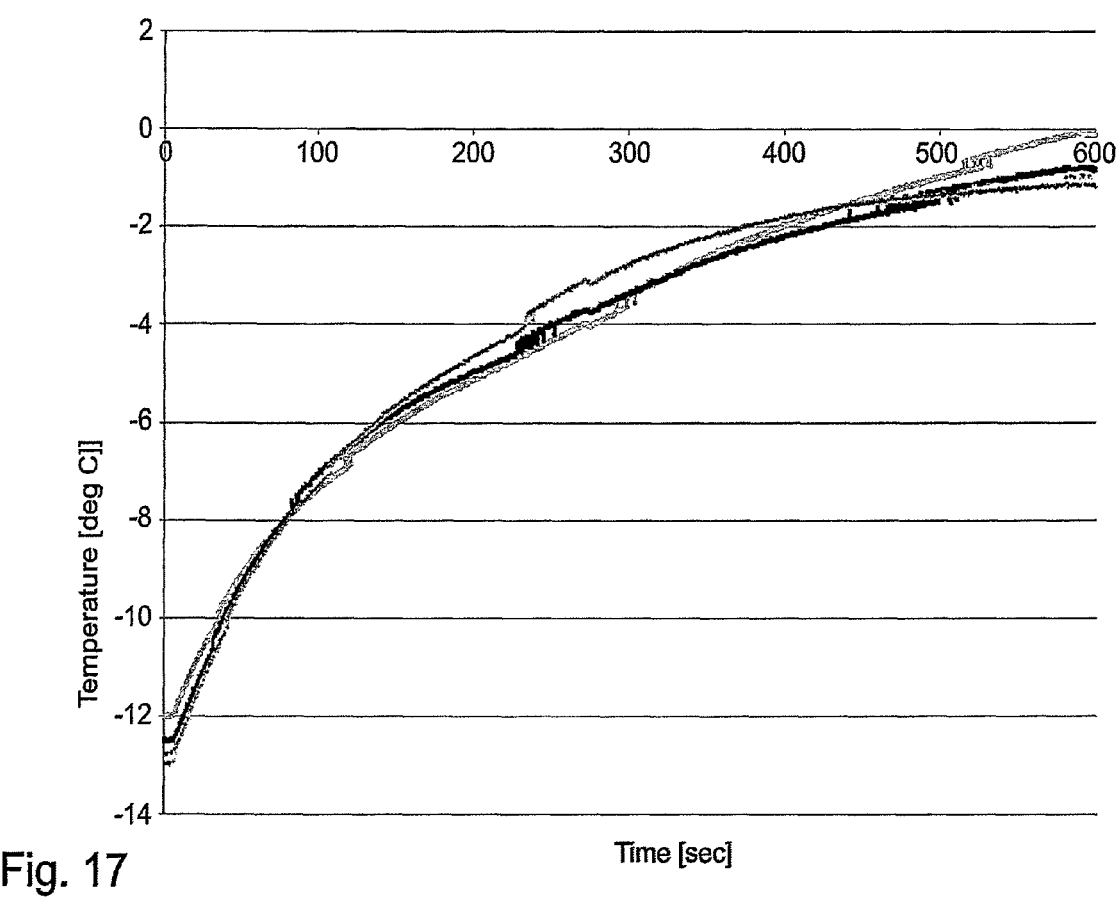
FIG. 17 is a graph showing a uniformity of heating in a chunk of meat, in accordance with an exemplary embodiment of the invention.

At this rate heating (Thawing) can be very uniform. For example, FIG. 17 shows heating of meat while maintaining a uniformity (of maximum achieved temperature) of +/−0.3° C. In this example, For example, a 1.3 Kg cylinder of meat (ca. 30 cm long/ca. 10 cm diameter) was heated by 13° C. within 10 minutes at 400 Watts.

Oven with Accuracy Tradeoff

The inventors also realized that in ensuring uniform heating, the heating may be somewhat prolonged. Therefore, any heating mode may have a different balance between velocity of heating and uniformity. At times a user may be willing to sacrifice uniformity somewhat, such as in the case of a liquid (e.g. consommé) being heated, which may be stirred before serving, in order to achieve faster heating. In such cases one may prefer to have a faster heating and would be willing to have up to 10-20° C. temperature variation, or even 40° C. or more or even 100° C. variation (this may be acceptable for some applications, for example while utilizing energy efficiency features as described herein). At other times (e.g. defrosting dough or viable material) uniformity is more crucial and the heater may be operated at a mode having greater uniformity (e.g. less than 10° C. variation or even less than 1.5° C. variation or even less than 0.5). For example, for quicker heating one may choose a narrower band of frequencies having better dissipation, while for more isothermal heating the bandwidth would be larger, allowing also lower dissipation (potentially using also a "reverse image" of the spectral image within the band).

In an exemplary embodiment of the invention, the following method is used. Typically for a band around a given peak of dissipation, the narrower the band, the better the average dissipation at the transmitted frequencies. If the band is wider, the RF is transmitted at lower dissipation (i.e. the frequencies that are further from the peak) in addition to the transmission of the narrow band. In an exemplary embodiment of the invention, a wider band is transmitted about one peak and a narrower band about a second peak. Since each peak is associated with a different portion of an object (or a different location on a dish) you may have fast (narrow band, high efficiency, less isotherm) heating in one region (e.g. soup) while you would have slower (broad band, less efficiency but higher isotherm) in a second region (e.g. bread). In this example, you can provide hot soup (non-uniform, but mixable) and only a warm bun.

In an exemplary embodiment of the invention, a heater has two or more accuracy/rate settings each having a different balance between heating velocity and uniformity, and the user may operate the device to choose the desired mode of activation. Alternatively, the device may use information obtained from the food (or user input) to set (or propose) a heating mode.

Energy Efficiency

In an exemplary embodiment of the invention, the heater is capable of detecting whether or not there is a load within the device (based on a frequency sweep) thus preventing operation of the device when empty, open and/or damaged.

In an exemplary embodiment of the invention, the heater selectively applies energy at frequencies where it is expected to be absorbed, thus increasing energy efficiency. Optionally, energy efficiency is traded off with uniformity, for example, as described above.

In an exemplary embodiment of the invention, such selective application of energy is more efficient by avoiding warming the environment and/or surface currents. Alternatively or additionally, efficiency is made higher by avoiding emitting energy into the environment (and selecting frequencies where absorption by object is higher. Alternatively or additionally, efficiency is enhanced by reducing water evaporation and/or heating time (and thus heat radiation time). Reduction of water evaporation may also be useful for reducing weight loss, maintaining product size, product shape and/or product texture.

In an exemplary embodiment of the invention, evaporation is reduced by maintaining all object parts at temperatures below evaporation (e.g., due to uniformity or due to controlling non-uniformity).

In an exemplary embodiment of the invention, cooling rate is reduced because there is less evaporation and/or smaller temperature gradients (within object and/or between object and environment).

It should be noted, that in general, reducing temperature variance allows heating time to be shortened and maximum energy deposition rates (which often correlate with evaporation) to be reduced.

In an exemplary embodiment of the invention, higher efficiency allows a heat transfer media (e.g. boiling water to cook eggs as necessary in conventional cooking) to be avoided.

Example of Intentionally Uneven Heating

Figure 19A:
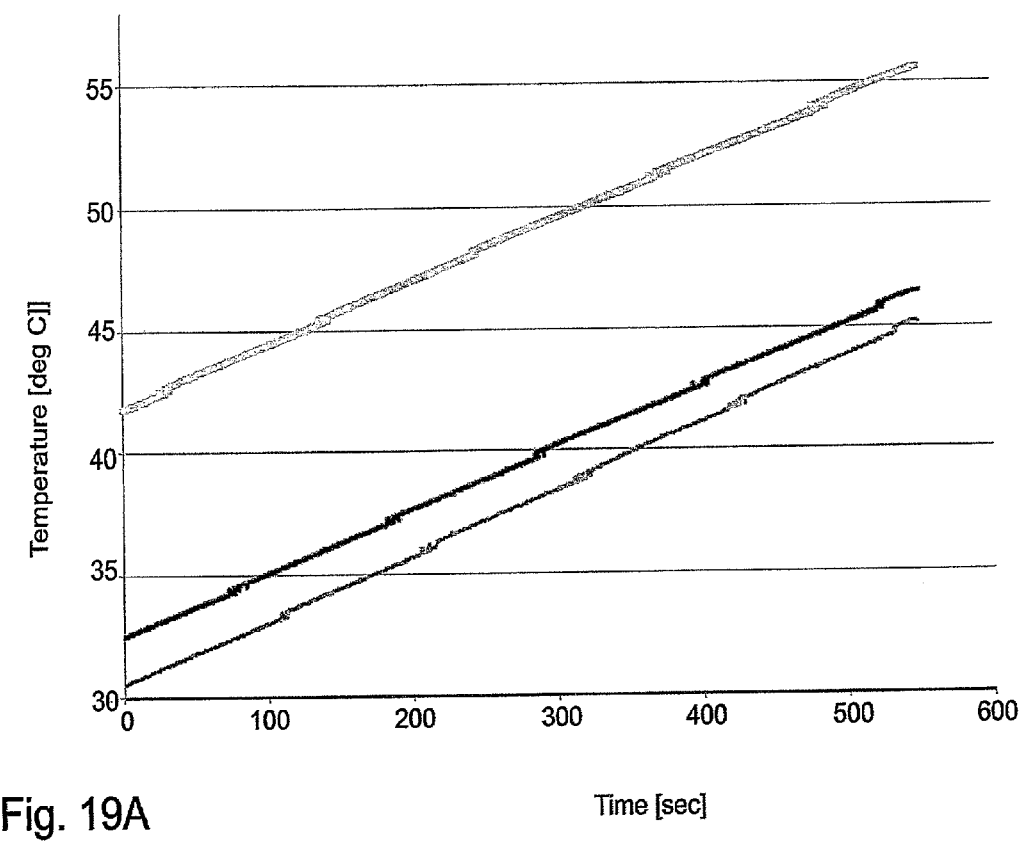
Figure 19B:
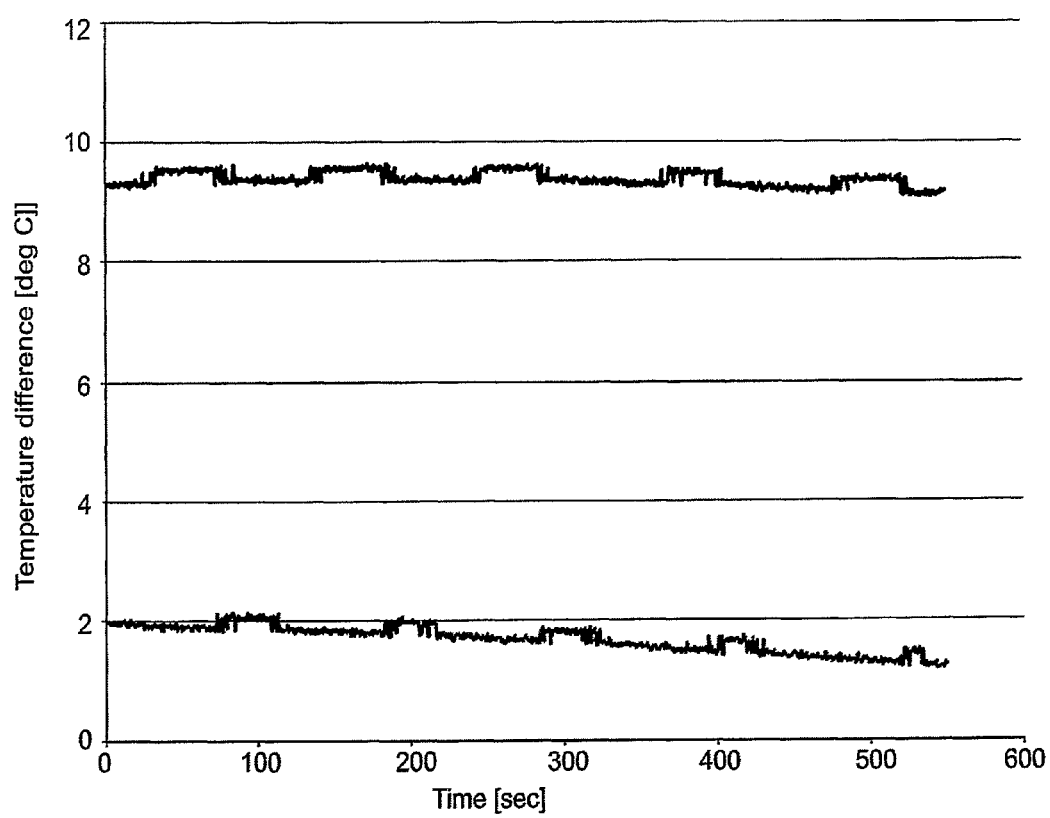

Into a chunk of meat (cylinder of ca. 30 cm long/ca. 10 cm diameter, at about 30° C.) three optic fibers were inserted and heating begun at 400 W. During heating the temperature change at each fiber was measured. After scanning for the dissipation, the RF frequencies that would provide the best absorption were selectd. Within these frequencies power was transmitted in sequence at bands of ca. 20 MHz about each of the relevant peaks. The following method was applied. If there is no heating (detected almost immediately) this means that none of the sensed areas are heating, and then a different sub-band is assayed. If heating is detected, it is followed until there is a rise of up to 2° C. and the temperature is followed in all sensed areas. If none of the peaks provides the desired differential heating, peaks of lower dissipation may be assayed. Once the proper sub-bands are selected, heating may commence, and the energy provided in each frequency defines how sharp the temperature gradient would be. In an actual experiment, the frequencies chosen for transmission were between 810-850 MHz, and between 900-930 MHz, which corresponded to two of the sensors. The third sensor was relatively non-heating at these frequencies. The meat was heated non-uniformly, until the warmest spot was about 42° C. and the coldest about 30.5° C. This is shown in FIGS. 19A and 19B. It should be noted that in accordance with some embodiments of the invention, a hot spot can be moved (to obtain a greater area of uniformity by modifying the frequency by a small amount.

Figure 18A:
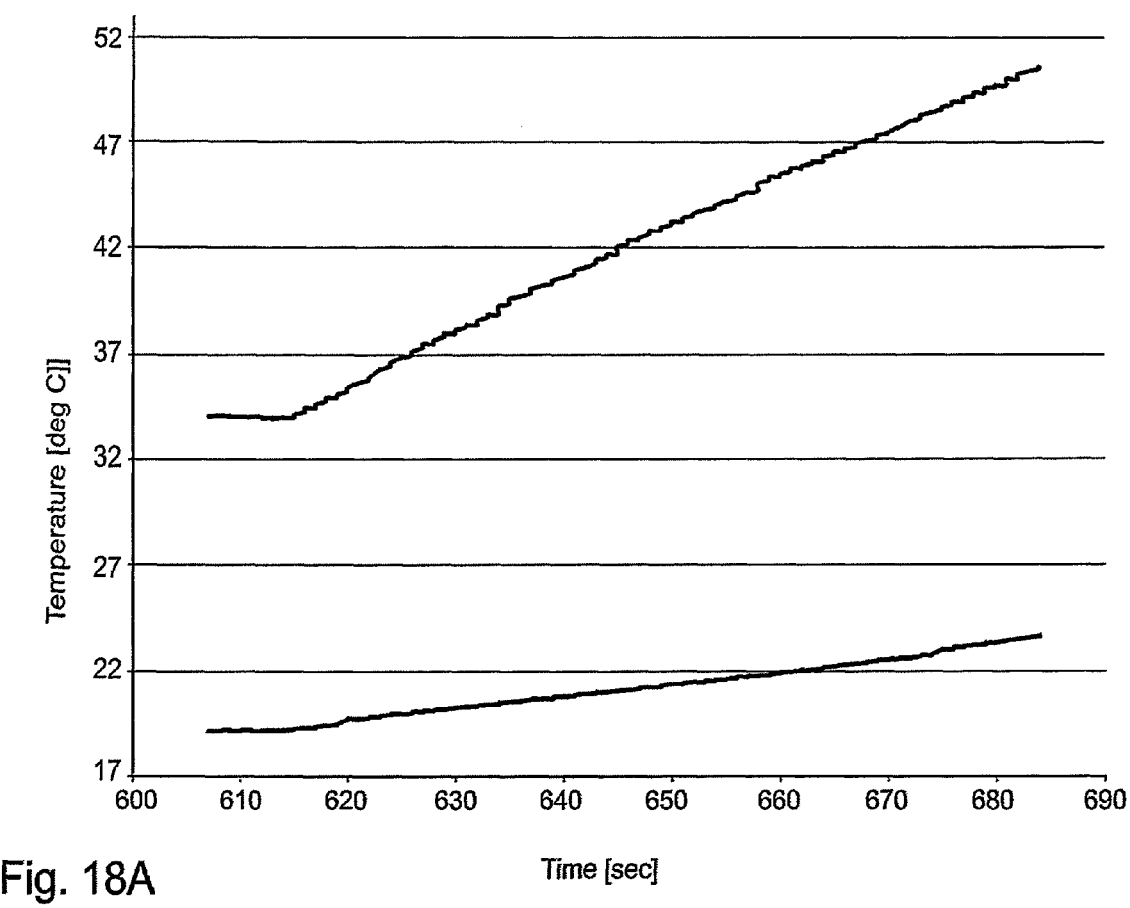
Figure 18B:
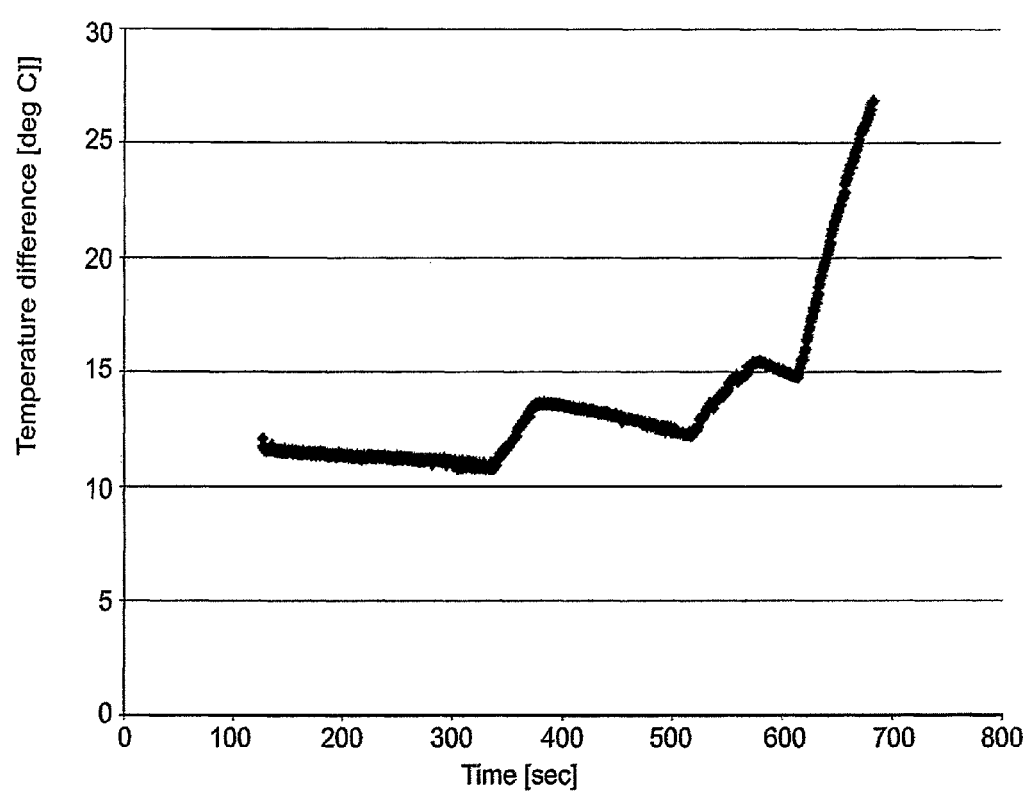

Then, the mode of mode of operation was changed and provided the same energy (calculated to compensate for the different dissipation) to all the meat. As can be seen in FIG. 19A, the meat heated linearly at all measured locations and as seen in FIG. 19B, the temperature differences between pairs of sensed locations were almost constant, with a slight decline after about 550 seconds, when the meat was heated already by about 13° C. Also seen from these Figs., is that the heat conduction between the locations was on a smaller order of magnitude than that of the RF heating, (had the rates been comparable, the temperature differences would have significantly reduced). In FIGS. 18A and 18B, the experiment was performed similarly, but one sensor was placed in a fat portion and one in meat. The meat was a steak of about 150 gr. As seen in the FIG. 18B, the portions were first heated uniformly and then the mode was changed to non-uniform heating (indicating that the non-uniformity si controlled) FIG. 19A depicts the temperature during a portion of the process.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. For example the present invention has been described mainly in the context of thawing. The inventors believe that based on the results shown above, it can be expected that the methods of the present invention, possibly at a higher frequency, can be used for backing and cooking, areas in which conventional microwave ovens are notoriously weak. Furthermore, the terms "comprise," include," and "have" or their conjugates shall mean: "including but not necessarily limited to."

The scope of the invention is limited only by the following claims:

1. An apparatus for heating an object by delivering microwave energy to the object, comprising:
   an interface configured to receive processing information using information stored on a machine readable element associated with the object;
   a device configured to detect microwave radiation absorption characteristics of the object at a plurality of frequencies;
   at least one radiating element; and
   at least one processor configured to:
      determine at least one instruction for heating the object by microwave radiation based on the processing information and the microwave radiation absorption characteristics of the object; and
      cause a source of microwave energy to heat the object by applying microwave radiation to the object in accordance with the at least one instruction;
   wherein the at least one radiating element is configured to obtain first information relating to the microwave radiation absorption characteristics of the object at the plurality of frequencies and provide the first information to the device, and wherein the at least one radiating element is configured to serve as part of a reading unit by receiving the information stored on the machine readable element.

2. The apparatus of claim 1, comprising:
   a cavity; and
   the source of microwave energy configured to provide microwave energy to the cavity to heat the object using microwave radiation.

3. The apparatus of claim 1, wherein the at least one instruction specifies a driving profile for microwave energy delivery such that microwave energy is delivered to the object at two or more of the plurality of frequencies, and for each of the two or more frequencies the driving profile identifies a power and an amount of time for delivering microwave energy by microwave radiation.

4. The apparatus of claim 3, wherein the interface is configured to receive information acquired by a user input device, and the at least one processor is configured to determine the at least one instruction for heating the object based on the information acquired by the user input device.

5. The apparatus of claim 1, comprising at least one positioning element configured to position the object at a predetermined orientation with respect to the reading unit.

6. The apparatus of claim 1, wherein the microwave radiation absorption characteristics include an absorption rate relating to microwave energy absorbed by the object at each of the plurality of frequencies, and wherein the at least one processor is configured to determine the at least one instruction for heating the object by microwave radiation based on the absorption rate.

7. The apparatus of claim 1, wherein the interface is configured to receive information acquired by a user interface device, and the at least one processor is configured to determine the at least one instruction for heating the object based on the information acquired by the user interface device.

8. The apparatus of claim 7, wherein the at least one processor is configured to provide one or more prompts to a user through the user interface device based on the processing information received using information stored on the machine readable element.

9. The apparatus of claim 1, wherein the device is configured to detect the microwave radiation absorption characteristics of the object periodically during the heating of the object, and wherein the at least one processor is configured to determine the at least one instruction for heating the object based on the periodically detected microwave radiation absorption characteristics of the object.

10. The apparatus of claim 1, wherein the device is configured to detect the microwave radiation absorption characteristics of the object based on detection of at least one of a group consisting of: reflection coefficients, transfer coefficients, reflected power to a first feed, coupled power to at least a second feed, an efficiency of energy transfer into the object, a dielectric constant of the object, and an amount of energy absorbed by the object.

11. The apparatus of claim 1, wherein the device is configured to detect the microwave radiation absorption characteristics of the object based on microwave radiation received by the object.

12. The apparatus of claim 1, wherein the interface is configured to receive the processing information from the reading unit configured to read information from the machine readable element.

13. The apparatus of claim 1, wherein the microwave radiation has a frequency range between 300 MHz and 3 GHz.

14. The apparatus of claim 1, wherein the microwave radiation has a frequency range between 400 MHz and 1 GHz.

* * * * *